United States Patent
Rajpoot et al.

(10) Patent No.: US 11,991,533 B2
(45) Date of Patent: May 21, 2024

(54) METHOD OF CHANGING ANTENNA CONFIGURATION, APPARATUS, AND COMPUTER READABLE MEDIUM

(71) Applicant: Rakuten Symphony Singapore Pte. Ltd., Singapore (SG)

(72) Inventors: Atul Singh Rajpoot, Madhya Pradesh (IN); Sudeep Kumar Jain, Madhya Pradesh (IN); Durgesh Rathore, Madhya Pradesh (IN); Keshav Sharma, Madhya Pradesh (IN)

(73) Assignee: RAKUTEN SYMPHONY SINGAPORE PTE. LTD., Singapore (SG)

( * ) Notice: Subject to any disclaimer, the term of this patent is extended or adjusted under 35 U.S.C. 154(b) by 47 days.

(21) Appl. No.: 17/710,927

(22) Filed: Mar. 31, 2022

(65) Prior Publication Data

US 2023/0319589 A1    Oct. 5, 2023

(51) Int. Cl.
*H04W 16/28* (2009.01)

(52) U.S. Cl.
CPC .................................. *H04W 16/28* (2013.01)

(58) Field of Classification Search
CPC .................................................... H04W 16/28
See application file for complete search history.

(56) References Cited

U.S. PATENT DOCUMENTS

| | | | |
|---|---|---|---|
| 10,084,673 B1* | 9/2018 | Sirure | H04W 24/08 |
| 11,190,309 B1* | 11/2021 | Marupaduga | H04L 5/0073 |
| 2004/0196813 A1* | 10/2004 | Ofek | H04B 7/0491 |
| | | | 370/278 |
| 2010/0120415 A1* | 5/2010 | Urquhart | H04B 17/318 |
| | | | 455/424 |
| 2011/0199992 A1* | 8/2011 | Barker | H01Q 1/246 |
| | | | 370/328 |
| 2013/0324110 A1* | 12/2013 | Kenington | H04W 36/00835 |
| | | | 455/423 |
| 2020/0389268 A1* | 12/2020 | Sathyanarayan | H04L 27/0008 |
| 2021/0258067 A1* | 8/2021 | Hoshino | H04B 7/18504 |
| 2023/0036577 A1* | 2/2023 | Ruiz Alvés | H04W 16/28 |

* cited by examiner

*Primary Examiner* — Kenneth T Lam
(74) *Attorney, Agent, or Firm* — HAUPTMAN HAM, LLP

(57) ABSTRACT

A method for disoriented cell configuration includes determining a first number of misaligned sectors in a first set of disoriented cells of a first set of cells, generating data of a second set of disoriented cells based on the first set of disoriented cells or the first number of misaligned sectors for in the first set of disoriented cells, determining a first set of cross-feeder cells, a first set of sector swap cells or a first set of cyclic swap cells, and changing a configuration of an antenna of a disoriented cell of the second set of disoriented cells. Changing the configuration of the antenna includes changing a connection of a set of cables of an antenna of a first cross-feeder cell, or changing a deployed azimuth of an antenna of a sector in the first set of sector swap cells or cyclic swap cells.

20 Claims, 24 Drawing Sheets

300 →

| Column 1 | Column 2 | Column 3 | Column 4 | Column 5 | Column 6 |
|---|---|---|---|---|---|
| Cell ID | Cell name | Cell Location | Planned Azimuth | Deployed Azimuth | Cell status |
| 1 | J1 | Tokyo-A | 25 | 25 | Normal |
| 2 | J2 | Tokyo-B | 35 | 155 | Disoriented |
| 3 | J3 | Tokyo-C | 45 | 45 | Cross Feeders |
| 4 | J4 | Tokyo-D | 65 | 315 | Sector Swap |
| 5 | J5 | Tokyo-E | 180 | 270 | Cyclic Swap |

Row 1 / Row 2 / Row 3 / Row 4 / Row 5 / Row 6

FIG. 3

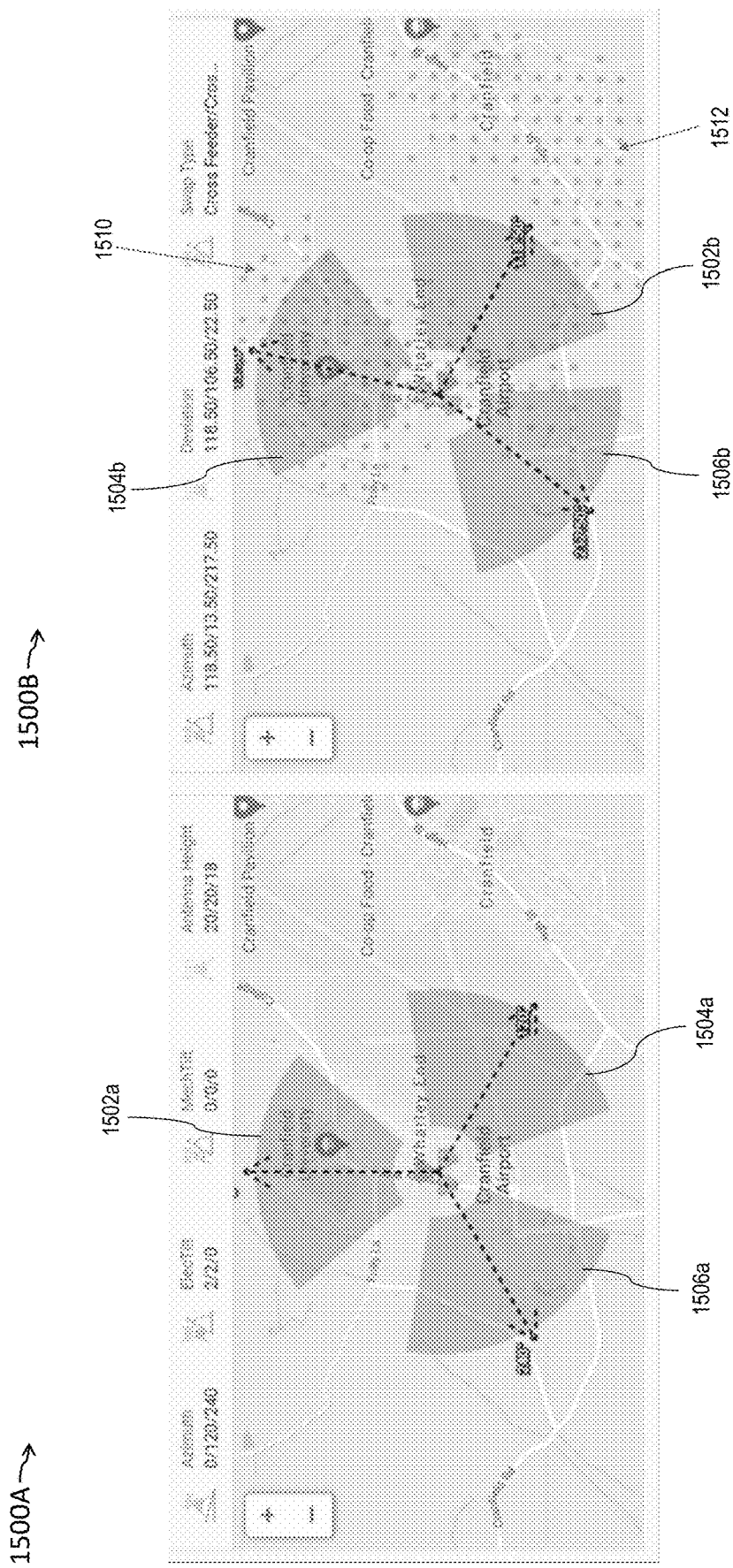

METHOD OF CHANGING ANTENNA CONFIGURATION, APPARATUS, AND COMPUTER READABLE MEDIUM

FIELD

The present application relates to a method for disoriented cell configuration, and an apparatus for disoriented cell configuration.

BACKGROUND

Network service providers and device manufacturers (e.g., wireless, cellular, etc.) are continually challenged to deliver value and convenience to consumers by, for example, providing compelling network services that are capable of being flexibly constructed, scalable and diverse.

SUMMARY

An aspect of this description relates to a method for disoriented cell configuration. In some embodiments, the method includes determining, by a first server, a first number of misaligned sectors for each disoriented cell in a first set of disoriented cells of a first set of cells, the first set of cells having user data that includes at least geolocation data of a first set of users, wherein each disoriented cell of the first set of disoriented cells includes a corresponding node with a corresponding antenna with a corresponding deployed azimuth different from a corresponding planned azimuth. In some embodiments, the method further includes generating, by the first server, data of a second set of disoriented cells based on at least one of data of the first set of disoriented cells or the first number of misaligned sectors for each disoriented cell in the first set of disoriented cells, wherein each cell in the second set of disoriented cells has two or more misaligned sectors in the corresponding first number of misaligned sectors. In some embodiments, the method further includes determining, by the first server, at least one of a first set of cross-feeder cells in the second set of disoriented cells, a first set of sector swap cells in the second set of disoriented cells or a first set of cyclic swap cells in the second set of disoriented cells. In some embodiments, the method further includes changing a configuration of the corresponding antenna of the corresponding disoriented cell of the second set of disoriented cells, In some embodiments, changing the configuration of the corresponding antenna of the corresponding disoriented cell of the second set of disoriented cells includes changing a connection of a first set of cables of a corresponding antenna of a first cross-feeder cell of a first set of cross-feeder cells, or changing a first deployed azimuth of a first antenna of a first sector in the first set of sector swap cells or the first set of cyclic swap cells.

An aspect of this description relates to an apparatus for disoriented cell configuration. In some embodiments, the system includes a memory having non-transitory instructions stored, and a processor coupled to the memory, and being configured to execute the instructions, thereby causing the apparatus to determine a first number of misaligned sectors for each disoriented cell in a first set of disoriented cells of a first set of cells, the first set of cells having user data that includes at least geolocation data of a first set of users, wherein each disoriented cell of the first set of disoriented cells includes a corresponding node with a corresponding antenna with a corresponding deployed azimuth different from a corresponding planned azimuth. In some embodiments, the processor is further configured to execute the instructions, thereby further causing the apparatus to generate data of a second set of disoriented cells based on at least one of data of the first set of disoriented cells or the first number of misaligned sectors for each disoriented cell in the first set of disoriented cells, wherein each cell in the second set of disoriented cells has two or more misaligned sectors in the corresponding first number of misaligned sectors. In some embodiments, the processor is further configured to execute the instructions, thereby further causing the apparatus to determine at least one of a first set of cross-feeder cells in the second set of disoriented cells, a first set of sector swap cells in the second set of disoriented cells or a first set of cyclic swap cells in the second set of disoriented cells. In some embodiments, the processor is further configured to execute the instructions, thereby further causing the apparatus to change a configuration of the corresponding antenna of the corresponding disoriented cell of the second set of disoriented cells. In some embodiments, the non-transitory instructions that cause the apparatus to change the configuration of the corresponding antenna of the corresponding disoriented cell of the second set of disoriented cells, the processor being further configured to cause the apparatus to change a connection of a first set of cables of a corresponding antenna of a first cross-feeder cell of a first set of cross-feeder cells, or change a first deployed azimuth of a first antenna of a first sector in the first set of sector swap cells or the first set of cyclic swap cells.

An aspect of this description relates to a computer-readable medium. In some embodiments, the computer-readable medium includes instructions executable by a controller of a first server to cause the controller to perform operations including determining a first number of misaligned sectors for each disoriented cell in a first set of disoriented cells of a first set of cells, the first set of cells having user data that includes at least geolocation data of a first set of users, wherein each disoriented cell of the first set of disoriented cells includes a corresponding node with a corresponding antenna with a corresponding deployed azimuth different from a corresponding planned azimuth. In some embodiments, the instructions executable by the controller further cause the controller to perform operations further including generating data of a second set of disoriented cells based on at least one of data of the first set of disoriented cells or the first number of misaligned sectors for each disoriented cell in the first set of disoriented cells, wherein each cell in the second set of disoriented cells has two or more misaligned sectors in the corresponding first number of misaligned sectors. In some embodiments, the instructions executable by the controller further cause the controller to perform operations further including determining at least one of a first set of cross-feeder cells in the second set of disoriented cells, a first set of sector swap cells in the second set of disoriented cells or a first set of cyclic swap cells in the second set of disoriented cells. In some embodiments, the instructions executable by the controller further cause the controller to perform operations further including changing a configuration of the corresponding antenna of the corresponding disoriented cell of the second set of disoriented cells. In some embodiments, changing the configuration of the corresponding antenna of the corresponding disoriented cell of the second set of disoriented cells includes changing a connection of a first set of cables of a corresponding antenna of a first cross-feeder cell of a first set of cross-feeder cells, or changing a first deployed azimuth of a first antenna of a first sector in the first set of sector swap cells or the first set of cyclic swap cells.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

FIG. 3 is a diagram of a cell report, in accordance with some embodiments.

FIGS. 15A-15B are corresponding diagrams of corresponding maps, in accordance with some embodiments.

DETAILED DESCRIPTION

Figure 1:
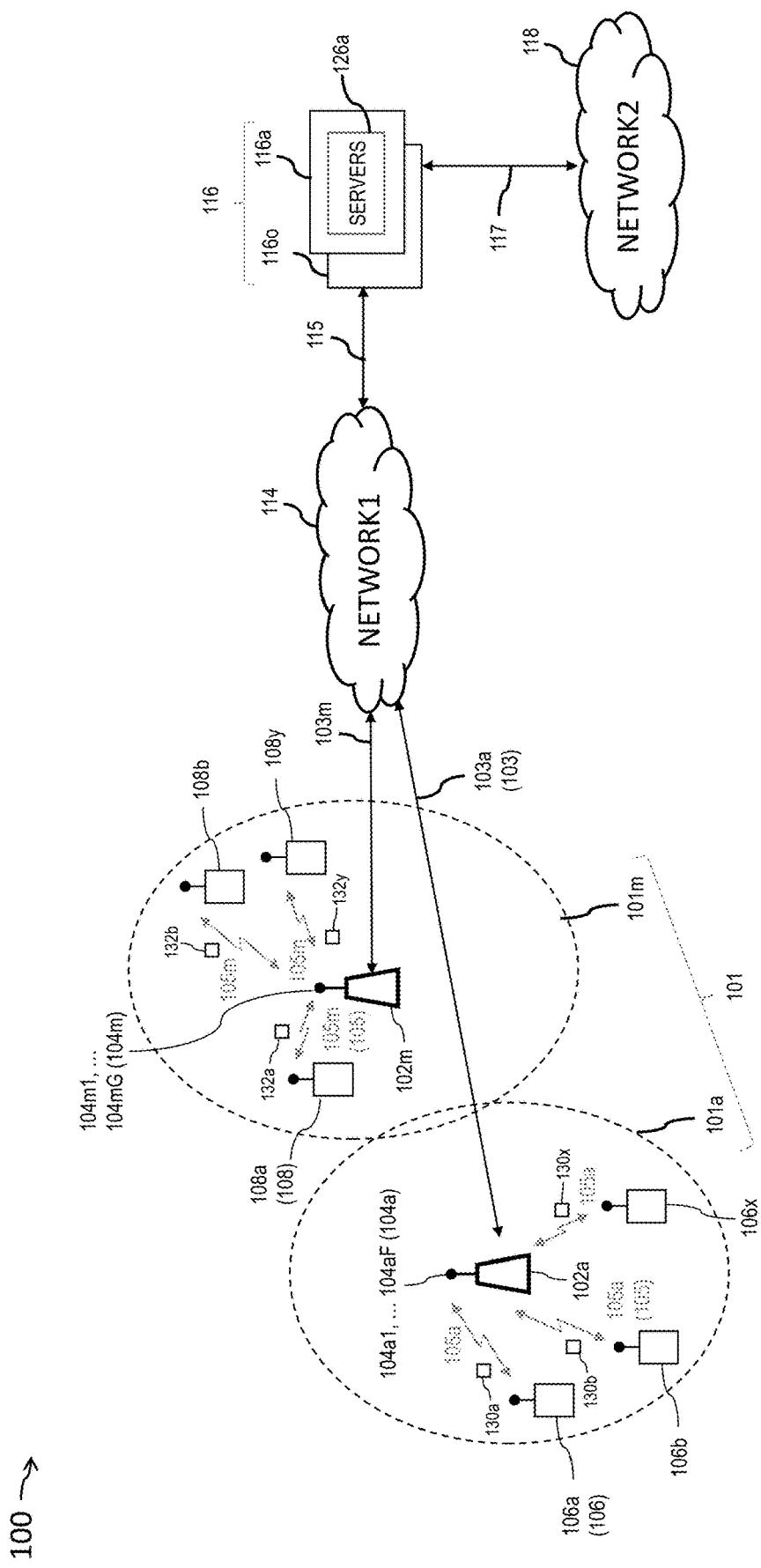
FIG. 1 is a block diagram of a communication system, in accordance with some embodiments.

The following disclosure provides different embodiments, or examples, for implementing features of the provided subject matter. Specific examples of components, materials, values, steps, arrangements, or the like, are described below to simplify the present disclosure. These are, of course, merely examples and are not limiting. Other components, materials, values, steps, arrangements, or the like, are contemplated. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

Network services are often provided by static or inflexible systems that are difficult to configure, scale, and deploy over various areas. Network service providers are challenged to provide network systems and/or network services that are capable of being flexibly constructed, scalable and diverse.

Some network systems use antennas that have a number of antenna parameters. Antenna parameters are periodically changed due to RF optimization, network upgrades, customer resolutions, etc. Some antenna parameters are changed by human personnel during field visits. An azimuth is an antenna parameter that directly affects the footprint of the radio frequency (RF) coverage. In some approaches, antennas that are not installed according to design will negatively affect the RF coverage provided by the antenna, thereby reducing the system efficiency of the network system, and increasing network operating cost.

FIG. 1 is a block diagram of a communication system 100 (hereinafter referred to as "system 100"), in accordance with some embodiments.

System 100 includes a set of cells 101 configured to transmit/receive a set of data 130 or 132 with a corresponding set of devices 106 or 108. System 100 further includes a set of nodes 102 coupled to a network 114 by a set of links 103, and the network 114 is further coupled to a set of devices 116 by a link 115. System 100 further includes a network 118 coupled to the set of devices 116 by a link 117. The set of devices 116 and the set of nodes 102 are coupled to each other by network 114. The set of devices 116 and the set of nodes 102 are configured to transfer data with each other by network 114.

The set of cells 101 corresponds to a cellular network. The set of cells 101 includes at least cell 101*a*, 101*b*, ..., 101*l* or 101*m*, where m is an integer corresponding to a number of cells in the set of cells 101. Each cell 101*a*, 101*b*, ..., 101*l* or 101*m* of the set of cells 101 includes a corresponding node 102*a*, 102*b*, ..., 102*l* or 102*m* of a set of nodes 102.

Each cell 101*a*, 101*b*, ..., 101*l* or 101*m* of the set of cells 101 further includes a corresponding set of devices 106 or 108. For ease of illustration, FIG. 1 shows two cells (e.g., cells 101*a* and 101*m*), and cell 101*a* or 101*m* includes a corresponding set of devices 106 and 108. However, each cell 101*b*, ..., 101*l* in the set of cells 101 includes a corresponding set of devices that are similar to the set of devices 106 or 108, and similar detailed description is omitted.

In some embodiments, at least one cell of the set of cells 101 corresponds to a macrocell, a microcell, a picocell, a femtocell, a small cell, or the like.

Other configurations, different types of cells or other number of cells in the set of cells 101 are within the scope of the present disclosure.

The set of nodes 102 includes at least node 102a, 102b, ..., 102l or 102m. Each node 102a, 102b, ..., 102l or 102m of the set of nodes 102 is located in a corresponding cell 101a, 101b, ..., 101l or 101m of the set of cells 101.

Each node 102a, 102b, ..., 102l or 102m of the set of nodes 102 is coupled to network 114 by a corresponding link 103a, 103b, ..., 103l or 103m of the set of links 103.

Each node 102a, 102b, ..., 102l or 102m of the set of nodes 102 includes a corresponding set of antennas 104a, 104b, ..., 104l or 104m.

Each corresponding node 102a, 102b, ..., 102l or 102m of the set of nodes 102 is configured to transmit/receive data with a corresponding set of users (e.g., set of devices 106, 108, etc.) by each corresponding set of antennas 104a, 104b, ..., 104l or 104m and each corresponding link 105a, 105b, ..., 105l or 105m of a set of links 105.

In some embodiments, at least one node of the set of nodes 102 corresponds to a base transceiver station (BTS), a NodeB, an Evolved NodeB (eNB), a Next Generation NodeB (gNB), or the like.

Other configurations, different types of nodes or other number of nodes in the set of nodes 102 are within the scope of the present disclosure. For example, in some embodiments, other number of nodes are located within at least one or more cells of the set of cells 101.

The set of links 103 includes at least one of link 103a, 103b, ..., 103l or 103m. In some embodiments, at least the set of links 103 is a wired link. In some embodiments, at least the set of links 103 is a wireless link. In some embodiments, at least the set of links 103 corresponds to any transmission medium type; e.g. fiber optic cabling, any wired cabling, and any wireless link type(s). In some embodiments, at least the set of links 103 corresponds to shielded, twisted-pair cabling, copper cabling, fiber optic cabling, and/or encrypted data links.

Other configurations or number of links in at least the set of links 103 are within the scope of the present disclosure. For example, while FIG. 1 shows a single link for each link of the set of links 103, one or more links within the set of links 103 include a plurality of links. In some embodiments, the set of links 103 is a single link.

The set of antennas 104a, 104b, ..., 104l or 104m is configured to transmit or receive signals with the corresponding set of users (e.g., set of devices 106, 108, etc.) by each corresponding link 105a, 105b, ..., 105l or 105m of a set of links 105.

The set of antennas 104a includes at least one antenna 104a1, 104b1, ..., 104e1 or 104aF, where F is an integer corresponding to a number of antennas in the set of antennas 104a.

The set of antennas 104m includes at least one antenna 104m1, 104m2, ..., 104mf or 104mG, where G is an integer corresponding to a number of antennas in the set of antennas 104G.

For brevity the details of the set of antennas 104b, ..., 104l are omitted, but are similar to at least the set of antennas 104a or 104m, and similar detailed description is omitted.

In some embodiments, at least one set of antennas in the set of antennas 104a, 104b, ..., 104l or 104m corresponds to a panel reflector antenna array. In some embodiments, at least one set of antennas in the set of antennas 104a, 104b, ..., 104l or 104m corresponds to a smart antenna array.

Other configurations or number of antennas in at least the set of antennas 104a, ..., 104m are within the scope of the present disclosure.

The set of devices 106 includes at least device 106a, 106b, ..., 106w or 106x, where x is an integer corresponding to a number of devices in the set of devices 106. In some embodiments, one or more devices in the set of devices 106 corresponds to a user equipment (UE), a computing device, a computing system or a server. In some embodiments, system 1600 (FIG. 16) is an embodiment of one or more devices 106a, 106b, ..., 106x of the set of devices 106.

In some embodiments, one or more of the devices of the set of devices 106 is a type of mobile terminal, fixed terminal, or portable terminal including a desktop computer, laptop computer, notebook computer, netbook computer, tablet computer, wearable circuitry, mobile handset, server, gaming console, or combinations thereof. In some embodiments, one or more of the devices of the set of devices 106 comprises a display by which a user interface is displayed. In some embodiments, the set of devices 106 corresponds to a server farm. In some embodiments, the set of devices 106 corresponds to a data center.

In some embodiments, one or more devices 106a, 106b, ..., 106w or 106x of the set of devices 106 is within cell 101a. In some embodiments, one or more devices 106a, 106b, ..., 106w or 106x of the set of devices 106 is configured to communicate with corresponding node 102a of the set of nodes 102 of the corresponding cell 101a of the set of cells 101 by a corresponding link 105a of a set of links 105.

In some embodiments, one or more devices 106a, 106b, ..., 106w or 106x of the set of devices 106 is configured to run or execute a corresponding application. In some embodiments, the one or more devices 106a, 106b, ..., 106w or 106x of the set of devices 106 is configured to send corresponding user data 130a, 130b, ..., 130w or 130x of a set of user data 130 to the corresponding node 102a of the set of nodes 102 of the corresponding cell 101a of the set of cells 101 by the corresponding link 105a of the set of links 105. In some embodiments, the one or more devices 106a, 106b, ..., 106w or 106x of the set of devices 106 is configured to send the corresponding user data 130a, 130b, ..., 130w or 130x of the set of user data 130 to the corresponding node 102a of the set of nodes 102 of the corresponding cell 101a of the set of cells 101 by the corresponding link 105a of the set of links 105 in response to corresponding instructions from the corresponding application that are being executed by the one or more devices 106a, 106b, ..., 106w or 106x of the set of devices 106.

Other configurations, different types of devices or other number of devices in the set of devices 106 are within the scope of the present disclosure.

The set of devices 108 includes at least device 108a, 108b, ..., 108x or 108y, where y is an integer corresponding to a number of devices in the set of devices 108. In some embodiments, one or more devices in the set of devices 108 corresponds to a UE, a computing device, a computing system or a server. In some embodiments, system 1600 (FIG. 16) is an embodiment of one or more devices 108a, 108b, ..., 108y of the set of devices 108.

In some embodiments, one or more of the devices of the set of devices 108 is a type of mobile terminal, fixed terminal, or portable terminal including a desktop computer, laptop computer, notebook computer, netbook computer, tablet computer, wearable circuitry, mobile handset, server, gaming console, or combinations thereof. In some embodiments, one or more of the devices of the set of devices 108 comprises a display by which a user interface is displayed. In some embodiments, the set of devices 108 corresponds to a server farm. In some embodiments, the set of devices 108 corresponds to a data center.

In some embodiments, one or more devices 108a, 108b, ..., 108x or 108y of the set of devices 108 is within cell 101m. In some embodiments, one or more devices 108a, 108b, ..., 108x or 108y of the set of devices 108 is configured to communicate with corresponding node 102m of the set of nodes 102 of the corresponding cell 101m of the set of cells 101 by a corresponding link 105m of the set of links 105.

In some embodiments, one or more devices 108a, 108b, ..., 108x or 108y of the set of devices 108 is configured to run or execute a corresponding application. In some embodiments, the one or more devices 108a, 108b, ..., 108x or 108y of the set of devices 108 is configured to send corresponding user data 132a, 132b, ..., 132x or 132y of a set of user data 132 to the corresponding node 102m of the set of nodes 102 of the corresponding cell 101m of the set of cells 101 by the corresponding link 105m of the set of links 105. In some embodiments, the one or more devices 108a, 108b, ..., 108x or 108y of the set of devices 108 is configured to send the corresponding user data 132a, 132b, ..., 132x or 132y of the set of user data 132 to the corresponding node 102m of the set of nodes 102 of the corresponding cell 101m of the set of cells 101 by the corresponding link 105m of the set of links 105 in response to corresponding instructions from the corresponding application that are being executed by the one or more devices 108a, 108b, ..., 108x or 108y of the set of devices 108.

Other configurations, different types of devices or other number of devices in the set of devices 108 are within the scope of the present disclosure.

The set of links includes at least link 105a, 105b, ..., 105l or 105m. In some embodiments, each link of the set of links 105 is configured to electromagnetically couple a corresponding node 102a, 102b, ..., 102l or 102m of the set of nodes 102 to a set of users (e.g., set of devices 106, 108, etc.) positioned within a corresponding cell 101a, 101b, ..., 101l or 101m of the set of cells 101.

For ease of illustration, FIG. 1 shows two nodes (e.g., nodes 102a and 102m), and each node 102a or 102m is electromagnetically coupled to a corresponding set of devices 106 or 108 by corresponding link 105a or 105m. However, each link of the set of links 105 within each corresponding cell in the set of cells 101 includes a plurality of links, and the plurality of links are not shown for ease of illustration. Stated differently, while FIG. 1 shows a single link for each link 105a, ..., 105m of the set of links 105, one or more of 105a, ..., 105m of the set of links 105 include a plurality of links.

In some embodiments, at least link 105a, 105b, ..., 105l or 105m of the set of links 105 is a wireless link that includes an uplink and a downlink. In some embodiments, at least one or more of link 105a, 105b, ..., 105l or 105m of the set of links 105 is based on technologies, such as code division multiple access (CDMA), wideband CDMA (WCDMA), time division multiple access (TDMA), frequency division multiple access (FDMA), single carrier frequency division multiple access (SC-FDMA), Orthogonal Frequency Division Multiplexing (OFDM), Orthogonal Frequency Division Multiple Access (OFDMA), time division duplexing (TDD), frequency division duplexing (FDD), Bluetooth, Infrared (IR), or the like, or other protocols that may be used in a wireless communications network or a wired data communications network.

Accordingly, the exemplary illustrations provided herein are not intended to limit the embodiments of the disclosure and are merely to aid in the description of aspects of the embodiments of the disclosure.

Other configurations or number of links in at least the set of links 105 are within the scope of the present disclosure.

The set of devices 116 includes at least device 116a, 116b, ..., 116n or 116o, where o is an integer corresponding to a number of devices in the set of devices 116.

In some embodiments, one or more devices in the set of devices 116 corresponds to a computing device, computing system or a server. In some embodiments, the set of devices 116 includes a set of servers 126. In some embodiments, each device 116a, 116b, ..., 116n or 116o in the set of devices 116 includes a corresponding server 126a, 126b, ..., 126n or 126o of a set of servers 126.

In some embodiments, system 1600 (FIG. 16) is an embodiment of one or more devices 116a, 116b, ..., 116n or 116o of the set of devices 116. In some embodiments, system 1600 (FIG. 16) is an embodiment of one or more servers 126a, 126b, ..., 126n or 126o of the set of servers 126. In some embodiments, the set of devices 116 corresponds to a server farm. In some embodiments, the set of devices 116 corresponds to a data center.

Other configurations, different types of devices or other number of sets in the set of devices 116 or the set of servers 126 are within the scope of the present disclosure.

In some embodiments, network 114 corresponds to at least one of a wired or wireless network. In some embodiments, network 114 corresponds to at least one of a radio access network (RAN), a core network, a local area network (LAN), a wide area network (WAN), a metropolitan area network (MAN), an internet area network (IAN), a campus area network (CAN), a virtual private networks (VPN) or combinations thereof. In some embodiments, network 114 corresponds to the Internet.

In some embodiments, network 118 corresponds to at least one of a wired or wireless network. In some embodiments, network 118 corresponds to at least one of a RAN, a LAN, a WAN, a MAN, an IAN, a CAN, a VPN or combinations thereof. In some embodiments, network 118 corresponds to the Internet.

Other configurations, number of networks or different types of network in at least network 114 or 118 are within the scope of the present disclosure.

In some embodiments, at least link 115 or link 117 is a wired link. In some embodiments, at least link 115 or link 117 is a wireless link. In some embodiments, at least link 115 or link 117 corresponds to any transmission medium type; e.g. fiber optic cabling, any wired cabling, and any wireless link type(s). In some embodiments, at least link 115 or link 117 corresponds to shielded, twisted-pair cabling, copper cabling, fiber optic cabling, and/or encrypted data links.

In some embodiments, at least the set of links 103, link 115 or link 117 is based on technologies, such as CDMA, WCDMA, TDMA, FDMA, SC-FDMA, OFDM, OFDMA, TDD, FDD, Bluetooth, IR or the like, or other protocols that may be used in a wireless communications network or a wired data communications network. Accordingly, the exemplary illustrations provided herein are not intended to limit the embodiments of the disclosure and are merely to aid in the description of aspects of the embodiments of the disclosure.

Other configurations or number of links in at least the set of links 103, link 115 or link 117 are within the scope of the present disclosure. For example, while FIG. 1 shows a single link for each of link 115 or link 117, one or more of link 115 or link 117 include a plurality of links.

In some embodiments, by using system 100, geolocation data of users of the set of cells 101 can be passively monitored by the set of servers 126 to automatically determine the location of one or more cells within the set of cells 101 that have one or more disoriented cells, or include disoriented cells with cross-feeders, sector swaps or cyclic swaps. In some embodiments, a disoriented cell includes a cell that has one or more antennas with a deployed azimuth value different from a planned azimuth value. In some embodiments, the disoriented cell is not deployed according to a planned azimuth value, but is deployed with the deployed azimuth value. In some embodiments, disoriented cells can result in RF coverage different than planned, thereby resulting in reduced network efficiency and operation, and increasing network cost.

In some embodiments, a cross-feeder is a disoriented cell that has a first sector with a corresponding feeder cable (e.g., feeder cable 1550*a* of FIG. 15D) that is swapped with a feeder cable (e.g., feeder cable 1550*b* of FIG. 15D) of a second sector. In some embodiments, cross-feeders can result in at least one of poor uplink signal strength, a poor performance of handover, or a greater degree of RF interference, thereby resulting in reduced network efficiency and operation, and increasing network cost.

In some embodiments, a sector swap is a disoriented cell that has a first sector with a corresponding deployed azimuth that is swapped with a deployed azimuth of a second sector.

In some embodiments, disoriented cells with sector swaps can result in RF coverage different than planned, thereby resulting in reduced network efficiency and operation, and increasing network cost.

In some embodiments, a cyclic swap is a disoriented cell that has a first sector with a corresponding deployed azimuth that is equal to a planned azimuth of a second sector, and the second sector has a corresponding deployed azimuth that is equal to a planned azimuth of a third sector, and the third sector has a corresponding deployed azimuth that is equal to a planned azimuth of the first sector. Other numbers of sectors for a disoriented cell that has a cyclic swap of the first set of cyclic swaps are within the scope of the present disclosure.

In some embodiments, disoriented cells with cyclic swaps can result in RF coverage different than planned, thereby resulting in reduced network efficiency and operation, and increasing network cost.

In some embodiments, the set of servers 126 are configured to automatically determine the locations of disoriented cells or disoriented cells that include cross-feeders, sector swaps or cyclic swaps within system 100 from a single location, without physically deploying human personnel to each cell site within system 100 to determine which cells are disoriented.

In some embodiments, after the set of servers 126 determine the location of the disoriented cells or disoriented cells that include cross-feeders, sector swaps or cyclic swaps, human personnel are physically deployed to the location of the disoriented cells or disoriented cells that include cross-feeders, sector swaps or cyclic swaps, where the deployed antenna azimuth of the disoriented cell, sector swaps or cyclic swaps or the feeder cables of cross-feeder cells can be corrected, thereby resulting in optimized RF coverage, increased network efficiency and operation, and lowering network operating costs and manpower costs compared to other approaches where network operators initiate field visits on a regular basis and use tools to determine if cells are disoriented, or include sector swaps or cyclic swaps, and then correcting each azimuth mismatch for each of the disoriented cells, sector swaps or cyclic swaps, and becomes a bottleneck for RF optimization activities. Furthermore, in these other approaches, azimuth mismatch can be corrected at a single cell site by an antenna azimuth system (AAS) which corresponds to an extra device on the antenna thereby increasing costs for each cell site.

Other configurations or number of elements in system 100 are within the scope of the present disclosure.

Figure 2A:
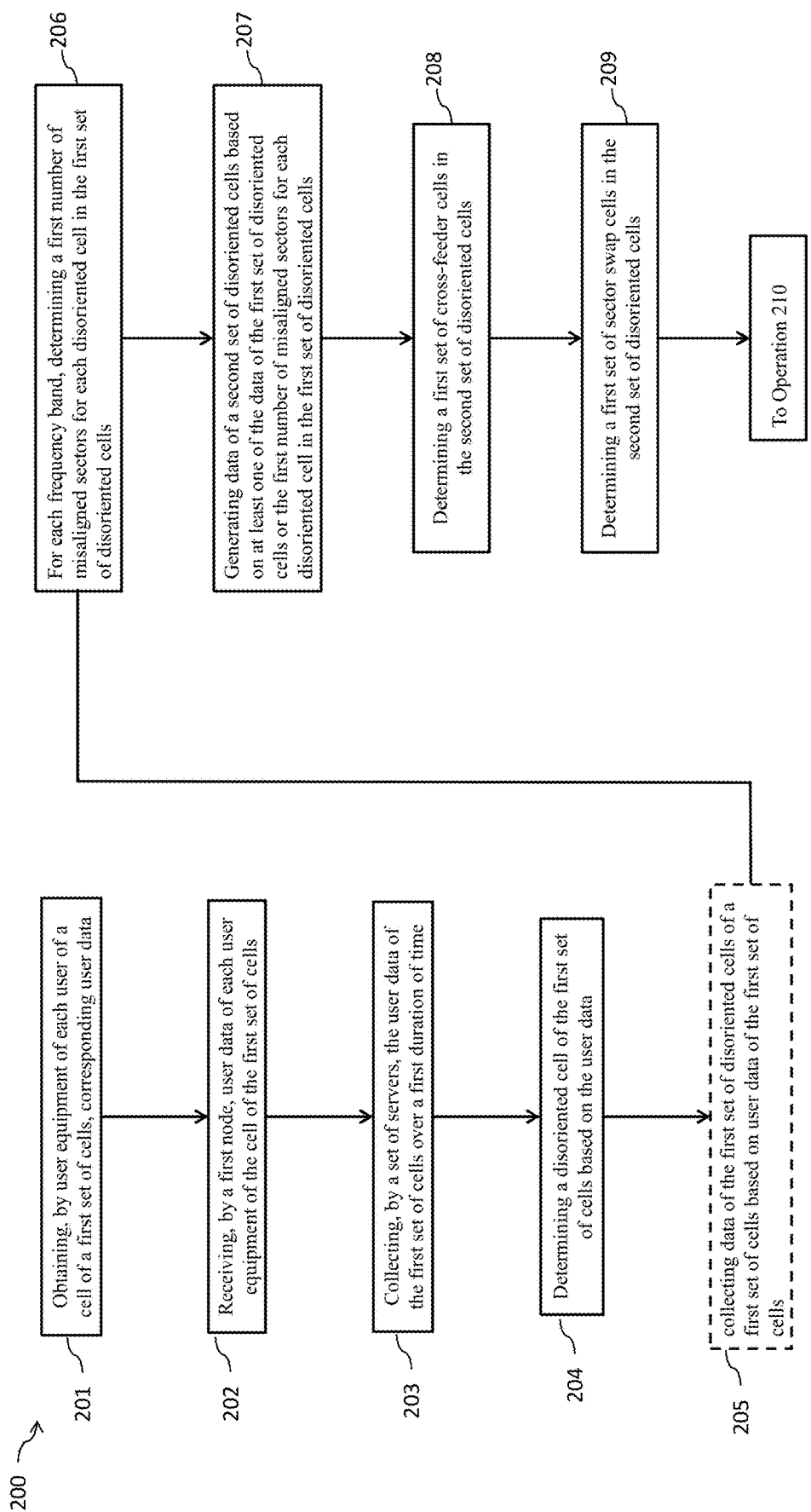
FIGS. 2A-2B are a flowchart of a method, in accordance with some embodiments.
Figure 2B:
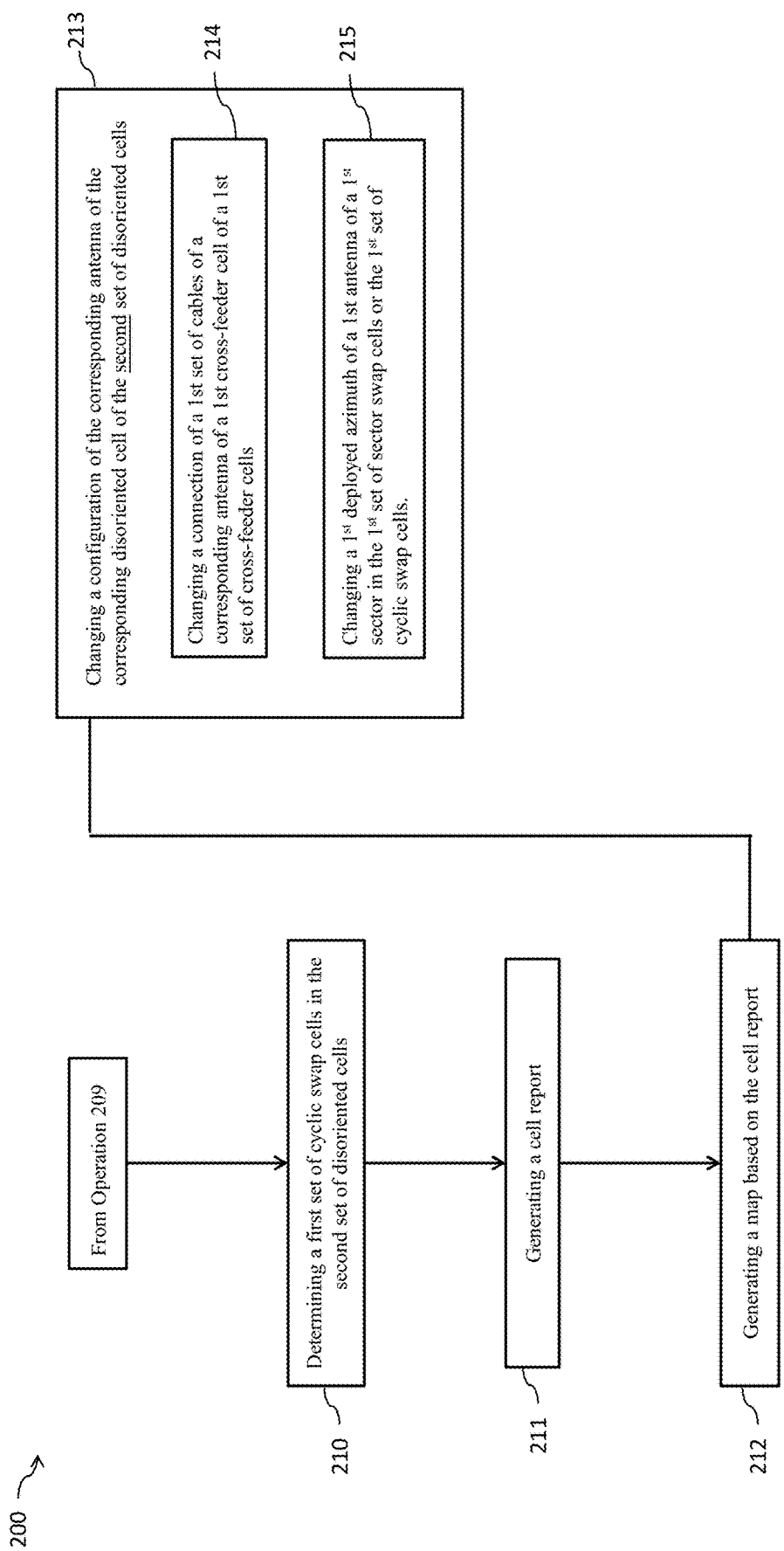

FIGS. 2A-2B are a flowchart of a method 200, in accordance with some embodiments.

In some embodiments, method 200 is a method of determining a disoriented cell and changing an azimuth of the disoriented cell. In some embodiments, at least portions of method 200 are performed by at least one or more of the set of devices 106 and 108, the set of nodes 204, or the set of servers 126.

In some embodiments, FIGS. 2A-2B are a flowchart of a method of operating system 100 of FIG. 1, and similar detailed description is therefore omitted. It is understood that additional operations may be performed before, during, and/or after the method 200 depicted in FIGS. 2A-2B, and that some other operations may only be briefly described herein. In some embodiments, other order of operations of method 200 is within the scope of the present disclosure. In some embodiments, one or more operations of method 200 are not performed.

Method 200 includes exemplary operations, but the operations are not necessarily performed in the order shown. Operations may be added, replaced, changed order, and/or eliminated as appropriate, in accordance with the spirit and scope of disclosed embodiments. It is understood that method 200 utilizes features of one or more of system 100.

In operation 201 of method 200, user equipment of each user of a cell of a first set of cells is configured to obtain corresponding user data. In some embodiments, each user of the cell of the first set of cells is part of a set of users. In some embodiments, the user data is part of a set of user data. In some embodiments, the set of user data includes at least one of the set of user data 130 or 132.

In some embodiments, user equipment of one or more users in the set of users is configured to run or execute a corresponding application, and the corresponding application instructs the corresponding user equipment to fetch the corresponding user data.

In some embodiments, operation 201 further includes the user equipment of one or more users in the set of users being configured to send the corresponding user data to a corresponding node of a first set of nodes of the corresponding cell of the first of cells by a corresponding link of the set of links in response to corresponding instructions from the corresponding application that are being executed by the user equipment of one or more users in the set of users.

In some embodiments, the user data includes at least one of received signal strength (e.g., signal to noise ratio) of the set of users, geolocation data of the set of users, or a cell identifier of a corresponding cell of the first set of cells configured to serve the set of users. In some embodiments, the geolocation data of each user of the set of users includes a latitude of the user and a longitude of the user.

In some embodiments, the user equipment includes at least the set of equipment 106 or 108. In some embodiments, the first set of cells corresponds to at least the set of cells 101.

In some embodiments, the user data includes at least the set of equipment 106 or 108.

In some embodiments, the link of the set of links includes at least one link of the set of links 105. In some embodiments, the first node includes at least one node of the set of nodes 102.

In operation 202 of method 200, user data of each user equipment of the cell of the first set of cells is received by a first node. In some embodiments, the first node includes at least one node of the set of nodes 102.

In operation 203 of method 200, a set of servers 126 is configured to collect the user data of the first set of cells over a first duration of time. In some embodiments, the first duration of time corresponds to a weekly basis. In some embodiments, operation 203 is performed for a set of cells other than the first set of cells. In some embodiments, the set of servers 126 is configured to collect the user data of the first set of cells from each node of the set of nodes 102.

In some embodiments, the first duration of time corresponds to a daily basis. In some embodiments, the first duration of time corresponds to an hourly basis. In some embodiments, the first duration of time corresponds to a real-time basis. Other time periods for the first duration of time are within the scope of the present disclosure for the automatic polling requests.

In operation 204 of method 200, a disoriented cell of the first set of cells is determined based on the user data. In some embodiments, the set of servers 126 is configured to determine the disoriented cell of the first set of cells.

Figure 5:
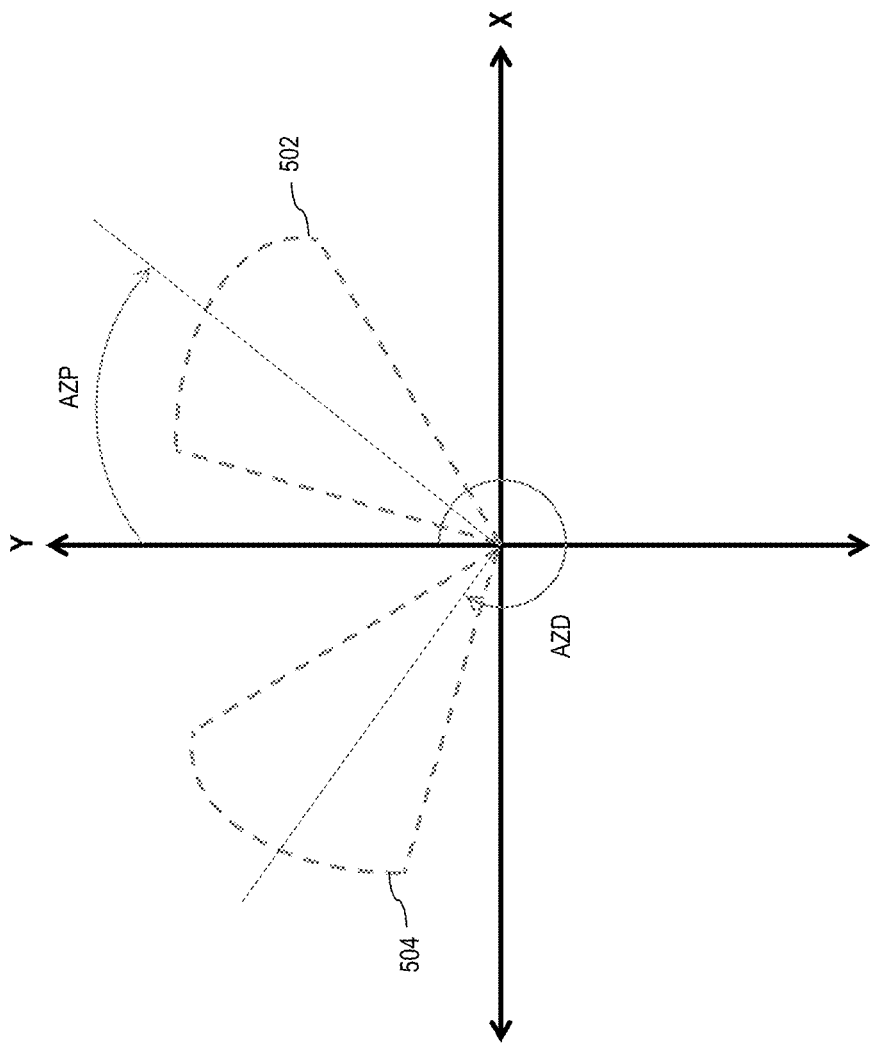
FIG. 5 is a diagram of a disoriented cell, in accordance with some embodiments.
Figure 14A:
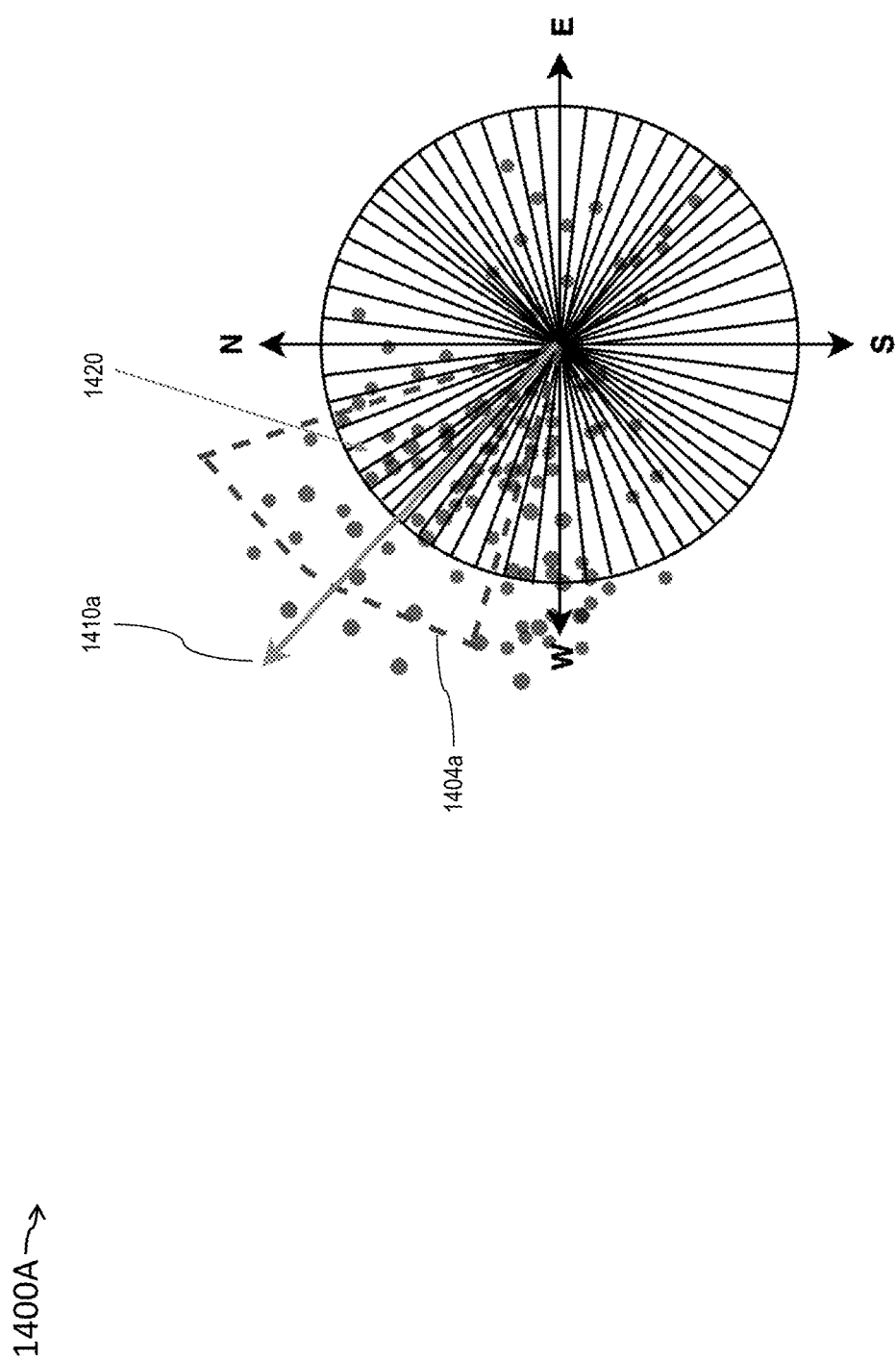
FIGS. 14A-14B are corresponding diagrams of corresponding maps, in accordance with some embodiments.
Figure 14B:
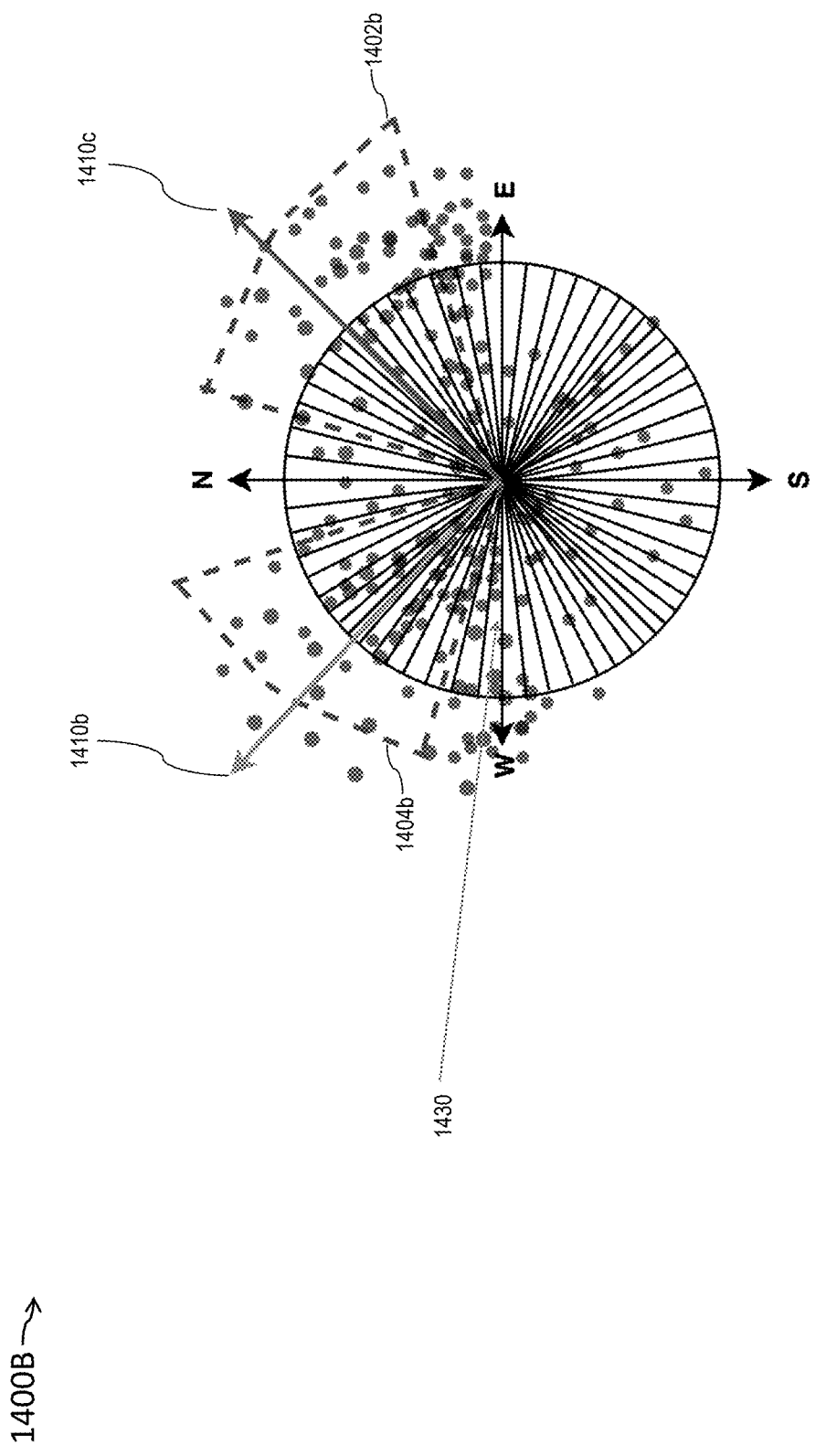

In some embodiments, the disoriented cell includes at least disoriented cell 500 of FIG. 5 or disoriented cell 1404b of FIG. 14B.

In operation 205 of method 200, data of the first set of disoriented cells of the first set of cells is collected or fetched.

In some embodiments, the data of the first set of disoriented cells of the first set of cells is collected or fetched includes retrieving the data of the first set of disoriented cells from a database, similar to system 1600. In some embodiments, the data of the first set of disoriented cells of the first set of cells is collected or fetched includes retrieving the data of the first set of disoriented cells from the set of servers 126.

In some embodiments, the set of servers 126 is configured to perform operation 205.

In operation 206 of method 200, a first number of misaligned sectors for each disoriented cell in the first set of disoriented cells is determined.

In some embodiments, a misaligned sector corresponds to a sector in a set of sectors that has a disoriented cell. In some embodiments, the misaligned sector is a sector of a disoriented cell where the deployed sector (e.g., deployed sector 504 of FIG. 5) has a deployed azimuth (e.g., deployed azimuth AZD) that is misaligned or different from a planned azimuth (e.g, planned azimuth AZP) of a planned sector (e.g., planned sector 502).

In some embodiments, the term "sector" and "cell" may be used interchangeably for brevity.

In some embodiments, operation 206 is performed for each frequency band in the first set of cells.

In some embodiments, the set of servers 126 is configured to perform operation 206.

In operation 207 of method 200, data of a second set of disoriented cells is generated based on at least one of the data of the first set of disoriented cells or the first number of misaligned sectors for each disoriented cell in the first set of disoriented cells.

In some embodiments, each cell in the second set of disoriented cells has two or more misaligned sectors in the corresponding first number of misaligned sectors.

In some embodiments, operation 207 corresponds to one or more filtering operations to filter the cells in the first set of disoriented cells having a corresponding single misaligned sector from the cells in the first set of disoriented cells having two or more corresponding misaligned sectors.

In some embodiments, the set of servers 126 is configured to perform operation 207.

Figure 8:
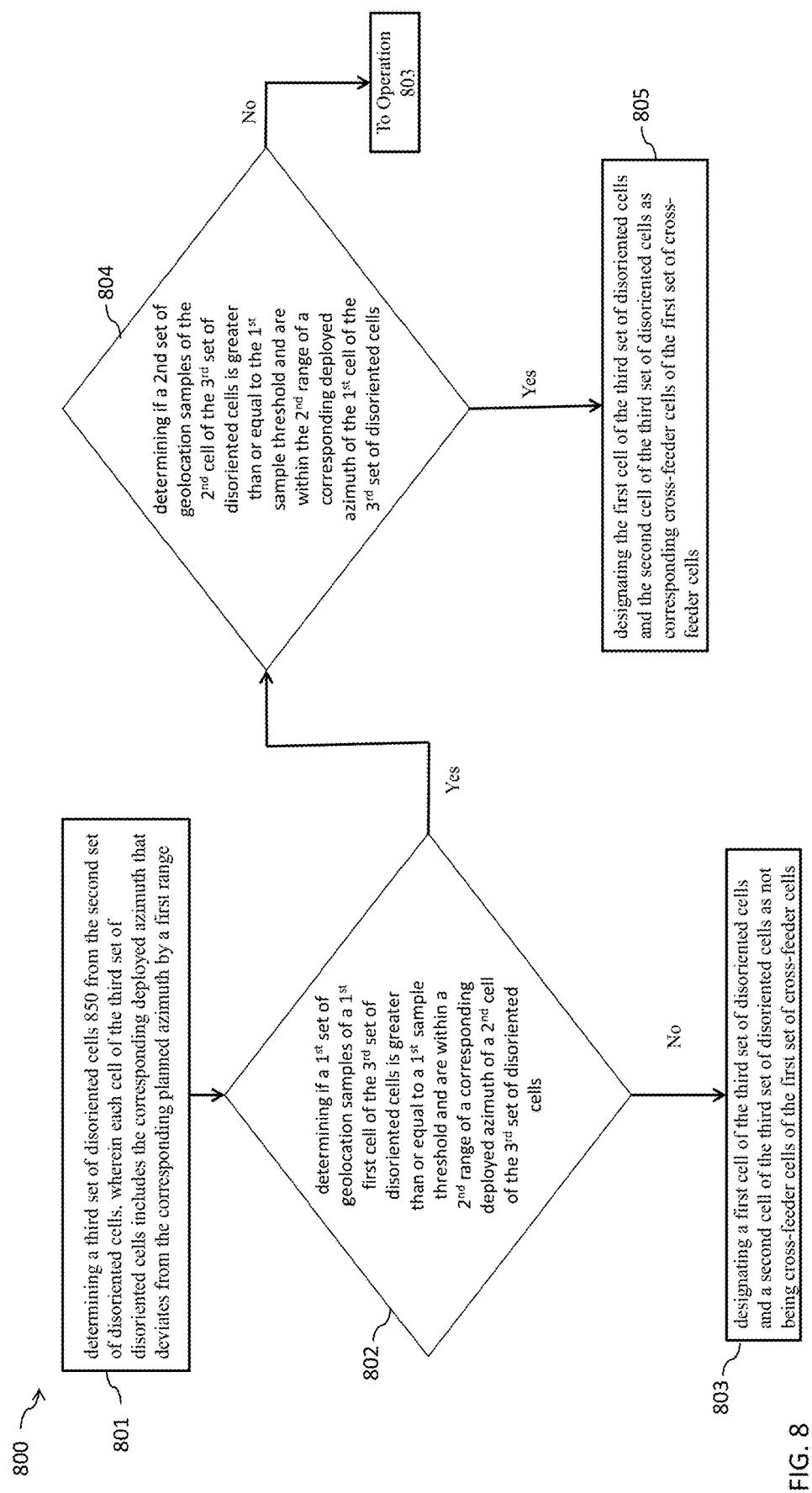
FIG. 8 is a flowchart of a method, in accordance with some embodiments.

In operation 208 of method 200, a first set of cross-feeder cells in the second set of disoriented cells is determined. In some embodiments, method 800 of FIG. 8 is an embodiment of operation 208, and similar detailed description is therefore omitted.

In some embodiments, a cross-feeder cell is a disoriented cell that has a first sector with a corresponding feeder cable (e.g., feeder cable 1550a of FIG. 15D) that is swapped with a feeder cable (e.g., feeder cable 1550b of FIG. 15D) of a second sector.

In some embodiments, operation 208 is performed for each cell in the second set of disoriented cells.

In some embodiments, the set of servers 126 is configured to perform operation 208.

Figure 9:
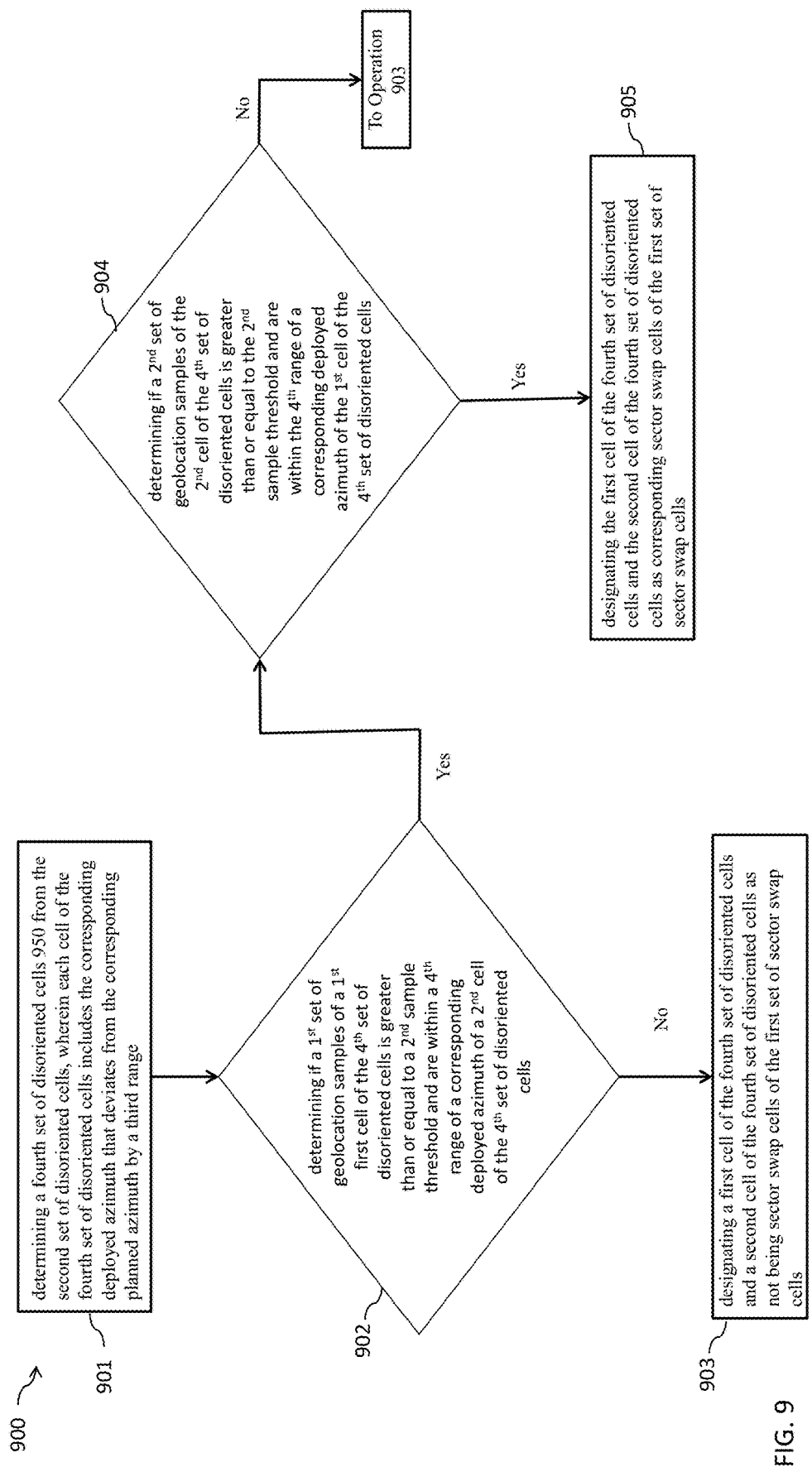
FIG. 9 is a flowchart of a method, in accordance with some embodiments.

In operation 209 of method 200, a first set of sector swap cells in the second set of disoriented cells is determined. In some embodiments, method 900 of FIG. 9 is an embodiment of operation 209, and similar detailed description is therefore omitted.

In some embodiments, a sector swap is a disoriented cell that has a first sector with a corresponding deployed azimuth that is swapped with a deployed azimuth of a second sector.

In some embodiments, operation 209 is performed for each cell in the second set of disoriented cells.

In some embodiments, the set of servers 126 is configured to perform operation 209.

Figure 10A:
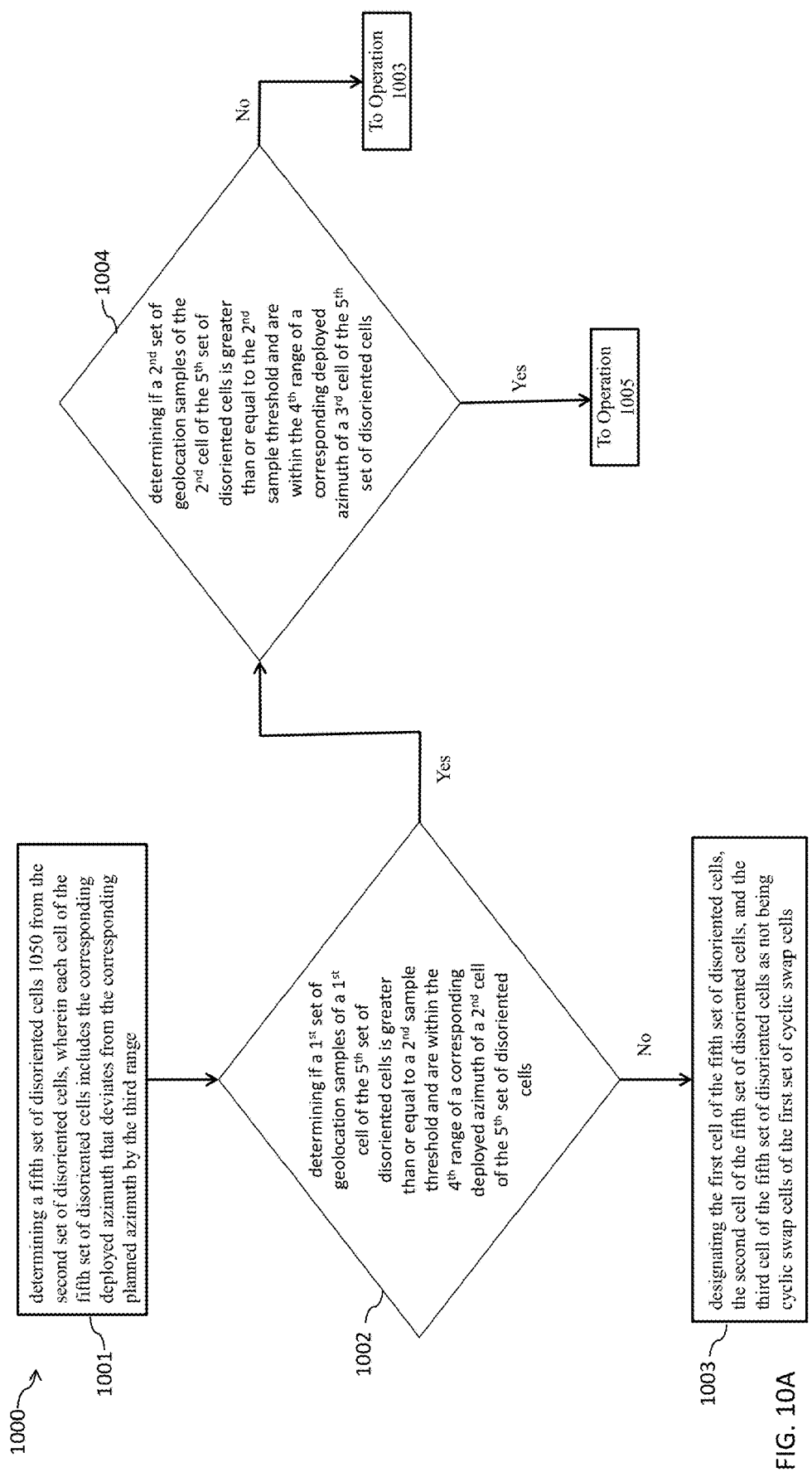
FIGS. 10A-10B are a flowchart of a method, in accordance with some embodiments.
Figure 10B:
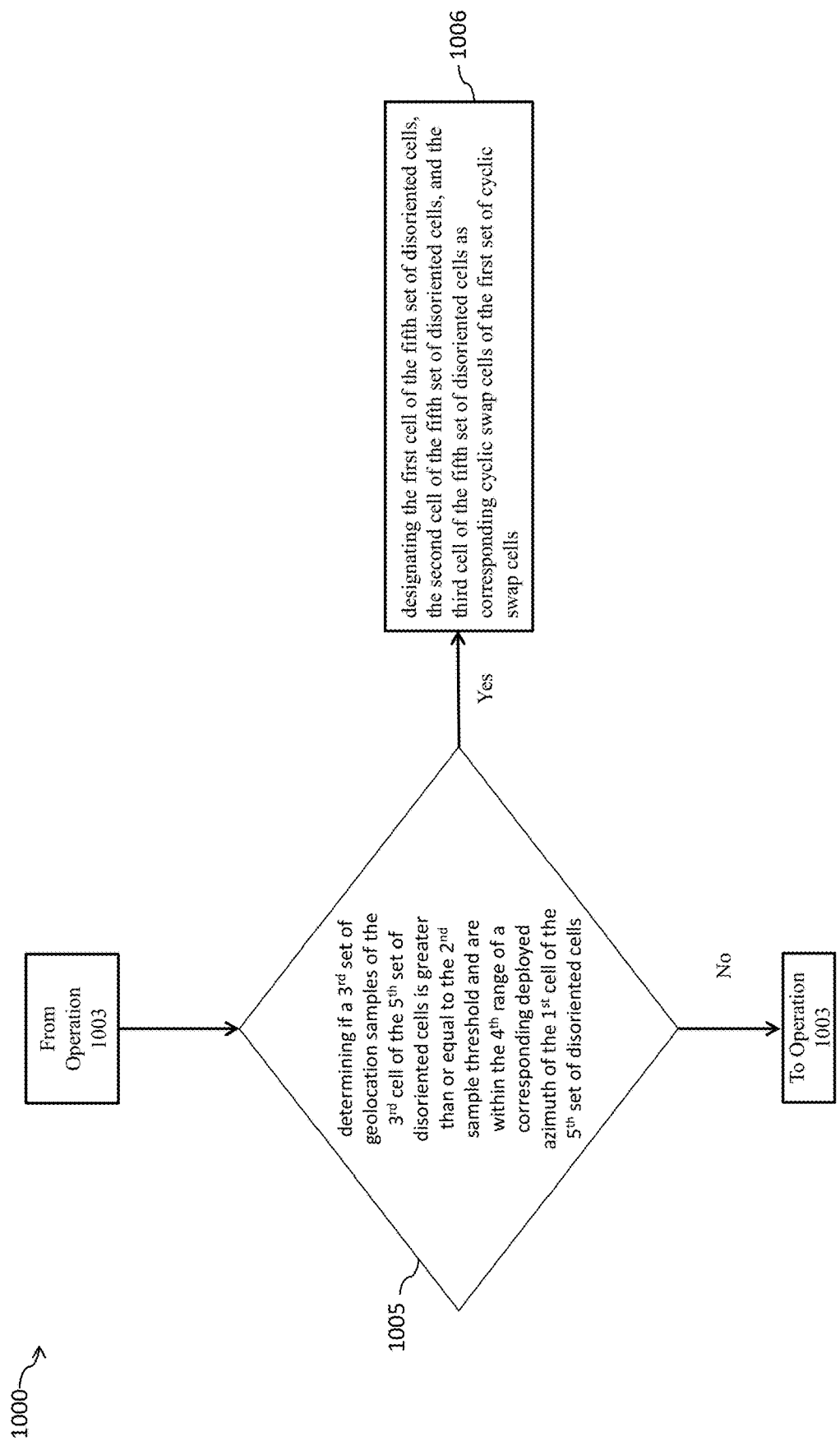

In operation 210 of method 200, a first set of cyclic swap cells in the second set of disoriented cells is determined. In some embodiments, method 1000 of FIGS. 10A-10B is an embodiment of operation 210, and similar detailed description is therefore omitted.

In some embodiments, a cyclic swap is a disoriented cell that has a first sector with a corresponding deployed azimuth that is equal to a planned azimuth of a second sector, and the second sector has a corresponding deployed azimuth that is equal to a planned azimuth of a third sector, and the third sector has a corresponding deployed azimuth that is equal to a planned azimuth of the first sector. Other numbers of sectors for a disoriented cell that has a cyclic swap of the first set of cyclic swaps are within the scope of the present disclosure.

In some embodiments, operation 210 is performed for each cell in the second set of disoriented cells.

In some embodiments, the set of servers 126 is configured to perform operation 210.

In operation 211 of method 200, a cell report is generated. In some embodiments, the cell report is generated by the set of servers 126. In some embodiments, the cell report is generated by other devices, for example devices that are not shown in FIG. 1. In some embodiments, the cell report includes a cell report 300 of FIG. 3. In some embodiments, the cell report is a disoriented cell report.

In some embodiments, the cell report includes identification of disoriented cells, alignment properties of disoriented cells including at least one or more of cell site name, cell name, frequency band, physical parameters, center angle of the planned azimuth, center angle of the deployed azimuth, azimuth deviation between the planned azimuth and the deployed azimuth, the first set of cross-feeders, the first set of sector swaps, the first set of cyclic swaps, cell type, cell status or sector swap type and remarks. In some embodiments, the cell report further includes a comparison of the alignment of disoriented cells based on current database values and field measurement values.

In operation 212 of method 200, a map based on the cell report is generated. In some embodiments, the map displays graphical details of the cell report. In some embodiments, the map is generated by the set of servers 126. In some embodiments, the map is generated by other devices, for example devices that are not shown in FIG. 1.

In some embodiments, at least one of the disoriented cells, the first set of cross-feeders, the first set of sector swaps, the first set of cyclic swaps, cell type, cell status or sector swap type and remarks are visible within the map. In some embodiments, at least one of the disoriented cells, the first set of cross-feeders, the first set of sector swaps, the first set of cyclic swaps, cell type, cell status or sector swap type and remarks are visible within the map for specific frequency bands and data availability.

In some embodiments, the map includes visualization of statistics. In some embodiments, the map includes a tabular representation for various geographies including (PAN, Region, Cluster, etc). In some embodiments, geo-located samples of user data are displayed in the map.

In some embodiments, the map includes identification of disoriented cells, alignment properties of disoriented cells including at least one or more of cell site name, cell name, frequency band, physical parameters, center angle of the planned azimuth, center angle of the deployed azimuth, azimuth deviation between the planned azimuth and the deployed azimuth, the first set of cross-feeders, the first set of sector swaps, the first set of cyclic swaps, cell type, cell status or sector swap type and remarks will be visible.

In operation 213 of method 200, a configuration of the corresponding antenna of the corresponding disoriented cell of the second set of disoriented cells is changed.

In some embodiments, the configuration of the corresponding antenna of the corresponding disoriented cell of the second set of disoriented cells that is changed includes changing the deployed azimuth value of one or more antennas in the disoriented cell. In some embodiments, the antenna of the disoriented cell includes one or more antennas in the set of antennas 104a, . . . , 104m. In some embodiments, operation 213 is performed for each disoriented cell that is determined by operation 204.

In some embodiments, the configuration of the corresponding antenna of the corresponding disoriented cell of the second set of disoriented cells that is changed includes changing a connection of a first set of cables (e.g., feeder cable 1550a or 1550b of FIG. 15D) of a corresponding antenna of a first cross-feeder cell of a first set of cross-feeder cells.

In some embodiments, operation 213 is performed by a human user. In some embodiments, the performance of operation 213 is automated, and operation 213 is performed by a system such as system 1600 of FIG. 16.

In some embodiments, operation 213 includes at least one of operation 214 or operation 215.

In operation 214 of method 200, a connection of a first set of cables of a corresponding antenna of a first cross-feeder cell of a first set of cross-feeder cells is changed.

In some embodiments, operation 214 includes swapping a first connection and a second connection with each other, where the first connection is between a first port (e.g., port 1540b) and a first set of cables (e.g., feeder cable 1550a of FIG. 15D) of a first antenna (e.g., antenna 1560a) of a first cross-feeder cell, and the second connection is between a second port (e.g., port 1540a) and a second set of cables (e.g., feeder cable 1550b of FIG. 15D) of a second antenna (e.g., antenna 1560b) of the first cross-feeder cell.

Stated differently, the first port (e.g., port 1540b) should be connected to the second antenna (e.g., antenna 1560b), and the second port (e.g., port 1540a) should be connected to the first antenna (e.g., antenna 1560a), but the first set of cables (e.g., feeder cable 1550a of FIG. 15D) are swapped with the second set of cables (e.g., feeder cable 1550b of FIG. 15D); operation 214 includes swapping the first set of cables (e.g., feeder cable 1550a of FIG. 15D) and the second set of cables (e.g., feeder cable 1550b of FIG. 15D) with each other, in accordance with some embodiments.

Figure 15D:
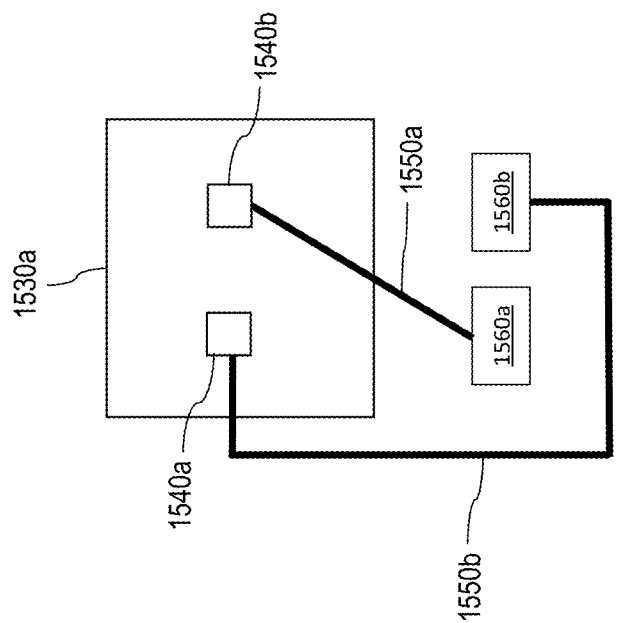
FIGS. 15C-15D are corresponding diagrams of corresponding systems, in accordance with some embodiments.
Figure 15C:
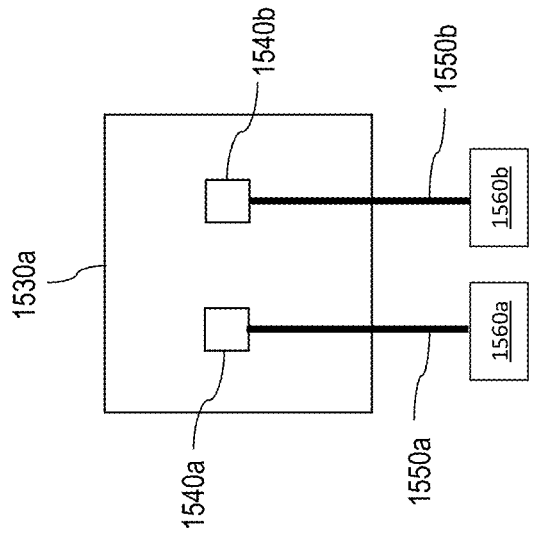

In some embodiments, after operation 214, as shown in FIG. 15C, the first connection is between the second port (e.g., port 1540a) and the first set of cables (e.g., feeder cable 1550a of FIG. 15C) of the first antenna (e.g., antenna 1560a) of a first cross-feeder cell, and the second connection is between the first port (e.g., port 1540b) and the second set of cables (e.g., feeder cable 1550b of FIG. 15C) of the second antenna (e.g., antenna 1560b) of the first cross-feeder cell.

In some embodiments, operation 214 is performed by a human user. In some embodiments, the performance of operation 214 is automated, and operation 214 is performed by a system such as system 1600 of FIG. 16.

In operation 215 of method 200, a first deployed azimuth of a first antenna of a first sector in the first set of sector swap cells or the first set of cyclic swap cells is changed.

In some embodiments, operation 215 includes changing a first deployed azimuth of a first antenna of a first sector in the first set of sector swap cells with a second deployed azimuth of a second antenna of a second sector in the first set of sector swap cells with each other.

In some embodiments, operation 215 includes changing a first deployed azimuth of a first antenna of a first sector in the first set of cyclic swap cells to be equal to a first planned azimuth of the first antenna of a first sector in the first set of cyclic swap cells, changing a second deployed azimuth of a second antenna of a second sector in the first set of cyclic swap cells to be equal to a second planned azimuth of the second antenna of the second sector in the first set of cyclic swap cells, changing a third deployed azimuth of a third antenna of a third sector in the first set of cyclic swap cells to be equal to a third planned azimuth of the third antenna of the third sector in the first set of cyclic swap cells.

In some embodiments, operation 215 includes changing the deployed azimuth of the antenna is changed to be equal to the planned azimuth of the antenna of the disoriented cell.

In some embodiments, operation 215 is performed by a human user. In some embodiments, the performance of operation 215 is automated, and operation 215 is performed by a system such as system 1600 of FIG. 16.

In some embodiments, by using method 200, geolocation data of users of the set of cells 101 can be passively monitored by the set of servers 126 to automatically determine the location of disoriented cells, the first set of cross-feeders, the first set of sector swaps and the first set of cyclic swaps, within a cellular network from a single location. In some embodiments, by automatically determining disoriented cells, the first set of cross-feeders, the first set of sector swaps, and the first set of cyclic swaps, within the cellular network from a single location (e.g., the set of servers 126), the present disclosure does not physically deploy human personnel by field visits to each cell site within the cellular network on a periodic basis to determine which cells are disoriented or include cross-feeders, sector swaps or cyclic swaps, compared to other approaches.

In some embodiments, after the location of the disoriented cells is determined in operation 204, the location of the first set of cross-feeders in operation 208, the first set of sector swaps in operation 209 or the first set of cyclic swaps in operation 210, human personnel can be physically deployed to the location of the disoriented cells, the first set of cross-feeders, the first set of sector swaps, the first set of cyclic swaps, in operations 213-215, where the disoriented cell, cross-feeders, sector swaps and cyclic swaps can be corrected, thereby resulting in optimized RF coverage, increased network efficiency and operation, and lowering network operating costs and manpower costs compared to other approaches where network operators initiate field visits on a regular basis and use tools to determine if cells are disoriented, or include sector swaps or cyclic swaps, and then correcting each azimuth mismatch for each of the disoriented cells, sector swaps or cyclic swaps, and becomes a bottleneck for RF optimization activities. Furthermore, in these other approaches, azimuth mismatch can be corrected at a single cell site by AAS which corresponds to an extra device on the antenna thereby increasing costs for each cell site.

FIG. 3 is a diagram of a cell report 300, in accordance with some embodiments.

In some embodiments, cell report 300 is generated by operation 211 of method 200.

In some embodiments, cell report 300 is viewable by a user by way of a user interface (e.g., user interface 1624 in FIG. 16), and is displayed by system 1600.

In some embodiments, cell report 300 is a disoriented cell report. The cell report 300 is shown as a table. The cell report 300 is a listing of each cell of the set of cells 101 of system 100 and at least method 200.

The cell report 300 is a listing of each cell of the set of cells 101 of system 100, and specifies whether the cell is a disoriented cell or is not a disoriented cell (e.g., normal). In some embodiments, the cell report 300 further specifies whether the disoriented cell includes cross-feeders, sector swaps or cyclic swaps.

With the exception of row1, each row in cell report 300 is an instance object, and is created by the set of servers 126, and is updated each time during execution of method 200 of FIGS. 2A-2B.

Cell report 300 includes a list of cell identifiers (IDs) of the cells, a cell site name for the corresponding cell, a cell location for the corresponding cell, the planned azimuth values for the corresponding cell, the deployed azimuth values for the corresponding cell, and the cell status for the corresponding cell.

In some embodiments, the cell report 300 further includes at least one of a frequency band of the corresponding cell or an azimuth deviation of the corresponding cell.

Cell report 300 comprises 6 rows and 6 columns. Column 1 comprises cell identifiers (IDs) of the cell. In some embodiments, the cell IDs of the cell report 300 are useable to identify the corresponding cell. Column 2 comprises a cell name of each corresponding cell in column 1. Column 3 comprises a cell location of each corresponding cell in column 1. Column 4 comprises a planned azimuth of each corresponding cell in column 1. Column 5 comprises a deployed azimuth of each corresponding cell in column 1. Column 6 comprises a status of each corresponding cell in column 1. For example, column 6 specifies whether the corresponding cell is disoriented or non-disoriented (e.g., Normal). In some embodiments, column 6 specifies whether the corresponding disoriented cell includes cross-feeders, sector swaps or cyclic swaps. Row 1 corresponds to the title fields of cell report 300.

Each entry in column 1 has a corresponding entry in column 2, a corresponding entry in column 3, a corresponding entry in column 4, a corresponding entry in column 5 and a corresponding entry in column 6, and vice versa.

Figure 6A:
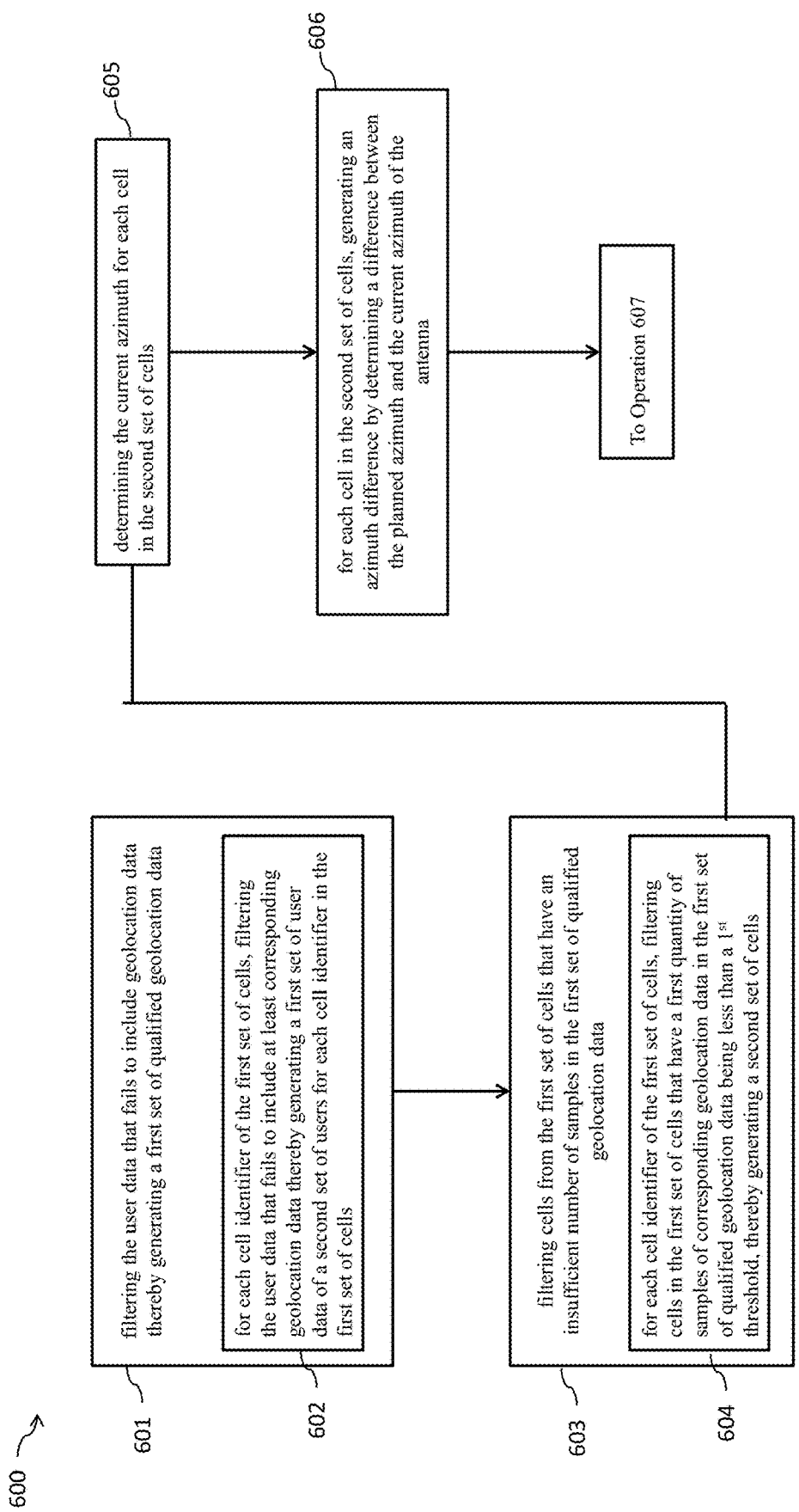
FIGS. 6A-6B are a flowchart of a method, in accordance with some embodiments.
Figure 6B:
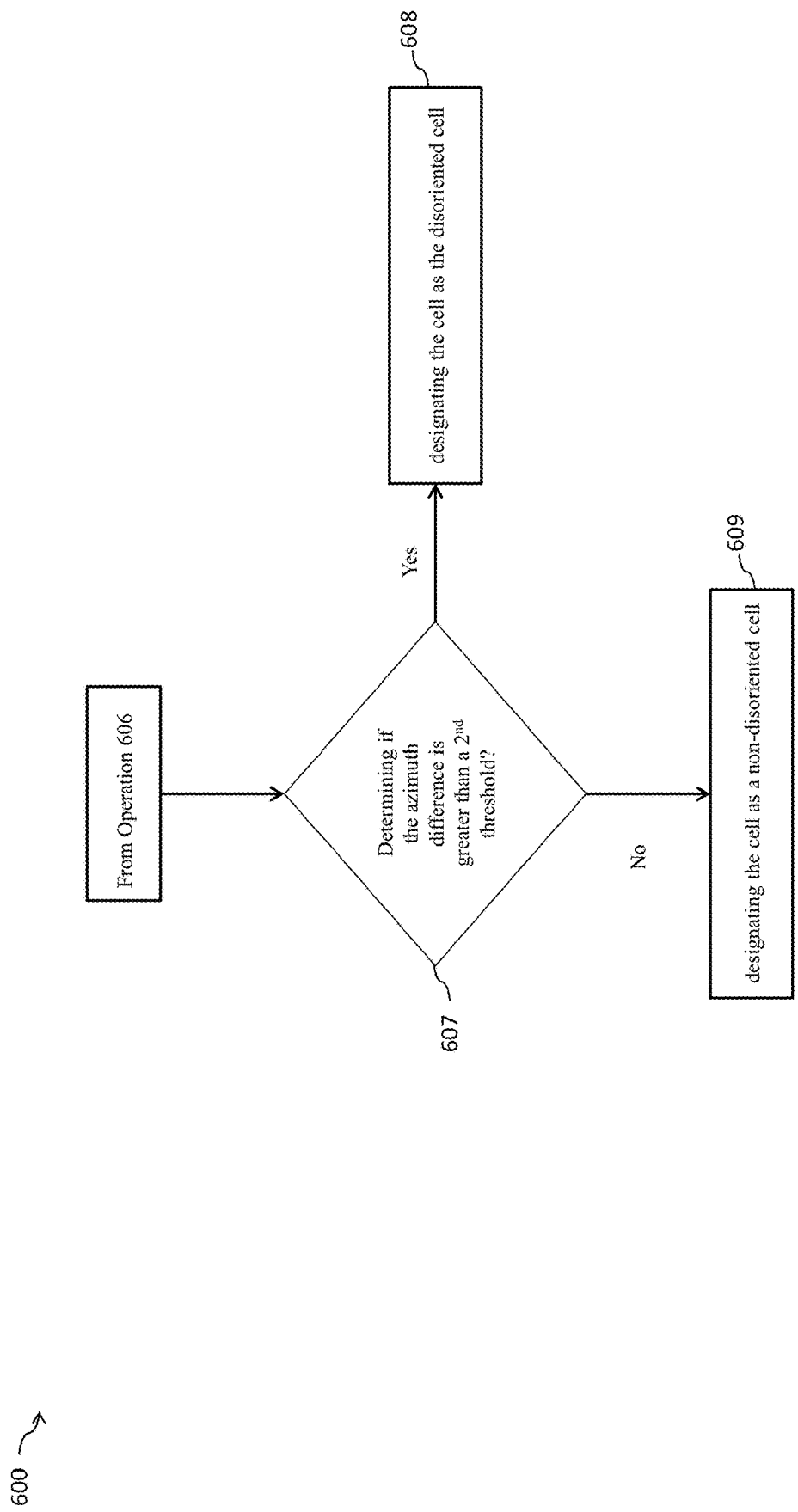
Figure 7A:
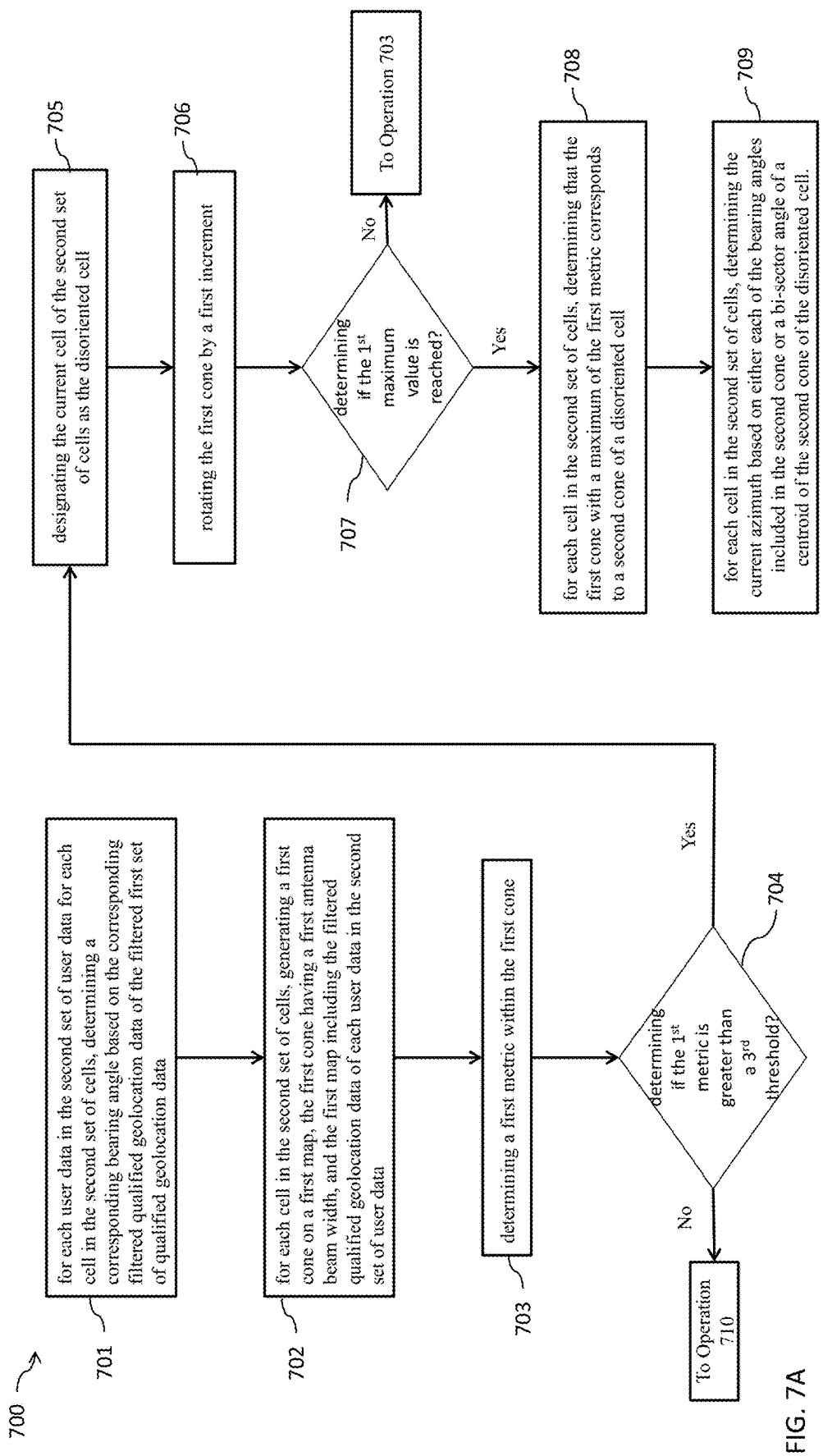
FIGS. 7A-7B are a flowchart of a method, in accordance with some embodiments.
Figure 7B:
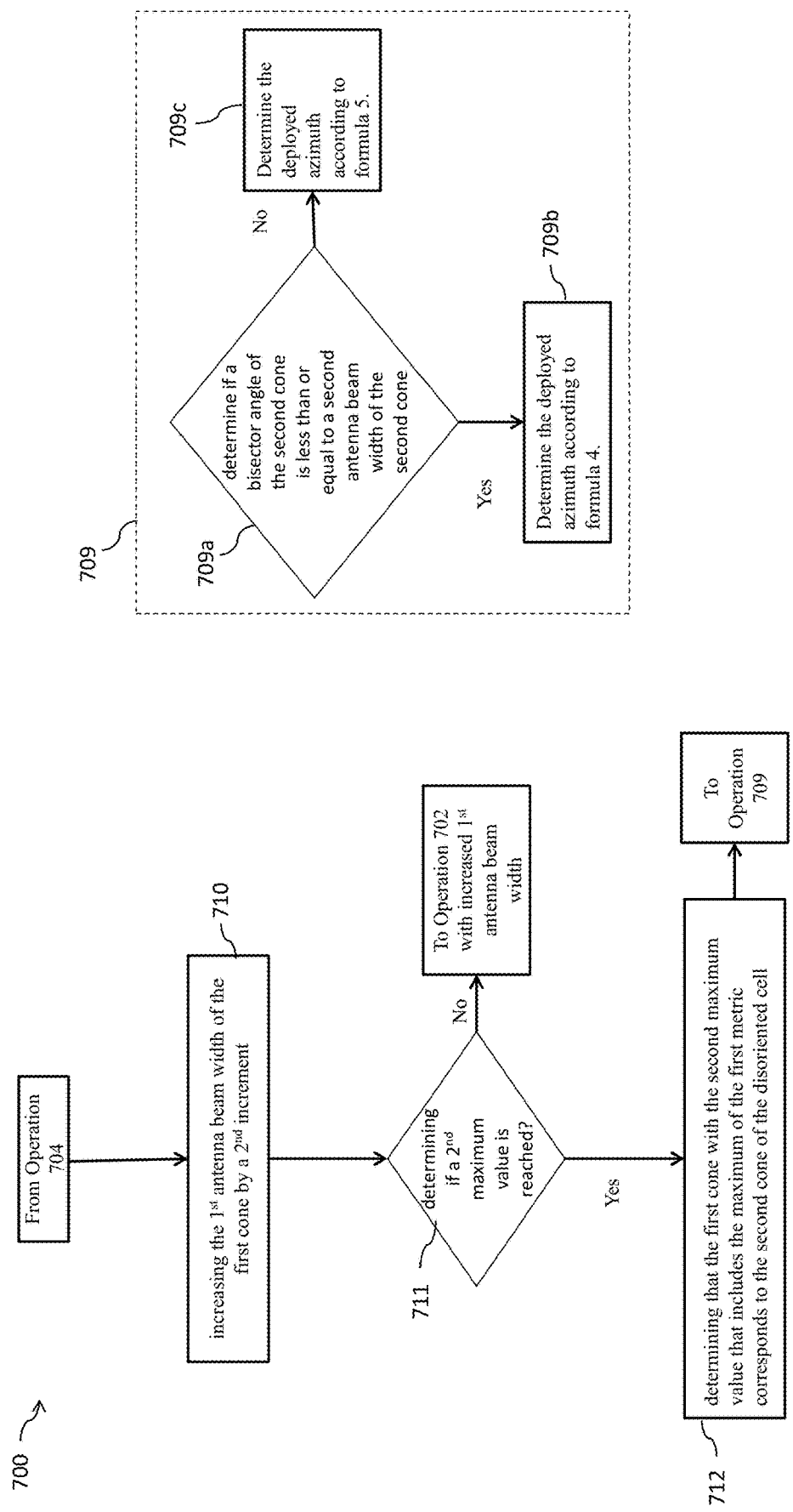

Cell report 300 is utilized with one or more operations of method 200 of FIGS. 2A-2B, method 600 of FIGS. 6A-6B, method 700 of FIGS. 7A-7B, method 800 of FIG. 8, method 900 of FIG. 9 or method 1000 of FIGS. 10A-10B.

Figure 16:
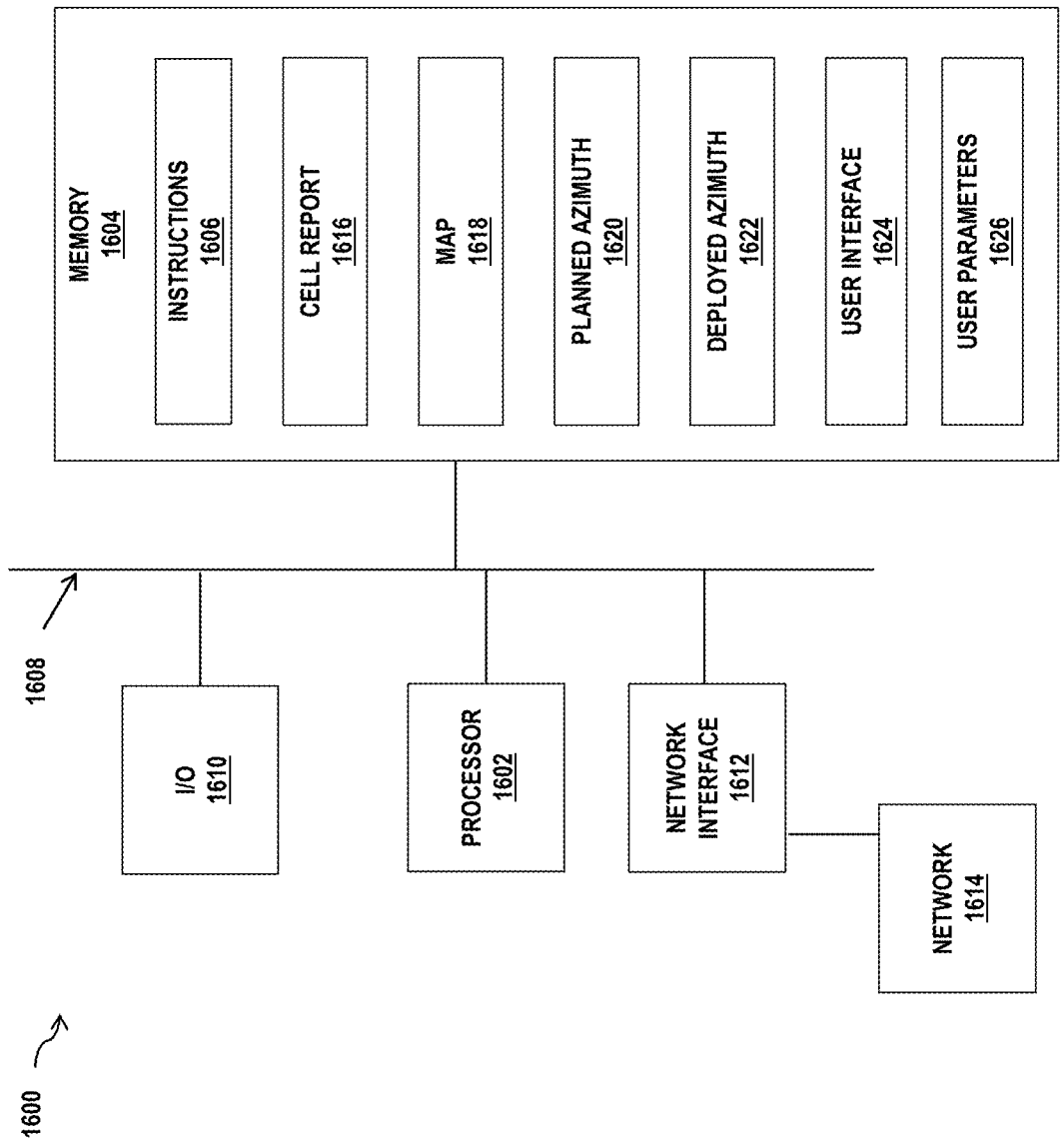
FIG. 16 is a schematic view of a system, in accordance with some embodiments.

In some embodiments, cell report 300 is stored in memory 1604 of FIG. 16. In some embodiments, cell report 300 is generated by system 1600 of FIG. 16.

In some embodiments, cell report 300 is a graphical user interface that facilitates output of a series of cells in the set of cells 101 by way of dragging and dropping one or more objects displayed in the graphical user interface. In some embodiments, user interface is accessible by way of a user terminal (e.g., set of servers 126). In some embodiments, one or more entries or rows in cell report 300 are selected by a user to view further details of the corresponding cell of the set of cells 101 and the disoriented cells.

In some embodiments, cell report 300 makes it possible to create one or more maps (e.g., maps 400A-400B) based on the cell report 300.

In some embodiments, cell report 300 makes it possible to track and add or remove one or more cells in the set of cells 101. In some embodiments, the selection or creation of one or more cells in the cell report 300 makes it possible for the user to view the one or more existing or new cells in the set of cells 101.

Other numbers of columns, other numbers of rows, or other types of data in cell report 300 are within the scope of the present disclosure.

Figure 4A:
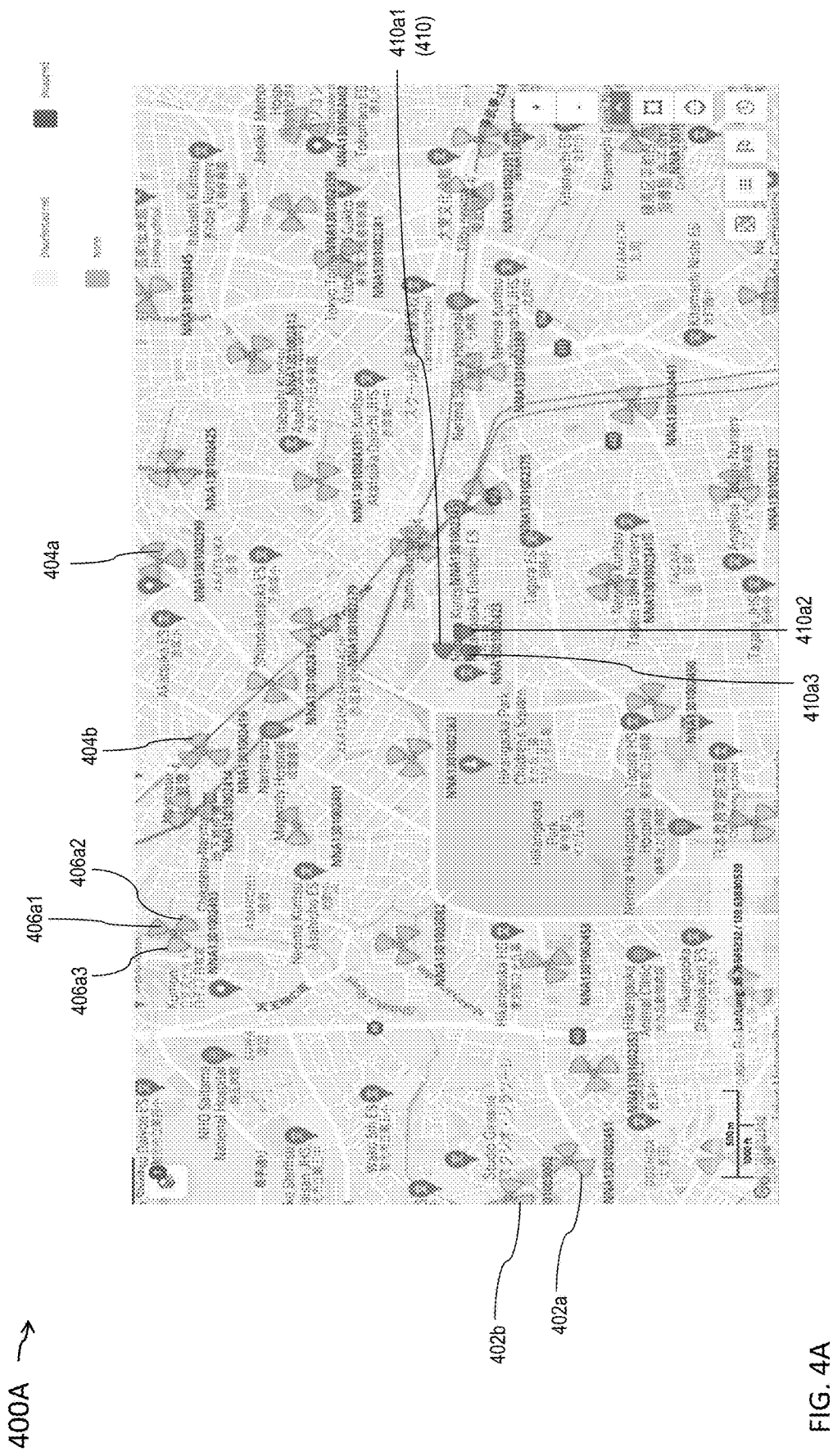
FIGS. 4A-4B are corresponding diagrams of corresponding maps, in accordance with some embodiments.
Figure 4B:
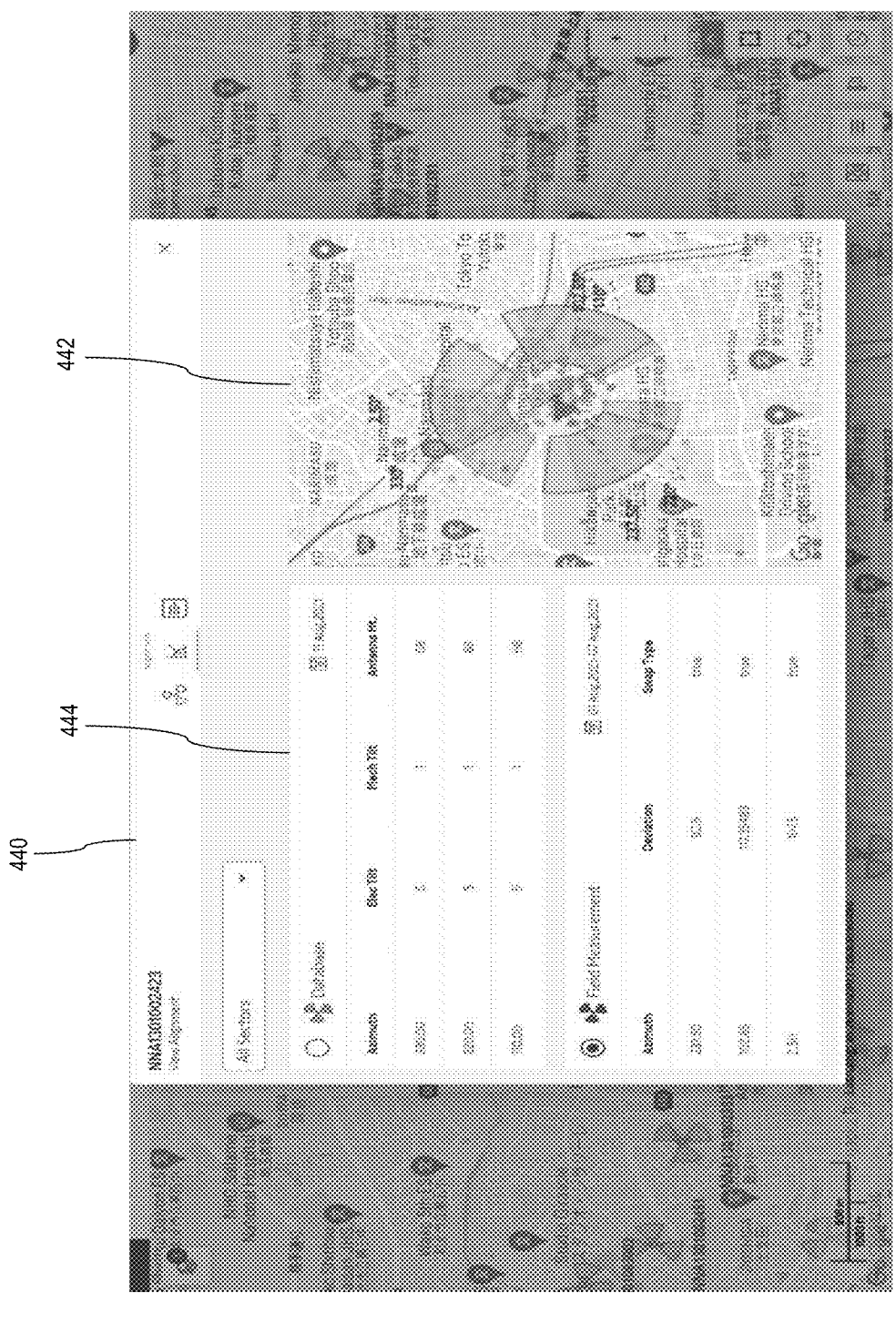

FIGS. 4A-4B are corresponding diagrams of corresponding maps 400A-400B, in accordance with some embodiments.

In some embodiments, maps 400A-400B are generated by operation 212 of method 200.

In some embodiments, maps 400A-400B are viewable by a user by way of a user interface (e.g., user interface 1624 in FIG. 16), and is displayed by system 1600.

In some embodiments, maps 400A-400B are visual representations of the cell report 300 of FIG. 3.

In some embodiments, maps 400A-400B include visualization of statistics. In some embodiments, maps 400A-400B include a tabular representation for various geographies including (PAN, Region, Cluster, etc). In some embodiments, geo-located samples of user data are displayed in maps 400A-400B.

In some embodiments, maps 400A-400B include identification of disoriented cells, alignment properties of disoriented cells including at least one or more of cell site name, cell name, frequency band, physical parameters, center angle of the planned azimuth, center angle of the deployed azimuth, azimuth deviation between the planned azimuth and the deployed azimuth, the first set of cross-feeders, the first set of sector swaps, the first set of cyclic swaps, cell type, cell status or sector swap type and remarks will be visible.

Map 400B is a variation of map 400A, and similar detailed description is therefore omitted. In comparison with map 400A, map 400B further includes a field 440 (described below), and similar detailed description is therefore omitted.

Maps 400A-400B are shown as corresponding maps. Maps 400A-400B include details from each cell of the set of cells 101. Maps 400A-400B include each of the details of the cell report 300 of FIG. 3, but are displayed in map formats.

Maps 400A-400B include each cell of the set of cells 101 of system 100, and specifies whether the cell is a disoriented cell or is not a disoriented cell (e.g., normal). In some embodiments, maps 400A-400B further specify whether the disoriented cell includes cross-feeders, sector swaps or cyclic swaps.

Maps 400A-400B include a set of disoriented cells 402. Each sector in the set of disoriented cells 402 are disoriented. For example, set of disoriented cells 402 includes disoriented cells 402a and disoriented cells 402b, and each sector in disoriented cells 402a and disoriented cells 402b are disoriented.

Maps 400A-400B further include a set of non-disoriented cells 404. Each sector in the set of non-disoriented cells 404 are not disoriented. For example, set of non-disoriented cells 404 includes non-disoriented cells 404a and non-disoriented cells 404b, and each sector in non-disoriented cells 404a and non-disoriented cells 404b are not disoriented.

Maps 400A-400B further include a set of cells 406. The set of cells 406 includes cells that have combinations of disoriented cells and non-disoriented cells. For example, set of cells 406 includes non-disoriented cells (e.g., sectors 406a1 and 406a2) and disoriented cells (sector 406a3).

Maps 400A-400B further include a set of cyclic swapped cells 410. Each sector in the set of cyclic swapped cells 410 are disoriented. Set of cyclic swapped cells 410 includes swapped cells 410a1, 410a2 and 410a3. In some embodiments, maps 400A-400B further include a set of sector swapped cells (not shown). In some embodiments, one or more of the cells in maps 400A-400B correspond to sector swapped cells (not shown).

In some embodiments, maps 400A-400B are created by the set of servers 126, and is updated each time during execution of method 200 of FIGS. 2A-2B.

In comparison with map 400A, map 400B further includes a field 440, and similar detailed description is therefore omitted.

Field 440 includes a zoomed-in portion 442 of map 400A and a parameter portion 444. In some embodiments, the parameter portion 444 displays further details of specific cells that are positioned within the zoomed-in portion 442 of map 400A. In some embodiments, the parameters shown in the parameter portion 444 can be specified by the user. Other parameters in the parameter portion 444 are within the scope of the present disclosure.

Maps 400A-400B are utilized with one or more operations of method 200 of FIGS. 2A-2B, method 600 of FIGS. 6A-6B, method 700 of FIGS. 7A-7B, method 800 of FIG. 8, method 900 of FIG. 9 or method 1000 of FIGS. 10A-10B.

In some embodiments, maps 400A-400B are stored in memory 1604 of FIG. 16. In some embodiments, maps 400A-400B are generated by system 1600 of FIG. 16.

Other numbers of cells or other types of data in maps 400A-400B are within the scope of the present disclosure.

In some embodiments, maps 400A-400B include a graphical user interface that facilitates output of a series of cells in the set of cells 101 by way of dragging and dropping one or more objects displayed in the graphical user interface. In some embodiments, the user interface is accessible by way of a user terminal (e.g., set of servers 126). In some embodiments, one or more regions of the maps 400A-400B are selected by a user to view further details of the corresponding cell of the set of cells 101 and the disoriented cells.

In some embodiments, maps 400A-400B make it possible to track and add or remove one or more cells in the set of cells 101. In some embodiments, the selection or creation of one or more cells in maps 400A-400B make it possible for the user to view the one or more existing or new cells in the set of cells 101.

Other numbers of cells, other types of cells or other types of data in maps 400A-400B are within the scope of the present disclosure.

FIG. 5 is a diagram of a disoriented cell 500, in accordance with some embodiments.

In some embodiments, disoriented cell 500 is an example of portions of operations 205-208 of method 200. For example, in some embodiments, disoriented cell 500 is an illustration of a disoriented cell of a map (similar to maps 400A-400B) that is generated by operation 212 of method 200, and how the disoriented cell is corrected by operations 213-215 of method 200, and similar detailed description is therefore omitted.

For ease of illustration, disoriented cell 500 shows two sectors; however, other numbers of sectors for disoriented cell 500 are within the scope of the present disclosure.

In some embodiments, disoriented cell 500 is utilized with one or more operations of method 200 of FIGS. 2A-2B, method 600 of FIGS. 6A-6B, method 700 of FIGS. 7A-7B, method 800 of FIG. 8, method 900 of FIG. 9 or method 1000 of FIGS. 10A-10B.

Disoriented cell 500 includes a planned sector 502 and a deployed sector 504.

Planned sector 502 corresponds to a designed sector or a planned sector of a cell (e.g., disoriented cell 500) of the set of cells 101. Planned sector 502 has a planned azimuth AZP. Planned sector 502 is the planned sector of the cell that would be generated by one or more antennas of the set of antennas 104a, . . . , 104m with the planned azimuth AZP.

Deployed sector 504 corresponds to a measured sector or a deployed sector of a cell (e.g., disoriented cell 500) of the set of cells 101. Deployed sector 504 has a deployed azimuth AZD. Deployed sector 504 is the deployed or actual sector of the cell that is generated by one or more antennas of the set of antennas 104a, . . . , 104m with the deployed azimuth AZD.

A difference between the planned azimuth AZP and the deployed azimuth AZD corresponds to an azimuth difference AD, and is expressed by equation 1 as:

$$AD=AZP-AZD \qquad (1)$$

As shown in FIG. 5, the planned sector 502 and the deployed sector 504 provide RF coverage to different areas due to the azimuth difference AZ between the planned azimuth AZP and the deployed azimuth AZD.

In some embodiments, after operation 214 of method 200, the deployed azimuth AZD of one or more antennas of the set of antennas 104a, . . . , 104m is changed to be equal to the planned azimuth AZD of the one or more antennas of the set of antennas 104a, . . . , 104m of the disoriented cell 500.

In some embodiments, disoriented cell 500 is stored in memory 1604 of FIG. 16. In some embodiments, disoriented cell 500 is generated by system 1600 of FIG. 16.

Other numbers of cells, sectors or other types of data in disoriented cell 500 are within the scope of the present disclosure.

FIGS. 6A-6B are a flowchart of a method 600, in accordance with some embodiments.

Figure 6C:
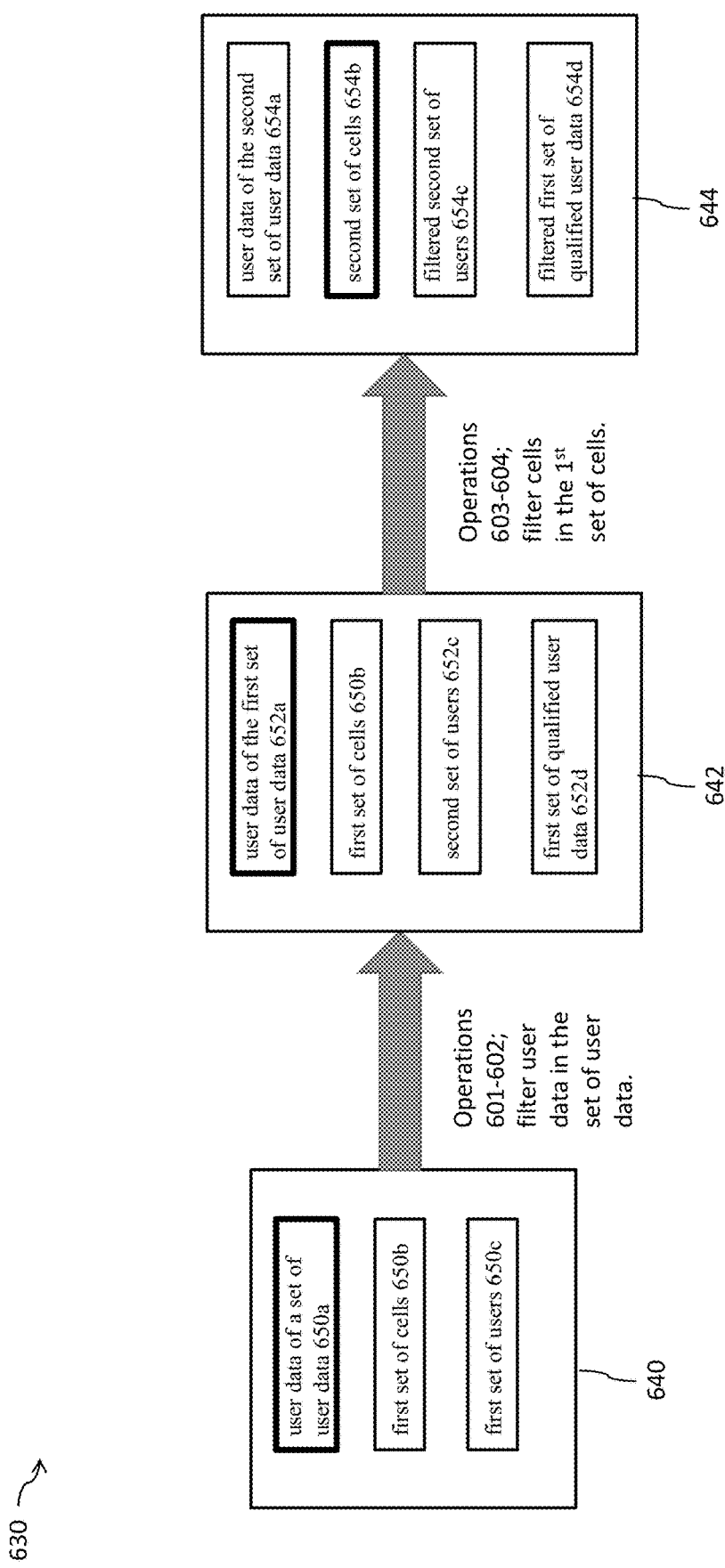
FIG. 6C is an exemplary diagram that illustrates operations of the method of FIGS. 6A-6B, in accordance with some embodiments.

FIG. 6C is an exemplary diagram 630 that illustrates operations 601-604 of method 600, in accordance with some embodiments.

Method 600 is an embodiment of at least operation 203 and 204 of method 200 of FIGS. 2A-2B, and similar detailed description is therefore omitted. For example, in some embodiments, method 600 is a method of at least collecting the user data of the first set of cells over a first duration of time, and determining a disoriented cell of the first set of cells based on the user data.

In some embodiments, FIGS. 6A-6B are a flowchart of a method of operating system 100 of FIG. 1 or the set of servers 126, and similar detailed description is therefore omitted. It is understood that additional operations may be performed before, during, and/or after the method 600 depicted in FIGS. 6A-6B, and that some other operations may only be briefly described herein. In some embodiments, other order of operations of method 600 is within the scope of the present disclosure. In some embodiments, one or more operations of method 600 are not performed.

Method 600 includes exemplary operations, but the operations are not necessarily performed in the order shown. Operations may be added, replaced, changed order, and/or eliminated as appropriate, in accordance with the spirit and scope of disclosed embodiments. It is understood that method 600 utilizes features of one or more of system 100, method 200, cell report 300, maps 400A-400B, disoriented cell 500, map 1100 of FIG. 11, map 1200 of FIG. 12, map 1300 of FIG. 13, map 1400A of FIG. 14A, map 1400B of FIG. 14B, map 1500A of FIG. 15A, map 1500B of FIG. 15B, system 1500C of FIG. 15C or system 1500D of FIG. 15D.

In operation 601 of method 600, the user data of a set of user data 650a (FIG. 6C) that fails to include geolocation data is filtered thereby generating a first set of qualified geolocation data 652d.

In some embodiments, the user data of the set of user data 650a is the user data of a first set of cells 650b. In some embodiments, the user data of the set of user data 650a is the user data of a first set of users 650c.

In some embodiments, the first set of qualified geolocation data 652d is geolocation data of corresponding users of the set of users that includes corresponding geolocation data. For example, in some embodiments, the user data of the set of user data 650a of corresponding users is received by one or more nodes of the set of nodes 102 that has a corresponding received signal strength (SNR), but the corresponding user data of the set of user data 650a does not include geolocation data as the GPS of the corresponding user is turned off, and is therefore designated as "non-qualified geolocation data." In some embodiments, operation 601 filters the non-qualified geolocation data from the user data of the set of user data 650a thereby generating the first set of qualified geolocation data 652d.

In some embodiments, operation 601 is performed by the set of servers 126.

In some embodiments, operation 601 further includes operation 602.

In operation 602 of method 600, for each cell identifier of the first set of cells 650b, the user data of the set of user data 650a that fails to include at least corresponding geolocation data is filtered thereby generating a first set of user data 652a of a second set of users 652c for each cell identifier in the first set of cells 650b.

In some embodiments, the first set of user data 652a includes the first set of qualified geolocation data 652d. In some embodiments, each user data in the first set of user data 652a has a corresponding qualified geolocation data of the first set of qualified geolocation data 652d.

In some embodiments, each user in the second set of users 652c has corresponding user data of the first set of user data 652a.

In some embodiments, operation 602 is performed by the set of servers 126.

In operation 603 of method 600, cells in the first set of cells 650b that have an insufficient number of samples in the first set of qualified geolocation data 652d are filtered from the first set of cells 650b.

In some embodiments, the insufficient number of samples includes a first threshold. In some embodiments, the first threshold is input or set by a human user. In some embodiments, the first threshold is input by a human user, and is viewable by the user by way of a user interface (e.g., user interface 1624 in FIG. 16), and is displayed by system 1600.

In some embodiments, the first threshold is equal to or greater than 10 samples. In some embodiments, the first threshold is equal to or greater than 250 samples. In some embodiments, if the first threshold is less than 250 samples, then the number of samples in the first set of qualified geolocation data 652d is insufficient to accurately determine if a cell is a disoriented cell as there are not enough data points, and cells that are not disoriented may be improperly designated as disoriented cells due to the insufficient number of data points.

In some embodiments, if the first threshold is greater than or equal to 250 samples, then the number of samples in the first set of qualified geolocation data 652d is sufficient to accurately determine if a cell is a disoriented cell as there are enough data points, and cells that are disoriented may be accurately designated as disoriented cells, and cells that are not disoriented cells may be accurately designated as not being disoriented cells due to the sufficient number of data points.

Other values or ranges for the first threshold are within the scope of the present disclosure.

In some embodiments, operation 603 is performed by the set of servers 126.

In some embodiments, operation 603 further includes operation 604.

In operation 604 of method 600, for each cell identifier of the first set of cells 650b, cells in the first set of cells 650b that have a first quantity of samples of corresponding geolocation data in the first set of qualified geolocation data 652d being less than the first threshold are filtered, thereby generating a second set of cells 654b.

In some embodiments, each cell in the second set of cells 654b has a second set of user data 654a of a filtered second set of users 654c.

In some embodiments, each user in the filtered second set of users 654c has corresponding user data of the second set of user data 654a.

In some embodiments, the second set of user data 654a includes the filtered first set of qualified geolocation data 654d. In some embodiments, each user data in the second set of user data 654a has a corresponding filtered qualified geolocation data of the filtered first set of qualified geolocation data 654d.

In some embodiments, operation 604 is performed by the set of servers 126.

In operation 605 of method 600, the deployed azimuth AZD for each cell in the second set of cells is determined. In some embodiments, operation 605 is performed by the set of servers 126.

In operation 606 of method 600, an azimuth difference AD is generated for each cell in the second set of cells. In some embodiments, operation 606 includes determining the azimuth difference AD for each cell in the second set of cells. In some embodiments, operation 606 is performed by the set of servers 126.

In some embodiments, the azimuth difference AD is determined based on a difference between the planned azimuth AZP and the deployed azimuth AZD. In some embodiments, the azimuth difference AD is determined according to formula 1.

In operation 607 of method 600, a determination is made if the azimuth difference AD is greater than a second threshold. In some embodiments, operation 607 includes taking the absolute value of the azimuth difference AD, and determining if the absolute value of the azimuth difference AD is greater than the second threshold.

In some embodiments, the second threshold is input or set by a human user. In some embodiments, the second threshold is input by a human user, and is viewable by the user by way of a user interface (e.g., user interface 1624 in FIG. 16), and is displayed by system 1600.

In some embodiments, the second threshold is equal to or greater than 1 degree. In some embodiments, the second threshold is equal to or greater than 15 degrees. In some embodiments, if the second threshold is less than 15 degrees, then the number of cells in the second set of cells that are designated as disoriented cells is increased compared to second threshold values that are greater than 15 degrees resulting in method 600 being less accurate by unnecessarily changing the configurations of antennas of disoriented cells resulting in reduced RF coverage, decreased network efficiency and operation, and increasing network operating costs and manpower costs.

In some embodiments, if the second threshold is equal to or greater than 15 degrees, then the number of cells in the second set of cells that are designated as disoriented cells is decreased compared to second threshold values that are less than 15 degrees resulting in method 600 being more accurate by accurately changing the configurations of antennas of disoriented cells resulting in optimized RF coverage, increased network efficiency and operation, and decreasing network operating costs and manpower costs.

Other values or ranges for the second threshold are within the scope of the present disclosure.

In some embodiments, if the absolute value of the azimuth difference AD is greater than the second threshold, then the current cell is a disoriented cell, the result of operation 607 is a "Yes", and method 600 proceeds to operation 608.

In some embodiments, if the absolute value of the azimuth difference AD is not greater than the second threshold, then the current cell is not a disoriented cell, the result of operation 607 is a "No", and method 600 proceeds to operation 609.

In some embodiments, operation 607 is performed by the set of servers 126.

In operation 608 of method 600, the cell is designated as the disoriented cell in response to determining that the azimuth difference is greater than the second threshold.

In some embodiments, operation 608 is performed by the set of servers 126.

In operation 609 of method 600, the cell is designated as a non-disoriented cell in response to determining that the azimuth difference is not greater than the second threshold. In some embodiments, operation 609 includes the cell being designated as the non-disoriented cell in response to determining that the azimuth difference is less than or equal to the second threshold.

In some embodiments, operation 609 is performed by the set of servers 126.

In some embodiments, operations 601-604 are embodiments of operation 203 of method 200, and similar detailed description is therefore omitted. In some embodiments, operations 605-609 are embodiments of operation 204 of method 200, and similar detailed description is therefore omitted.

In some embodiments, method 600 is an embodiment of operation 204 of method 200, and similar detailed description is therefore omitted.

In some embodiments, one or more of the operations of method 600 is not performed. By utilizing method 600, one or more elements of system 100 is configured to achieve the benefits discussed above with respect to system 100 and method 200.

FIG. 6C is an exemplary diagram 630 that illustrates operations 601-604 of method 600, in accordance with some embodiments.

Diagram 630 includes regions 640, 642 and 644.

Region 640 includes user data of the set of user data 650, the first set of cells 650b and the first set of users 650c prior to operations 601-602.

Region 642 includes user data of the first set of user data 652a, the first set of cells 650b, the second set of users 652c and the first set of qualified user data 652d after operations 601-602.

Region 644 includes user data of the second set of user data 654a, the second set of cells 654b, the filtered second set of users 654c and the filtered first set of qualified user data 654d after operations 603-604.

Other configurations of diagram 630 are within the scope of the present disclosure.

FIGS. 7A-7B are a flowchart of a method 700, in accordance with some embodiments.

Method 700 is an embodiment of at least operation 605 of method 600 of FIG. 6, and similar detailed description is therefore omitted. For example, in some embodiments, method 700 is a method of at least determining the deployed azimuth for each cell in the second set of cells 654b.

In some embodiments, FIGS. 7A-7B are a flowchart of a method of operating system 100 of FIG. 1 or the set of servers 126, and similar detailed description is therefore omitted. It is understood that additional operations may be performed before, during, and/or after the method 700 depicted in FIGS. 7A-7B, and that some other operations may only be briefly described herein. In some embodiments, other order of operations of method 700 is within the scope of the present disclosure. In some embodiments, one or more operations of method 700 are not performed.

Method 700 includes exemplary operations, but the operations are not necessarily performed in the order shown. Operations may be added, replaced, changed order, and/or eliminated as appropriate, in accordance with the spirit and scope of disclosed embodiments. It is understood that method 700 utilizes features of one or more of system 100, method 200, cell report 300, maps 400A-400B, disoriented cell 500, method 600, diagram 630, map 1100 of FIG. 11, map 1200 of FIG. 12, map 1300 of FIG. 13, map 1400A of FIG. 14A, map 1400B of FIG. 14B, map 1500A of FIG. 15A, map 1500B of FIG. 15B, system 1500C of FIG. 15C or system 1500D of FIG. 15D.

In operation 701 of method 700, for each user data in the second set of user data 654a and for each cell in the second set of cells 654b, a corresponding bearing angle is determined based on the corresponding filtered qualified geolocation data of the filtered first set of qualified geolocation data 654d.

In some embodiments, the corresponding bearing angle is with respect to true north from the corresponding cell of the second set of cells 654b. In some embodiments, the corresponding bearing angle of method 700 belong to a set of bearing angles BAT for each user data in the second set of user data 654a and for each cell in the second set of cells 654b.

Figure 11:
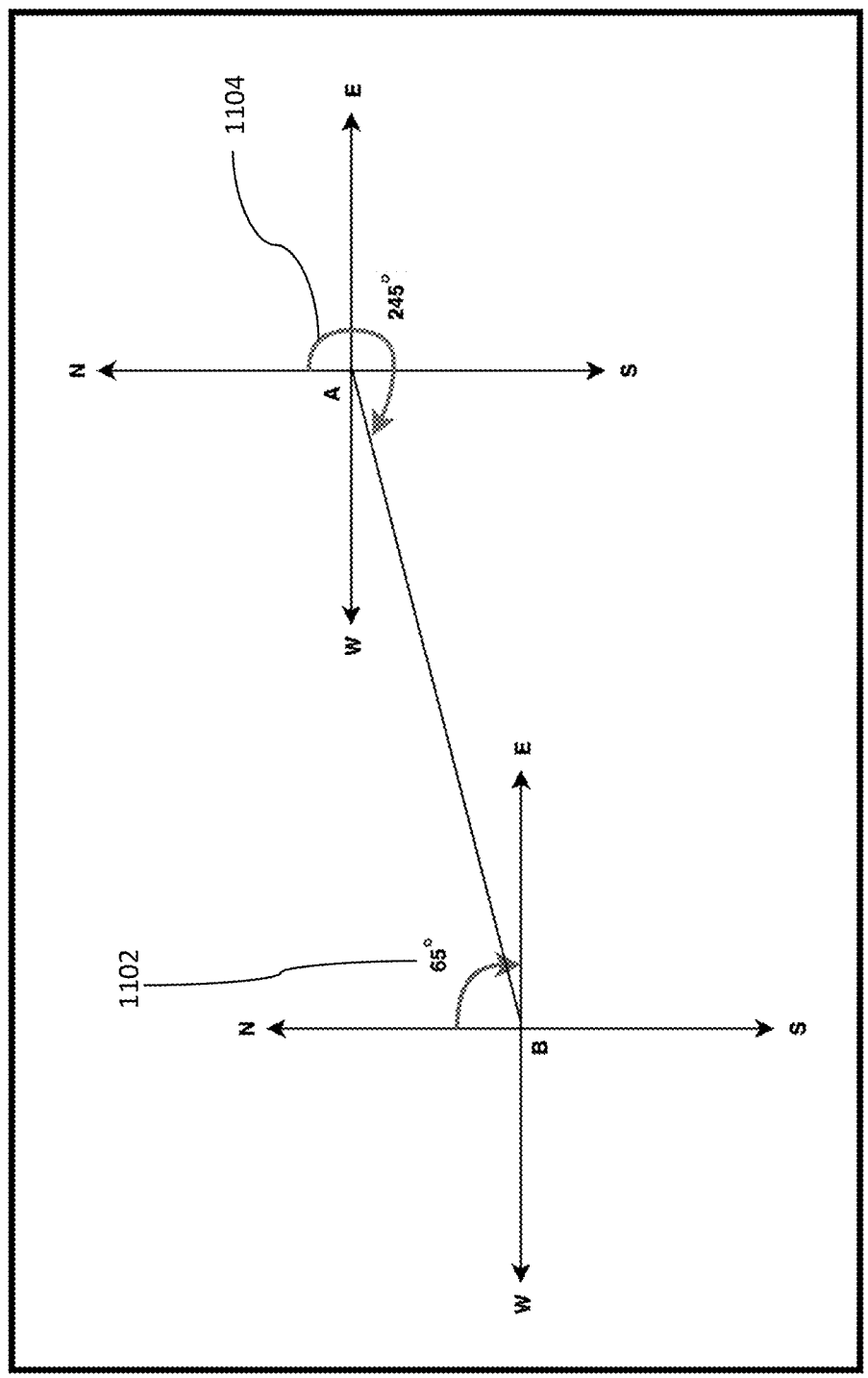
FIG. 11 is a diagram of a map, in accordance with some embodiments.

In some embodiments, the bearing angles of method 700 is similar to a bearing angle 1102 of user B with respect to cell A shown in FIG. 11, and similar detailed description is therefore omitted. In some embodiments, the exemplary bearing angle 1102 of user B in FIG. 11 is shown with respect to a cell B of the corresponding cell of the second set of cells 654b. In some embodiments, the exemplary bearing angle 1104 of cell B of the corresponding cell of the second set of cells 654b in FIG. 11 is shown with respect to user A of the corresponding cell of the second set of cells 654b.

In some embodiments, operation 701 is performed by the set of servers 126.

In operation 702 of method 700, for each cell in the second set of cells 654b, a first cone is generated on a first map. In some embodiments, the first cone has a first antenna beam width.

In some embodiments, the first cone includes at least one of cone 1202, 1204, 1220, 1230, 1302, 1304, 1306, 1404a, 1404b or 1402b (FIGS. 11-14B) or sector 502 or 504.

In some embodiments, the first map includes at least one of map 400A, 400B, 800, 1200, 1300, 1400A or 1400B (FIGS. 11-14B) or disoriented cell 500.

In some embodiments, the first antenna beam width includes at least one of antenna beam width 1212 or 1012.

In some embodiments, the first map includes the filtered qualified geolocation data of each user data in the second set of user data 654a. In some embodiments, a first vertex of the first cone corresponds to a location of the corresponding cell of the second set of cells 654b on the first map.

In some embodiments, the first vertex of the first cone includes the origin of the x-axis and the y-axis shown in at least one of map 1200, 1300, 1400A or 1400B (FIGS. 11-14B) or disoriented cell 500. In some embodiments, the first vertex of the first cone includes the origin of the x-axis and the y-axis shown in cell A of map 1100.

In some embodiments, operation 702 is performed by the set of servers 126.

In operation 703 of method 700, a first metric is determined for each cell in the second set of cells 654b.

In some embodiments, the first metric includes a first quantity of samples in the second set of user data 654a that are within the first cone. In some embodiments, the first quantity of samples in the second set of user data 654a that are within the first cone corresponds to a number of samples that have corresponding qualified geolocation data (e.g., belong to the filtered first set of qualified user data 654d) that are within the first cone.

In some embodiments, the first metric includes determining a first percentage of samples in the second set of user data 654a that are within the first cone. In some embodiments, the first percentage of samples in the second set of user data 654a that are within the first cone corresponds to a percentage of the number of samples that have corresponding qualified geolocation data (e.g., belong to the filtered first set of qualified user data 654d) that are within the first cone.

In some embodiments, the first percentage of samples FPS is expressed by formula 2 as:

$$\text{FPS in a cone} = (NSFC/TNS) \times 100 \quad (2)$$

Where NSFC is the number of samples within the first cone, and TNS is the total number of samples within the map of the same cell.

In some embodiments, NSFC is equal to the first quantity of samples in the second set of user data 654a that are within the first cone, and TNS is equal to the total number of samples in the cell of first map.

In some embodiments, NSFC ranges from 1% to 100%. In some embodiments, TNS ranges from 1% to 100%. Other values or ranges for at least one of NSFC or TNS are within the scope of the present disclosure.

In some embodiments, operation 703 is performed by the set of servers 126.

In operation 704 of method 700, for each cell in the second set of cells 654b, a determination is made if the first metric is greater than a third threshold.

In some embodiments, the third threshold is input or set by a human user. In some embodiments, the third threshold is input by a human user, and is viewable by the user by way of a user interface (e.g., user interface 1624 in FIG. 16), and is displayed by system 1600.

In some embodiments, the third threshold is equal to or greater than 1%. In some embodiments, the third threshold ranges from about 60% to about 100%. In some embodiments, if the third threshold is less than 60%, then the number of samples falling within each cone for each cell in the second set of cells 654b is insufficient to accurately determine if a cell is a disoriented cell as there are not enough data points, and cells that are not disoriented may be improperly designated as disoriented cells due to the insufficient number of data points.

In some embodiments, if the third threshold is greater than or equal to 60%, then the number of samples falling within each cone for each cell in the second set of cells 654b is sufficient to accurately determine if a cell is a disoriented cell as there are enough data points, and cells that are disoriented may be accurately designated as disoriented cells, and cells that are not disoriented cells may be accurately designated as not being disoriented cells due to the sufficient number of data points.

Other values or ranges for the third threshold are within the scope of the present disclosure. In some embodiments, the third threshold is based on configurations from equipment vendors.

In some embodiments, if the first metric is greater than the third threshold, then the result of operation 704 is a "Yes", and method 700 proceeds to operation 705. In some embodiments, if the first metric is not greater than the third threshold, then the result of operation 704 is a "No", and method 700 proceeds to operation 710.

In some embodiments, if the first quantity of samples in the second set of user data 654a that are within the first cone or the first percentage of samples in the second set of user data 654a that are within the first cone is greater than the third threshold, then the corresponding first quantity of samples or corresponding first percentage of samples is sufficient to designate the current cell as a disoriented cell, the result of operation 704 is a "Yes", and method 700 proceeds to operation 705.

In some embodiments, if the first quantity of samples in the second set of user data 654a that are within the first cone or the first percentage of samples in the second set of user data 654a that are within the first cone is not greater than the third threshold, then the corresponding first quantity of samples or corresponding first percentage of samples is not sufficient to designate the current cell as a disoriented cell, the result of operation 704 is a "No", and method 700 proceeds to operation 710.

In some embodiments, operation 704 is performed by the set of servers 126.

In operation 705 of method 700, the current cell of the second set of cells 654b is designated as a disoriented cell. In some embodiments, operation 705 is repeated for each cell in the second set of cells 654b that satisfies the third threshold condition of operation 704.

In some embodiments, operation 705 is performed by the set of servers 126.

In operation 706 of method 700, the first cone is rotated by a first increment.

In some embodiments, the first cone is rotated by the first increment in a clockwise direction with respect to the Y-axis. In some embodiments, the first cone is rotated by the first increment in a counterclockwise direction with respect to the Y-axis.

In some embodiments, the first cone is rotated by the first increment in a clockwise direction with respect to the X-axis. In some embodiments, the first cone is rotated by the first increment in a counterclockwise direction with respect to the X-axis.

In some embodiments, the first increment is input or set by a human user. In some embodiments, the first increment is input by a human user, and is viewable by the user by way of a user interface (e.g., user interface 1624 in FIG. 16), and is displayed by system 1600.

In some embodiments, the first increment ranges from about 1 degree to about 90 degrees. In some embodiments, the first increment ranges from about 3 degrees to about 10 degrees. In some embodiments, if the first increment is less than 3 degrees, then the number of times operations 703-707 are repeated is increased resulting in more processing power, and a longer time to yield the number of disoriented cells.

In some embodiments, if the first increment is greater than 10 degrees, then after each time the first cone is rotated by the first increment, a number of samples for each cell in the second set of cells 654b may not be included in the first cone, resulting in inaccurate results in determining if a cell is a disoriented cell as some data points may be excluded.

In some embodiments, if the first increment ranges from about 3 degrees to about 10 degrees, then after each time the first cone is rotated by the first increment, a number of samples for each cell in the second set of cells 654b included in the first cone is sufficient to result in accurate results in determining if a cell is a disoriented cell as the number of excluded data points is reduced compared with when the first increment is greater than 10 degrees, but the number of times operations 703-707 are repeated is reduced compared with when the first increment is less than 3 degrees, thereby resulting in less processing power, and a shorter time to yield the number of disoriented cells.

Other values or ranges for the first increment are within the scope of the present disclosure.

In some embodiments, the first increment ranges from about 1 degree increments to about 120 degree increments.

In some embodiments, operation 706 is performed by the set of servers 126.

In operation 707 of method 700, a determination is made if a cumulative rotational amount of the first cone is equal to a first maximum value. In some embodiments, the cumulative rotational amount of the first cone corresponds to the cumulative amount that the first cone has been rotated since being created for the current cell.

In some embodiments, if the cumulative rotational amount of the first cone is equal to the first maximum value, then the current cell is no longer rotated by operation 706, the result of operation 707 is a "Yes", and method 700 proceeds to operation 708.

In some embodiments, if the cumulative rotational amount of the first cone is not equal to the first maximum value, then the result of operation 707 is a "No", and method 700 returns to operation 703.

In some embodiments, the first maximum value is input or set by a human user. In some embodiments, the first maximum value is input by a human user, and is viewable by the user by way of a user interface (e.g., user interface 1624 in FIG. 16), and is displayed by system 1600.

In some embodiments, the first maximum value is equal to 360 degrees.

In some embodiments, operation 707 is performed by the set of servers 126.

In operation 708 of method 700, the first cone with a maximum of the first metric is determined to correspond to a second cone of a disoriented cell. In some embodiments, operation 708 is repeated for each cell in the second set of cells 654b.

In some embodiments, the first cone with a maximum value of the first quantity of samples is determined to correspond to the second cone of the disoriented cell. In some embodiments, the second cone is the first cone with the maximum value of the first quantity of samples.

In some embodiments, the first cone with a maximum value of the first percentage of samples is determined to correspond to the second cone of the disoriented cell. In some embodiments, the second cone is the first cone with the maximum value of the first percentage of samples.

In some embodiments, the second cone includes at least one of cone 1202, 1204, 1220, 1230, 1302, 1304, 1306, 1404a, 1404b or 1402b (FIGS. 11-14B) or sector 502 or 504.

In some embodiments, operation 708 is performed by the set of servers 126.

In operation 709 of method 700, the deployed azimuth is determined based on at least one of a bisector angle of a centroid of the second cone of the disoriented cell or each of the bearing angles BAT included in the second cone. In some embodiments, operation 709 is repeated for each cell in the second set of cells 654b.

In some embodiments, for operation 709 of method 700, the deployed azimuth is determined based on the bisector angle of the centroid of the second cone of the disoriented cell as discussed in operation 709b. In some embodiments, for operation 709 of method 700, the deployed azimuth is determined based on each of the bearing angles included in the second cone as discussed in operation 709b.

In some embodiments, operation 709 includes at least operation 709a, 709b or 709c.

In operation 709a, a determination is made if a bisector angle BA2 of the second cone is less than or equal to a second antenna beam width BW2 of the second cone.

In some embodiments, if the bisector angle BA2 of the second cone is less than or equal to a second antenna beam width BW2 of the second cone, then the result of operation 709a is a "Yes", and method 700 proceeds to operation 709b.

In some embodiments, if the bisector angle BA2 of the second cone is greater than the second antenna beam width BW2 of the second cone, then the result of operation 709a is a "No", and method 700 proceeds to operation 709c.

In some embodiments, the bisector angle BA2 includes at least one of bisector angle 1410a, 1410b or 1410c.

In some embodiments, the second antenna beam width BW2 includes at least one of antenna beam width 1212 or 1012.

In some embodiments, the bisector angle BA2 of the second cone is determined according to formula 3 as:

$$BA2 = LR + (UR - LR)/2 \qquad (3)$$

Where the lower range LR is equal to the lower range of the second cone in degrees, and the upper range UR is equal to the upper range of the second cone in degrees, and the bisector angle BA2 is in degrees. In some embodiments, each of the lower range LR, the upper range UR and the bisector angle BA2 are in radians.

In operation 709b of method 700, the deployed azimuth AZD is determined according to formula 4.

In some embodiments, the deployed azimuth AZD is determined according to formula 4 as:

$$AZD = BA2 \qquad (4)$$

In some embodiments, operation 709b includes the deployed azimuth AZD being set equal to the second antenna beam width BW2. In some embodiments, after operation 709b, method 700 returns to operation 709 or ends.

In operation 709c of method 700, the deployed azimuth AZD is determined according to formula 5.

In some embodiments, the deployed azimuth AZD is determined according to formula 5 as:

$$AZD = \text{DEGREES}(A \text{ TAN } 2(\text{Sum of COS(BAT1)}, \text{Sum of SIN(BAT1)})) \qquad (5)$$

In some embodiments, BAT1 corresponds to a list of each bearing angle of all the samples in the present cell in radians), DEGREES is an operation to convert the current value in radians to a new value in degrees, and the deployed azimuth AZD has units of degrees.

As shown in formula 5, BAT1 corresponds to a list of each bearing angle of all the samples in the present cell in radians, thus the SIN and COS operations of formula 5 are performed on each bearing angle within the present cell that are in the set of bearing angles BAT.

In some embodiments, the deployed azimuth AZD is negative (AZDN), and is converted to a positive angle according to formula 6 as:

$$AZD = AZDN + 360 \qquad (6)$$

In some embodiments, after operation 709c, method 700 returns to operation 709 or ends.

Tables 1 and 2 illustrate a non-limiting example of sample data that demonstrates application of formulas 3-6, in accordance with some embodiments. Other types of data, values of data or quantities of data in Tables 1-2 are within the scope of the present disclosure.

For example, Table 1 includes sample data, in accordance with some embodiments.

For example, Table 2 includes sample data based on the application of formulas 3-6 to the sample data of Table 1, in accordance with some embodiments.

TABLE 1

| Angle | Count of samples | RSRP | Radian value of all the RSRP samples | Cos Value of all the Radian values | Sin Value of all the Radian values |
|---|---|---|---|---|---|
| 276.83 | 1 | −112 | 4.831594968 | 0.118923868 | −0.992903376 |
| 259.16 | 1 | −96 | 4.523195289 | −0.188067035 | −0.982156195 |
| 252.03 | 1 | −76 | 4.398753314 | −0.30851898 | −0.951218187 |
| 287.64 | 1 | −79 | 5.02026506 | 0.30303527 | −0.952979342 |
| 165.02 | 1 | −74 | 2.880142332 | −0.966016112 | 0.258481858 |

In some embodiments, Tables 1-2 are based on the second beam width BW2 being equal to 79 degrees.

In some embodiments, Tables 1-2 are based on the upper range UR being equal to 354 degrees, and the lower range LR being equal to 275 degrees, and thus the bisector angle BA2 is determined according to formula 3, and is equal to 314.5=(275+((354−275)/2)).

TABLE 2

| Calculation | |
| --- | --- |
| Max Samples | 234 |
| Total Samples | 301 |
| Sample Percentage | 77.74086379 |
| Bisector Angle | 314.5 |
| Planned Azimuth | 0 |
| Deviation of Planned Azimuth and Bisector Angle | −314.5 |
| If Deviation is negative | 45.5 |
| Sum of Cos | −1.04064299 |
| Sum of Sin | −3.620775241 |
| Center angle | −106.0351215 |
| Corrected Center Angle | 253.9648785 |

In some embodiments, operation 709 is performed by the set of servers 126.

In operation 710 of method 700, the first antenna beam width of the first cone is increased by a second increment. In some embodiments, operation 710 includes decreasing the first antenna beam width of the first cone by the second increment.

In some embodiments, the second increment is input or set by a human user. In some embodiments, the second increment is input by a human user, and is viewable by the user by way of a user interface (e.g., user interface 1624 in FIG. 16), and is displayed by system 1600.

In some embodiments, the second increment ranges from about 1 degree to about 90 degrees. In some embodiments, the second increment ranges from about 1 degrees to about 10 degrees. In some embodiments, if the second increment is less than 1 degrees, then the number of times operations 703-711 are repeated is increased resulting in more processing power, and a longer time to yield the number of disoriented cells.

In some embodiments, if the second increment is greater than 10 degrees, then after each time the first antenna beam width of the first cone is increased by the second increment, a number of samples for each cell in the second set of cells 654b included in the first cone is increased, but may be attributed to an overly inclusive, increased first antenna beam width that obscures the accuracy in determining if a cell is a disoriented cell.

In some embodiments, if the second increment ranges from about 1 degrees to about 10 degrees, then after each time the first antenna beam width of the first cone is increased by the second increment, a number of samples for each cell in the second set of cells 654b included in the first cone is increased and is sufficient to result in accurate results in determining if a cell is a disoriented cell as the increased first antenna beam width is not overly inclusive and does not obscure the accuracy in determining if a cell is a disoriented cell compared with when the second increment is greater than 10 degrees, but the number of times operations 703-711 are repeated is reduced compared with when the second increment is less than 1 degrees, thereby resulting in less processing power, and a shorter time to yield the number of disoriented cells.

Other values or ranges for the second increment are within the scope of the present disclosure.

In operation 711 of method 700, a determination is made if the increased antenna beam width of the first cone is equal to a second maximum value.

In some embodiments, if the increased antenna beam width of the first cone is equal to the second maximum value, then the antenna beam width of the current cell is no longer increased by operation 710, the result of operation 711 is a "Yes", and method 700 proceeds to operation 712.

In some embodiments, if the increased antenna beam width of the first cone is not equal to the second maximum value, then the result of operation 711 is a "No", and method 700 returns to operation 702 with the increased antenna beam width as being the increased antenna beam width of the first cone.

In some embodiments, the second maximum value is input or set by a human user. In some embodiments, the second maximum value is input by a human user, and is viewable by the user by way of a user interface (e.g., user interface 1624 in FIG. 16), and is displayed by system 1600.

In some embodiments, the second maximum value is equal to 90 degrees. Other second maximum values are within the scope of the present disclosure.

In some embodiments, operation 710 is performed by the set of servers 126.

In operation 712 of method 700, the first cone with the second maximum value of the first metric that includes the maximum number of samples of the first quantity of samples or the maximum of the first percentage of samples of the first cones is determined to correspond to the second cone of the disoriented cell.

In some embodiments, operation 711 includes determining that the first cone with the second maximum value that corresponds to the second cone of the disoriented cell, and includes the maximum of samples of the first quantity of samples or the maximum of the first percentage of samples, in response to determining that no cell in the second set of cells 654b has the first quantity of samples or the first percentage of samples being greater than the third threshold.

In some embodiments, the second cone of the disoriented cell of operation 711 corresponds to the first cone with the second maximum value, and has a maximum number of samples of the first quantity of samples or the maximum of the first percentage of samples of the first cones, and does not satisfy the third threshold condition of operation 704.

In some embodiments, operation 712 is performed by the set of servers 126.

In some embodiments, one or more of the operations of method 700 is not performed. By utilizing method 700, one or more elements of system 100 is configured to achieve the benefits discussed above with respect to system 100 and method 200.

FIG. 8 is a flowchart of a method 800, in accordance with some embodiments.

Method 800 is an embodiment of at least operation 208 of method 200 of FIGS. 2A-2B, and similar detailed description is therefore omitted. For example, in some embodiments, method 800 is a method of at least determining a first set of cross-feeder cells in the second set of disoriented cells.

In some embodiments, FIG. 8 is a flowchart of a method of operating system 100 of FIG. 1 or the set of servers 126, and similar detailed description is therefore omitted. It is understood that additional operations may be performed before, during, and/or after the method 800 depicted in FIG. 8, and that some other operations may only be briefly described herein. In some embodiments, other order of operations of method 800 is within the scope of the present disclosure. In some embodiments, one or more operations of method 800 are not performed.

Method 800 includes exemplary operations, but the operations are not necessarily performed in the order shown. Operations may be added, replaced, changed order, and/or eliminated as appropriate, in accordance with the spirit and scope of disclosed embodiments. It is understood that method 800 utilizes features of one or more of system 100, method 200, cell report 300, maps 400A-400B, disoriented cell 500, map 1100 of FIG. 11, map 1200 of FIG. 12, map 1300 of FIG. 13, map 1400A of FIG. 14A, map 1400B of FIG. 14B, map 1500A of FIG. 15A, map 1500B of FIG. 15B, system 1500C of FIG. 15C or system 1500D of FIG. 15D.

In operation 801 of method 800, a third set of disoriented cells 850 is determined from the second set of disoriented cells. In some embodiments, each cell of the third set of disoriented cells includes the corresponding deployed azimuth that deviates from the corresponding planned azimuth by a first range.

In some embodiments, in generating the third set of disoriented cells, operation 801 corresponds to one or more filtering operations to filter the cells in the second set of disoriented cells having the corresponding deployed azimuth that do not deviate from the corresponding planned azimuth by the first range from the cells in the second set of disoriented cells having the corresponding deployed azimuth that deviates from the corresponding planned azimuth by the first range.

In some embodiments, the first range ranges from about 40% to about 60%. In some embodiments, if the first range is less than 40%, then the number of cells in the third set of disoriented cells is increased compared to first range values that are greater than 40% resulting in method 800 being less accurate by unnecessarily categorizing additional cells as cross-feeder cells and thus changing the configurations of antennas of cross-feeder cells resulting in reduced RF coverage, decreased network efficiency and operation, and increasing network operating costs and manpower costs.

In some embodiments, if the first range is greater than 60%, then the number of cells in the third set of disoriented cells is decreased compared to first range values that are less than 60% resulting in method 800 not categorizing additional cells as cross-feeder cells, and thus not changing the configurations of antennas of cross-feeder cells resulting in reduced RF coverage, decreased network efficiency and operation, and increasing network operating costs and manpower costs.

In some embodiments, if the first range is configured to range from about 40% to about 60%, then a sufficient number of cells are categorized as cross-feeder cells, and thus the configurations of antennas of cross-feeder cells are changed resulting in improved RF coverage, increased network efficiency and operation, and decreasing network operating costs and manpower costs compared to when the first range is less than 40% or greater than 60%.

Other values or ranges for the first range are within the scope of the present disclosure.

In some embodiments, operation 801 is performed by the set of servers 126.

In operation 802 of method 800, a determination is made whether a first set of geolocation samples of a first cell of the third set of disoriented cells is (1) greater than or equal to a first sample threshold and (2) are within a second range of a corresponding deployed azimuth of a second cell of the third set of disoriented cells.

In some embodiments, if the first set of geolocation samples of the first cell of the third set of disoriented cells is (1) greater than or equal to the first sample threshold and (2) are within the second range of a corresponding deployed azimuth of the second cell of the third set of disoriented cells, then the result of operation 802 is a "Yes", and method 800 proceeds to operation 804.

In some embodiments, if either the first set of geolocation samples of the first cell of the third set of disoriented cells is (1) not greater than or equal to the first sample threshold or (2) are not within the second range of a corresponding deployed azimuth of the second cell of the third set of disoriented cells, then the result of operation 802 is a "No", and method 800 proceeds to operation 803.

In some embodiments, the first sample threshold is equal to 40%. In some embodiments, if the first sample threshold is less than 40%, then the number of cells in the third set of disoriented cells designated as cross-feeder cells is increased compared to first sample threshold values that are greater than 40% resulting in method 800 being less accurate by unnecessarily categorizing additional cells as cross-feeder cells and thus changing the configurations of antennas of cross-feeder cells resulting in reduced RF coverage, decreased network efficiency and operation, and increasing network operating costs and manpower costs.

In some embodiments, if the first sample threshold is equal to or greater than 40%, then the number of cells in the third set of disoriented cells designated as cross-feeder cells is decreased compared to first sample threshold values that are less than 40% resulting in method 800 being more accurate, and a sufficient number of cells are categorized as cross-feeder cells, and thus the configurations of antennas of cross-feeder cells are changed resulting in improved RF coverage, increased network efficiency and operation, and decreasing network operating costs and manpower costs compared to when the first sample threshold is less than 40%.

Other values or ranges for the first sample threshold are within the scope of the present disclosure.

In some embodiments, the second range ranges from about −20 degrees to about +20 degrees. In some embodiments, if the second range is less than −20 degrees, then the number of cells in the third set of disoriented cells designated as cross-feeder cells is decreased compared to second range values that are greater than −20 degrees resulting in method 800 being less accurate by not categorizing additional cells as cross-feeder cells, and thus not changing the configurations of antennas of cross-feeder cells resulting in reduced RF coverage, decreased network efficiency and operation, and increasing network operating costs and manpower costs.

In some embodiments, if the second range is greater than 20 degrees, then the number of cells in the third set of disoriented cells designated as cross-feeder cells is increased compared to second range values that are less than 20 degrees resulting in method 800 being less accurate by unnecessarily categorizing additional cells as cross-feeder cells and thus changing the configurations of antennas of cross-feeder cells resulting in reduced RF coverage, decreased network efficiency and operation, and increasing network operating costs and manpower costs.

In some embodiments, if the second range is configured to range from about −20 degrees to about 20 degrees, then a sufficient number of cells are categorized as cross-feeder cells, and thus the configurations of antennas of cross-feeder cells are changed resulting in improved RF coverage, increased network efficiency and operation, and decreasing network operating costs and manpower costs compared to when the second range is less than −20 degrees to about 20 degrees.

Other values or ranges for the second range are within the scope of the present disclosure.

In some embodiments, operation 802 is performed by the set of servers 126.

In operation 803 of method 800, the first cell of the third set of disoriented cells and the second cell of the third set of disoriented cells are designated as not being cross-feeder cells of the first set of cross-feeder cells.

In some embodiments, operation 803 is performed by the set of servers 126.

In operation 804 of method 800, a determination is made whether a second set of geolocation samples of the second cell of the third set of disoriented cells is (1) greater than or equal to the first threshold and (2) are within the second range of a corresponding deployed azimuth of the first cell of the third set of disoriented cells.

In some embodiments, if the second set of geolocation samples of the second cell of the third set of disoriented cells is (1) greater than or equal to the first threshold, and (2) are within the second range of a corresponding deployed azimuth of the first cell of the third set of disoriented cells, then the result of operation 804 is a "Yes", and method 800 proceeds to operation 805.

In some embodiments, if either the second set of geolocation samples of the second cell of the third set of disoriented cells is (1) not greater than or equal to the first threshold, or (2) are not within the second range of a corresponding deployed azimuth of the first cell of the third set of disoriented cells, then the result of operation 804 is a "No", and method 800 proceeds to operation 803.

In some embodiments, operation 804 is performed by the set of servers 126.

In operation 805 of method 800, the first cell of the third set of disoriented cells and the second cell of the third set of disoriented cells are designated as corresponding cross-feeder cells of the first set of cross-feeder cells.

In some embodiments, operation 805 is performed by the set of servers 126.

In some embodiments, method 800 is an embodiment of operation 208 of method 200, and similar detailed description is therefore omitted.

In some embodiments, one or more of the operations of method 800 is not performed. By utilizing method 800, one or more elements of system 100 is configured to achieve the benefits discussed above with respect to system 100 and method 200.

FIG. 9 is a flowchart of a method 900, in accordance with some embodiments.

Method 900 is an embodiment of at least operation 209 of method 200 of FIGS. 2A-2B, and similar detailed description is therefore omitted. For example, in some embodiments, method 900 is a method of at least determining a first set of sector swap cells in the second set of disoriented cells.

In some embodiments, FIG. 9 is a flowchart of a method of operating system 100 of FIG. 1 or the set of servers 126, and similar detailed description is therefore omitted. It is understood that additional operations may be performed before, during, and/or after the method 900 depicted in FIG. 9, and that some other operations may only be briefly described herein. In some embodiments, other order of operations of method 900 is within the scope of the present disclosure. In some embodiments, one or more operations of method 900 are not performed.

Method 900 includes exemplary operations, but the operations are not necessarily performed in the order shown. Operations may be added, replaced, changed order, and/or eliminated as appropriate, in accordance with the spirit and scope of disclosed embodiments. It is understood that method 900 utilizes features of one or more of system 100, method 200, cell report 300, maps 400A-400B, disoriented cell 500, map 1100 of FIG. 11, map 1200 of FIG. 12, map 1300 of FIG. 13, map 1400A of FIG. 14A, map 1400B of FIG. 14B, map 1500A of FIG. 15A, map 1500B of FIG. 15B, system 1500C of FIG. 15C or system 1500D of FIG. 15D.

In operation 901 of method 900, a fourth set of disoriented cells 950 is determined from the second set of disoriented cells. In some embodiments, each cell of the fourth set of disoriented cells includes the corresponding deployed azimuth that deviates from the corresponding planned azimuth by a third range. In some embodiments, the third range is greater than the first range.

In some embodiments, in generating the fourth set of disoriented cells, operation 901 corresponds to one or more filtering operations to filter the cells in the second set of disoriented cells having the corresponding deployed azimuth that do not deviate from the corresponding planned azimuth by the third range from the cells in the second set of disoriented cells having the corresponding deployed azimuth that deviates from the corresponding planned azimuth by the third range.

In some embodiments, the third range is greater than about 60%. In some embodiments, if the third range is less than 60%, then the number of cells in the fourth set of disoriented cells is increased compared to third range values that are greater than or equal to 60% resulting in method 900 being less accurate by unnecessarily categorizing additional cells as sector swap cells and thus changing the configurations of antennas of sector swap cells resulting in reduced RF coverage, decreased network efficiency and operation, and increasing network operating costs and manpower costs.

In some embodiments, if the third range is greater than 60%, then the number of cells in the fourth set of disoriented cells is decreased compared to third range values that are less than 60% resulting in a sufficient number of cells categorized as sector swap cells in in method 900, and thus the configurations of antennas of sector swap cells are changed resulting in improved RF coverage, increased network efficiency and operation, and decreasing network operating costs and manpower costs compared to when the third range is less than 60%.

Other values or ranges for the third range are within the scope of the present disclosure.

In some embodiments, operation 901 is performed by the set of servers 126.

In operation 902 of method 900, a determination is made whether a first set of geolocation samples of a first cell of the fourth set of disoriented cells is (1) greater than or equal to a second sample threshold and (2) are within a fourth range of a corresponding deployed azimuth of a second cell of the fourth set of disoriented cells.

In some embodiments, if the first set of geolocation samples of the first cell of the fourth set of disoriented cells is (1) greater than or equal to the second sample threshold and (2) are within the fourth range of a corresponding deployed azimuth of the second cell of the fourth set of disoriented cells, then the result of operation 902 is a "Yes", and method 900 proceeds to operation 904.

In some embodiments, if either the first set of geolocation samples of the first cell of the fourth set of disoriented cells is (1) not greater than or equal to the second sample threshold or (2) are not within the fourth range of a corresponding deployed azimuth of the second cell of the fourth set of disoriented cells, then the result of operation 902 is a "No", and method 900 proceeds to operation 903.

In some embodiments, the second sample threshold is equal to 40%. In some embodiments, if the second sample threshold is less than 40%, then the number of cells in the fourth set of disoriented cells designated as sector swap cells is increased compared to second sample threshold values that are greater than 40% resulting in method 600 being less accurate by unnecessarily categorizing additional cells as sector swap cells and thus changing the configurations of antennas of sector swap cells resulting in reduced RF coverage, decreased network efficiency and operation, and increasing network operating costs and manpower costs.

In some embodiments, if the second sample threshold is equal to or greater than 40%, then the number of cells in the fourth set of disoriented cells designated as sector swap cells is decreased compared to second sample threshold values that are less than 40% resulting in method 900 being more accurate, and a sufficient number of cells are categorized as sector swap cells, and thus the configurations of antennas of sector swap cells are changed resulting in improved RF coverage, increased network efficiency and operation, and decreasing network operating costs and manpower costs compared to when the second sample threshold is less than 40%.

Other values or ranges for the second sample threshold are within the scope of the present disclosure.

In some embodiments, the fourth range ranges from about −20 degrees to about +20 degrees. In some embodiments, if the fourth range is less than −20 degrees, then the number of cells in the fourth set of disoriented cells designated as sector swap cells is decreased compared to fourth range values that are greater than −20 degrees resulting in method 900 being less accurate by not categorizing additional cells as sector swap cells, and thus not changing the configurations of antennas of sector swap cells resulting in reduced RF coverage, decreased network efficiency and operation, and increasing network operating costs and manpower costs.

In some embodiments, if the fourth range is greater than 20 degrees, then the number of cells in the fourth set of disoriented cells designated as sector swap cells is increased compared to fourth range values that are less than 20 degrees resulting in method 900 being less accurate by unnecessarily categorizing additional cells as sector swap cells and thus changing the configurations of antennas of sector swap cells resulting in reduced RF coverage, decreased network efficiency and operation, and increasing network operating costs and manpower costs.

In some embodiments, if the fourth range is configured to range from about −20 degrees to about 20 degrees, then a sufficient number of cells are categorized as sector swap cells, and thus the configurations of antennas of sector swap cells are changed resulting in improved RF coverage, increased network efficiency and operation, and decreasing network operating costs and manpower costs compared to when the fourth range is less than −20 degrees to about 20 degrees.

Other values or ranges for the fourth range are within the scope of the present disclosure.

In some embodiments, operation 902 is performed by the set of servers 126.

In operation 903 of method 900, the first cell of the fourth set of disoriented cells and the second cell of the fourth set of disoriented cells are designated as not being sector swap cells of the first set of sector swap cells.

In some embodiments, operation 903 is performed by the set of servers 126.

In operation 904 of method 900, a determination is made whether a second set of geolocation samples of the second cell of the fourth set of disoriented cells is (1) greater than or equal to the second sample threshold and (2) are within the fourth range of a corresponding deployed azimuth of the first cell of the fourth set of disoriented cells.

In some embodiments, if the second set of geolocation samples of the second cell of the fourth set of disoriented cells is (1) greater than or equal to the second sample threshold, and (2) are within the fourth range of a corresponding deployed azimuth of the first cell of the fourth set of disoriented cells, then the result of operation 904 is a "Yes", and method 900 proceeds to operation 905.

In some embodiments, if either the second set of geolocation samples of the second cell of the fourth set of disoriented cells is (1) not greater than or equal to the second sample threshold, or (2) are not within the fourth range of a corresponding deployed azimuth of the first cell of the fourth set of disoriented cells, then the result of operation 904 is a "No", and method 900 proceeds to operation 903.

In some embodiments, operation 904 is performed by the set of servers 126.

In operation 905 of method 900, the first cell of the fourth set of disoriented cells and the second cell of the fourth set of disoriented cells are designated as corresponding sector swap cells of the first set of sector swap cells.

In some embodiments, operation 905 is performed by the set of servers 126.

In some embodiments, method 900 is an embodiment of operation 209 of method 200, and similar detailed description is therefore omitted.

In some embodiments, one or more of the operations of method 900 is not performed. By utilizing method 900, one or more elements of system 100 is configured to achieve the benefits discussed above with respect to system 100 and method 200.

FIGS. 10A-10B are a flowchart of a method 1000, in accordance with some embodiments.

Method 1000 is an embodiment of at least operation 210 of method 200 of FIGS. 2A-2B, and similar detailed description is therefore omitted. For example, in some embodiments, method 1000 is a method of at least determining a first set of cyclic swap cells in the second set of disoriented cells.

In some embodiments, FIGS. 10A-10B is a flowchart of a method of operating system 100 of FIG. 1 or the set of servers 126, and similar detailed description is therefore omitted. It is understood that additional operations may be performed before, during, and/or after the method 1000 depicted in FIGS. 10A-10B, and that some other operations may only be briefly described herein. In some embodiments, other order of operations of method 1000 is within the scope of the present disclosure. In some embodiments, one or more operations of method 1000 are not performed.

Method 1000 includes exemplary operations, but the operations are not necessarily performed in the order shown. Operations may be added, replaced, changed order, and/or eliminated as appropriate, in accordance with the spirit and scope of disclosed embodiments. It is understood that method 1000 utilizes features of one or more of system 100, method 200, cell report 300, maps 400A-400B, disoriented cell 500, map 1100 of FIG. 11, map 1200 of FIG. 12, map 1300 of FIG. 13, map 1400A of FIG. 14A, map 1400B of FIG. 14B, map 1500A of FIG. 15A, map 1500B of FIG. 15B, system 1500C of FIG. 15C or system 1500D of FIG. 15D.

In operation 1001 of method 1000, a fifth set of disoriented cells 1050 is determined from the second set of disoriented cells. In some embodiments, each cell of the fifth set of disoriented cells includes the corresponding deployed azimuth that deviates from the corresponding planned azimuth by a third range. In some embodiments, the third range is greater than the first range.

In some embodiments, in generating the fifth set of disoriented cells, operation 1001 corresponds to one or more filtering operations to filter the cells in the second set of disoriented cells having the corresponding deployed azimuth that do not deviate from the corresponding planned azimuth by the third range from the cells in the second set of disoriented cells having the corresponding deployed azimuth that deviates from the corresponding planned azimuth by the third range.

In some embodiments, the third range is greater than about 60%. Other ranges for the third range are within the scope of the present disclosure.

In some embodiments, operation 1001 is performed by the set of servers 126.

In operation 1002 of method 1000, a determination is made whether a first set of geolocation samples of a first cell of the fifth set of disoriented cells is (1) greater than or equal to a second sample threshold and (2) are within a fourth range of a corresponding deployed azimuth of a second cell of the fifth set of disoriented cells.

In some embodiments, if the first set of geolocation samples of the first cell of the fifth set of disoriented cells is (1) greater than or equal to the second sample threshold and (2) are within the fourth range of a corresponding deployed azimuth of the second cell of the fifth set of disoriented cells, then the result of operation 1002 is a "Yes", and method 1000 proceeds to operation 1004.

In some embodiments, if either the first set of geolocation samples of the first cell of the fifth set of disoriented cells is (1) not greater than or equal to the second sample threshold or (2) are not within the fourth range of a corresponding deployed azimuth of the second cell of the fifth set of disoriented cells, then the result of operation 1002 is a "No", and method 1000 proceeds to operation 1003.

In some embodiments, the second sample threshold is equal to 40%. Other values for the second sample threshold are within the scope of the present disclosure.

In some embodiments, the fourth range ranges from about −20 degrees to about +20 degrees. Other ranges for the fourth range are within the scope of the present disclosure.

In some embodiments, operation 1002 is performed by the set of servers 126.

In operation 1003 of method 1000, the first cell of the fifth set of disoriented cells, the second cell of the fifth set of disoriented cells and a third cell of the fifth set of disoriented cells are designated as not being cyclic swap cells of the first set of cyclic swap cells.

In some embodiments, operation 1003 is performed by the set of servers 126.

In operation 1004 of method 1000, a determination is made whether a second set of geolocation samples of the second cell of the fifth set of disoriented cells is (1) greater than or equal to the second sample threshold and (2) are within the fourth range of a corresponding deployed azimuth of a third cell of the fifth set of disoriented cells.

In some embodiments, if the second set of geolocation samples of the second cell of the fifth set of disoriented cells is (1) greater than or equal to the second sample threshold, and (2) are within the fourth range of a corresponding deployed azimuth of the third cell of the fifth set of disoriented cells, then the result of operation 1004 is a "Yes", and method 1000 proceeds to operation 1005.

In some embodiments, if either the second set of geolocation samples of the second cell of the fifth set of disoriented cells is (1) not greater than or equal to the second sample threshold, or (2) are not within the fourth range of a corresponding deployed azimuth of the third cell of the fifth set of disoriented cells, then the result of operation 1004 is a "No", and method 1000 proceeds to operation 1003.

In some embodiments, operation 1004 is performed by the set of servers 126.

In operation 1005 of method 1000, a determination is made whether a third set of geolocation samples of the third cell of the fifth set of disoriented cells is (1) greater than or equal to the second sample threshold and (2) are within the fourth range of a corresponding deployed azimuth of the first cell of the fifth set of disoriented cells.

In some embodiments, if the third set of geolocation samples of the third cell of the fifth set of disoriented cells is (1) greater than or equal to the second sample threshold, and (2) are within the fourth range of a corresponding deployed azimuth of the first cell of the fifth set of disoriented cells, then the result of operation 1005 is a "Yes", and method 1000 proceeds to operation 1006.

In some embodiments, if either the third set of geolocation samples of the third cell of the fifth set of disoriented cells is (1) not greater than or equal to the second sample threshold, or (2) are not within the fourth range of a corresponding deployed azimuth of the first cell of the fifth set of disoriented cells, then the result of operation 1004 is a "No", and method 1000 proceeds to operation 1003.

In some embodiments, operation 1005 is performed by the set of servers 126.

In operation 1006 of method 1000, the first cell of the fifth set of disoriented cells, the second cell of the fifth set of disoriented cells and the third cell of the fifth set of disoriented cells are designated as corresponding cyclic swap cells of the first set of cyclic swap cells.

In some embodiments, operation 1006 is performed by the set of servers 126.

In some embodiments, while method 1000 is described as being performed with the first cell of the fifth set of disoriented cells, the second cell of the fifth set of disoriented cells and the third cell of the fifth set of disoriented cells, method 1000 can be applied to a number of cells in the fifth set of disoriented cells greater than 3.

In some embodiments, method 1000 is an embodiment of operation 210 of method 200, and similar detailed description is therefore omitted.

In some embodiments, one or more of the operations of method 1000 is not performed. By utilizing method 1000, one or more elements of system 100 is configured to achieve the benefits discussed above with respect to system 100 and method 200.

FIG. 11 is a diagram of a map 1100, in accordance with some embodiments.

In some embodiments, map 1100 is an embodiment of maps 400A-400B, and similar detailed description is therefore omitted. In some embodiments, map 1100 is generated by operation 212 of method 200.

In some embodiments, map 1100 shows bearing angle 1102 and 1104 that correspond to the bearing angles of method 700, and similar detailed description is therefore omitted.

In some embodiments, map 1100 is a visual representation of a cell A and a user B.

User B has a bearing angle 1102 with respect to cell A.
Cell A has a bearing angle 1104 with respect to user B.

In some embodiments, the exemplary bearing angle 1102 of user B in FIG. 11 is shown with respect to a cell B of the corresponding cell of the second set of cells 654b. In some embodiments, the exemplary bearing angle 1104 of cell B of the corresponding cell of the second set of cells 654b in FIG. 11 is shown with respect to user A of the corresponding cell of the second set of cells 654b.

Other numbers of bearing angles or cells in map 1100 are within the scope of the present disclosure.

Figure 12:
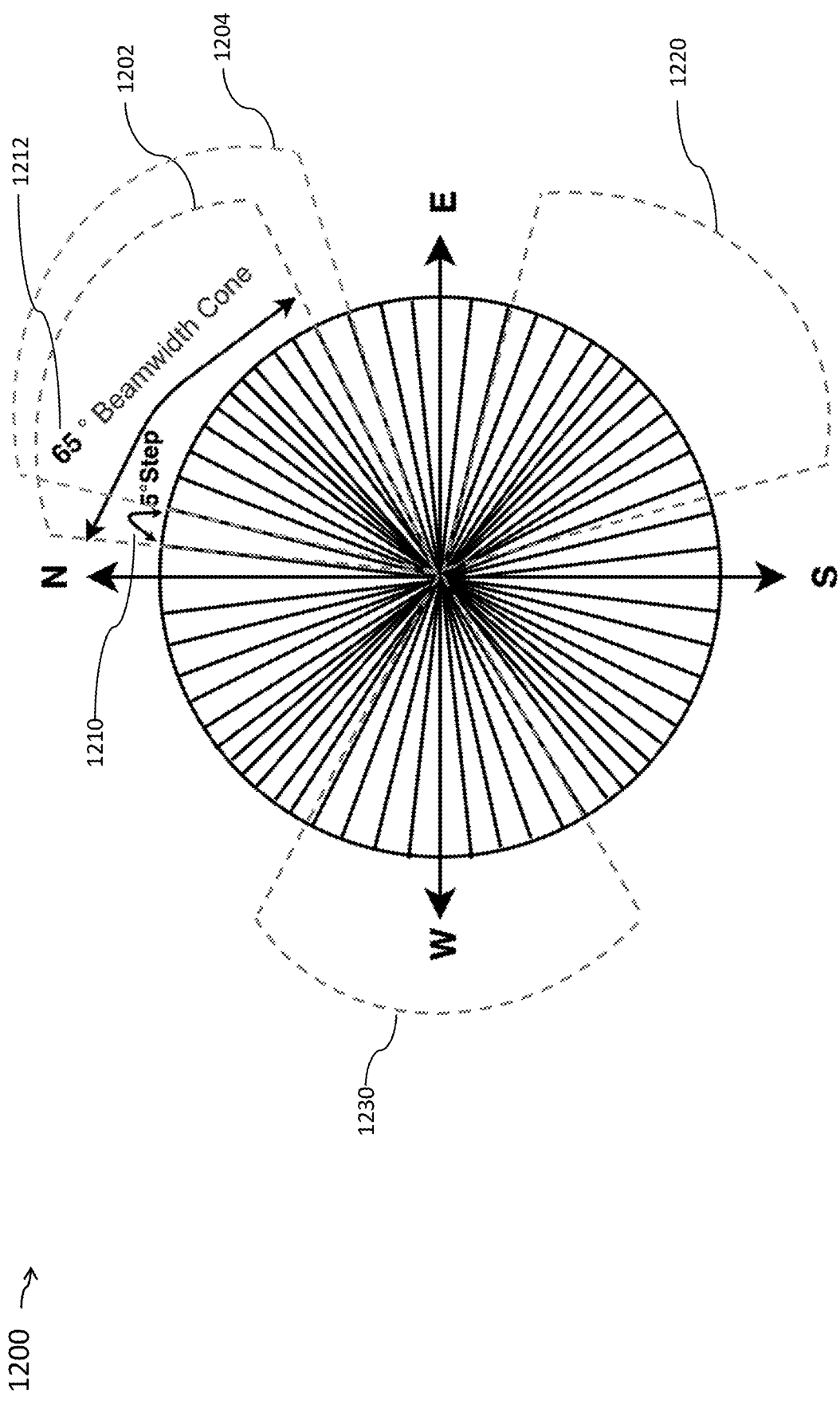
FIG. 12 is a diagram of a map, in accordance with some embodiments.

FIG. 12 is a diagram of a map 1200, in accordance with some embodiments.

In some embodiments, map 1200 is an embodiment of maps 400A-400B, and similar detailed description is therefore omitted. In some embodiments, map 1200 is generated by operation 212 of method 200.

Map 1200 includes cones 1202, 1204, 1220 and 1230. In some embodiments, each of cones 1202, 1220 and 1230 is a corresponding sector of a cell of the second set of cells 654b. In some embodiments, cones 1202 and 1204 are the same sector of a cell of the second set of cells 654b.

In some embodiments, each of cones 1202, 1220 and 1230 correspond to the first cone prior to being rotated by the first increment in operation 706 of method 700, and similar detailed description is therefore omitted.

In some embodiments, cone 1204 corresponds to the first cone after being rotated by the first increment in operation 706 of method 700, and similar detailed description is therefore omitted. For example, cone 1204 is cone 1202 after being rotated by the first increment, in accordance with some embodiments. In some embodiments, the first increment in FIG. 12 is equal to 1 degree. Other values for the first increment are within the scope of the present disclosure.

In some embodiments, each of cones 1202, 1204, 1220 and 1230 have a corresponding antenna beam width 1212 equal to 65 degrees. In some embodiments, the antenna beam width 1212 corresponds to the first antenna beam width of method 700.

Other values for the first antenna beam width are within the scope of the present disclosure.

Other numbers of cones, values of beam widths or first increment values in map 1200 are within the scope of the present disclosure.

Figure 13:
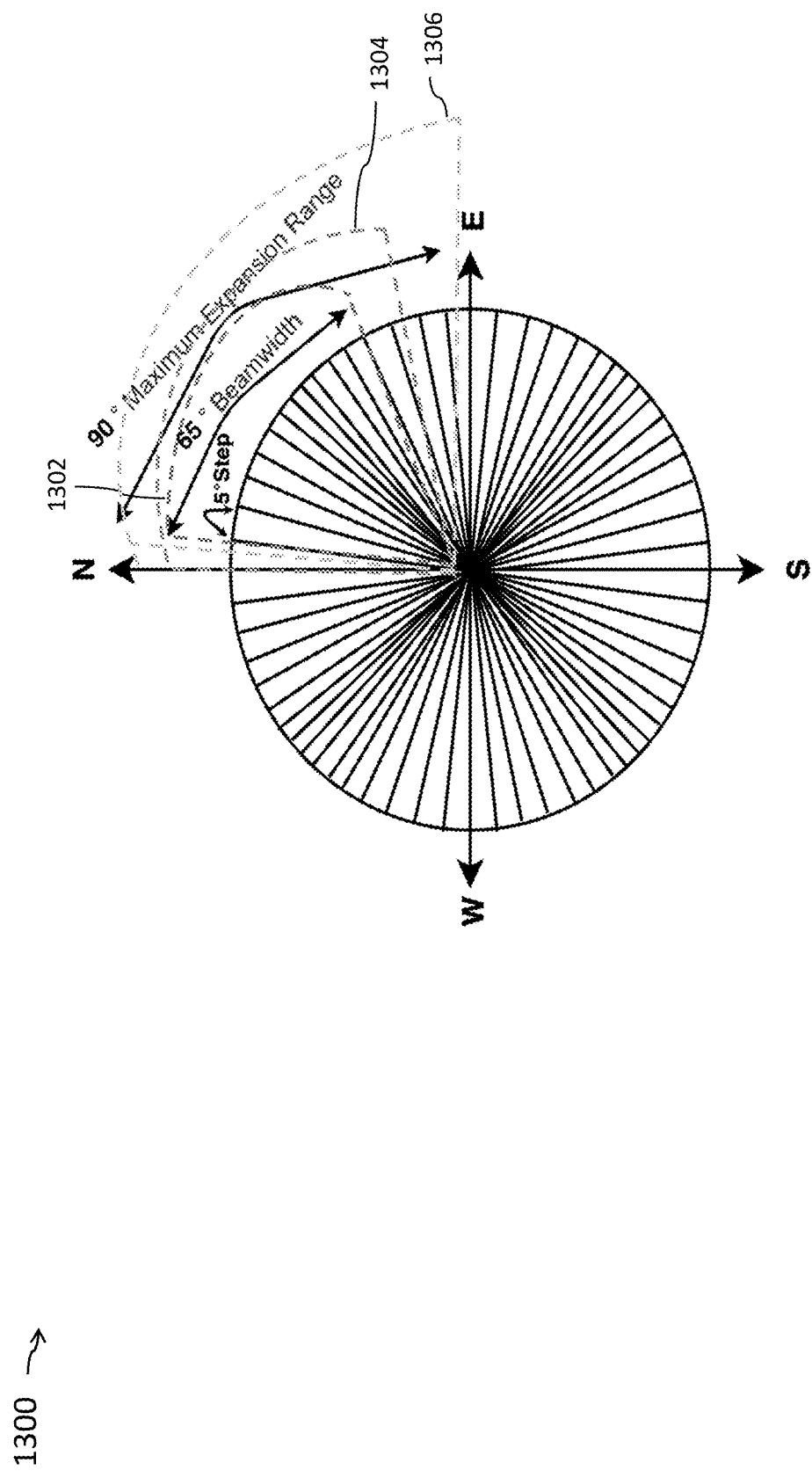
FIG. 13 is a diagram of a map, in accordance with some embodiments.

FIG. 13 is a diagram of a map 1300, in accordance with some embodiments.

In some embodiments, map 1300 is an embodiment of maps 400A-400B, and similar detailed description is therefore omitted. In some embodiments, map 1300 is generated by operation 212 of method 200. Map 1300 is shown with 5 degree steps for clarity. Other step values are within the scope of the present disclosure.

Map 1300 includes cones 1302, 1304 and 1306. In some embodiments, each of cones 1302, 1304 and 1306 is the same sector of a cell of the second set of cells 654b.

In some embodiments, cone 1302 corresponds to the first cone prior to the first antenna beam width is incremented by the second increment in operation 710 of method 700, and similar detailed description is therefore omitted. In some embodiments, cone 1302 has a first antenna beam width equal to 65 degrees.

In some embodiments, cone 1304 corresponds to the first cone after the first antenna beam width is incremented by the second increment in operation 710 of method 700, and similar detailed description is therefore omitted. For example, cone 1304 is cone 1302 after operation 710 where the first antenna beam width is incremented by the second increment. In some embodiments, the second increment in FIG. 13 is equal to 12.5 degrees. Other values for the second increment are within the scope of the present disclosure. In some embodiments, cone 1304 has a first antenna beam width equal to 77.5 degrees.

In some embodiments, cone 1306 corresponds to the first cone after the first antenna beam width is incremented by the second increment in operation 710 of method 700, and similar detailed description is therefore omitted. For example, cone 1306 is cone 1304 after operation 710 where the first antenna beam width is incremented by the second increment. In some embodiments, cone 1306 has a first antenna beam width equal to 90 degrees. In some embodiments, the first antenna beam width of cone 1306 being equal to 90 degrees also corresponds to the second maximum value of method 700.

In some embodiments, the antenna beam width of FIG. 12 corresponds to the first antenna beam width of method 700. Other values for the first antenna beam width are within the scope of the present disclosure.

Other numbers of cones, values of beam widths or second increment values in map 1300 are within the scope of the present disclosure.

FIGS. 14A-14B are corresponding diagrams of corresponding maps 1400A-1400B, in accordance with some embodiments.

In some embodiments, maps 1400A-1400B are an embodiment of maps 400A-400B, and similar detailed description is therefore omitted. In some embodiments, maps 1400A-1400B are generated by operation 212 of method 200.

Map 1400A includes a cone 1404a. In some embodiments, cone 1404a corresponds to the first cone of method 700, and similar detailed description is therefore omitted. In some embodiments, cone 1404a corresponds to the first cone after operation 702 of method 700, and similar detailed description is therefore omitted.

Cone 1404a includes a bisector angle 1410a. In some embodiments, bisector angle 1410a is an embodiment of the bisector angle BA2 of method 700, and similar detailed description is therefore omitted.

Map 1400A further includes a set of geolocation data 1420. In some embodiments, the set of geolocation data 1420 corresponds to the filtered qualified geolocation data of each user data in the second set of user data 654a. In some embodiments, each geolocation data of the set of geolocation data 1420 includes a corresponding bearing angle of a set of bearing angles.

Other numbers of cones, values of deployed azimuths or bearing angles in map 1400A are within the scope of the present disclosure.

Map 1400B includes cones 1402b and 1404b.

In some embodiments, cone 1404b is a variation of cone 1404a of map 1400A, and similar detailed description is therefore omitted.

In some embodiments, cone 1404b corresponds to the second cone of method 700, and similar detailed description is therefore omitted. In some embodiments, cone 1404b corresponds to the second cone after at least one of operation 708 or 709 of method 700, and similar detailed description is therefore omitted.

In some embodiments, cone 1404b has the deployed azimuth AZD, and similar detailed description is therefore omitted. In some embodiments, In some embodiments, cone 1402b corresponds to a cone having the planned azimuth AZP, and similar detailed description is therefore omitted.

Map 1400B shows the azimuth difference AD between the deployed azimuth AZD of cone 1404b and the planned azimuth AZP of cone 1402b.

Cone 1404b includes a bisector angle 1410b. In some embodiments, bisector angle 1410b is an embodiment of the bisector angle BA2 of method 700, and similar detailed description is therefore omitted.

Cone 1402b includes a bisector angle 1410c. In some embodiments, bisector angle 1410c is an embodiment of the bisector angle BA2 of method 700, and similar detailed description is therefore omitted.

Map 1400B further includes a set of geolocation data 1430. In some embodiments, the set of geolocation data 1430 corresponds to the filtered qualified geolocation data of each user data in the second set of user data 654a. In some embodiments, each geolocation data of the set of geolocation data 1430 includes a corresponding bearing angle of a set of bearing angles.

Other numbers of cones, values of deployed azimuths or bearing angles in map 1400B are within the scope of the present disclosure.

FIGS. 15A-15B are corresponding diagrams of corresponding maps 1500A-1500B, in accordance with some embodiments.

In some embodiments, maps 1500A-1500B are an embodiment of maps 400A-400B, and similar detailed description is therefore omitted.

Map 1500A corresponds to a cell 1520 with azimuths (e.g., 0 degrees, 120 degrees, 240 degrees). Map 1500A includes a set of sectors 1501 of the cell 1520.

In some embodiments, map 1500A is generated by the set of servers 126 after execution of operation 214. For example, map 1500A corresponds to a cell 1520 with deployed azimuths (e.g., 0 degrees, 120 degrees, 240 degrees) that have been corrected after execution of operation 214, in accordance with some embodiments. In some embodiments, the deployed azimuths (e.g., 0 degrees, 120 degrees, 240 degrees) of map 1500A that have been corrected after execution of operation 214 are caused by a set of swapped feeder cables (e.g., 1550a-1550b) shown in system 1500C of FIG. 15C.

The set of sectors 1501 includes at least one of sector 1502a, sector 1504a or sector 1506a.

Sector 1502a has an azimuth equal to 0 degrees. Sector 1504a has an azimuth equal to 120 degrees. Sector 1506a has an azimuth equal to 240 degrees.

In some embodiments, cell 1520 corresponds to a cell of the first set of cells or a disoriented cell of the second set of disoriented cells of method 200, and similar detailed description is therefore omitted.

In some embodiments, at least one of sector 1502a, 1504a or 1506a corresponds to cell 502 of FIG. 5, and similar detailed description is therefore omitted.

Map 1500B includes a set of sectors 1511 of cell 1520.

In some embodiments, map 1500B is generated by at least one of operation 204, 205, 206, 207, 208, 211 or 212 of method 200. For example, map 1500B corresponds to a cell 1520 with deployed azimuths (e.g., 118.5 degrees, 13.5 degrees, 217.5 degrees) that deviate from corresponding planned azimuth values (e.g., 0 degrees, 120 degrees, 240 degrees), in accordance with some embodiments. In some embodiments, the deployed azimuths (e.g., 118.5 degrees, 13.5 degrees, 217.5 degrees) of map 1500B are caused by the set of swapped feeder cables (e.g., 1550a-1550b) shown in system 1500D of FIG. 15D.

The set of sectors 1511 includes at least one of sector 1502b, sector 1504b or sector 1506b.

Sector 1502b has an azimuth equal to 118.5 degrees. Sector 1504b has an azimuth equal to 13.5 degrees. Sector 1506b has an azimuth equal to 217.5 degrees.

In some embodiments, at least one of sector 1502b, 1504b or 1506b corresponds to cell 504 of FIG. 5, and similar detailed description is therefore omitted.

Map 1500B further includes a set of data 1510 and a set of data 1512.

In some embodiments, the set of data 1510 corresponds to the first set of geolocation samples of the first cell of the third set of disoriented cells of method 800, and similar detailed description is therefore omitted.

In some embodiments, the set of data 1512 corresponds to the second set of geolocation samples of the second cell of the third set of disoriented cells of method 800, and similar detailed description is therefore omitted.

In some embodiments, the set of data 1510 corresponds to a set of geolocation samples of sector 1502b. In some embodiments, the set of data 1512 corresponds to a set of geolocation samples of sector 1504b.

As shown in FIG. 15B, sector 1504b having the azimuth of 13.5 degrees is near the set of data 1510, even though the set of data 1510 corresponds to geolocation samples of sector 1502b. Similarly, as shown in FIG. 15B, sector 1502b having the azimuth of 118.5 degrees is near the set of data 1512, even though the set of data 1512 corresponds to geolocation samples of sector 1504b. Thus, sectors 1502b and 1504b are swapped with each other, and the execution of method 200 will detect and correct the sector swap shown in map 1500B.

Other numbers of cells, sectors, values of deployed azimuths or planned azimuths in maps 1500A-1500B are within the scope of the present disclosure.

FIGS. 15C-15D are corresponding diagrams of corresponding systems 1500C-1500D, in accordance with some embodiments.

System 1500C includes a node 1530a, ports 1540a and 1540b, feeder cables 1550a and 1550b, and antennas 1560a and 1560b. The node 1530a includes port 1540a and port 1540b. Port 1540a is coupled to antenna 1560a by the feeder cable 1550a. Port 1540b is coupled to antenna 1560b by the feeder cable 1550b.

In some embodiments, system 1500C is after operation 214, and similar detailed description is therefore omitted.

In some embodiments, node 1530a corresponds to at least one node of the set of nodes 102, and similar detailed description is therefore omitted. In some embodiments, at least one of antenna 1560a or 1560b is a corresponding antenna of the set of antennas 104a, ..., 104m, and similar detailed description is therefore omitted. In some embodiments, at least feeder cable 1550a or 1550b is a corresponding cable of the first set of cables of a corresponding antenna of the first cross-feeder cell of the first set of cross-feeder cells of at least one of method 200 or 800, and similar detailed description is therefore omitted.

As shown in FIG. 15C, a first connection is between port 1540a and feeder cable 1550a of antenna 1560a, and a second connection is between port 1540b and feeder cable 1550b of antenna 1560b. In some embodiments, the system 1500C is configured to generate a map profile, such as map 1500A, and similar detailed description is therefore omitted.

Other configurations, numbers of ports, numbers of cables or numbers of antennas in system 1500C are within the scope of the present disclosure.

System 1500C includes node 1530a, ports 1540a and 1540b, feeder cables 1550a and 1550b, and antennas 1560a and 1560b.

In some embodiments, system 1500C is before operation 214, and similar detailed description is therefore omitted.

As shown in FIG. 15D, port 1540a is coupled to antenna 1560b by the feeder cable 1550b, and port 1540b is coupled to antenna 1560a by the feeder cable 1550a. Stated differently, the feeder cables of system 1500D of FIG. 15D have been crossed or swapped with each other in comparison with system 1500C of FIG. 15C, in accordance with some embodiments.

As shown in FIG. 15D, the first connection is between port 1540a and feeder cable 1550b of antenna 1560b, and the second connection is between port 1540b and feeder cable 1550a of antenna 1560a. Stated differently, the first connection and the second connection in FIGS. 15C-15D have been crossed or swapped with each other, in accordance with some embodiments.

In some embodiments, the system 1500D is configured to generate a map profile, such as map 1500B, and similar detailed description is therefore omitted.

Other configurations, numbers of ports, numbers of cables or numbers of antennas in system 1500D are within the scope of the present disclosure.

FIG. 16 is a schematic view of a system 1600, in accordance with some embodiments.

In some embodiments, system 1600 is an embodiment of one or more elements in system 100, and similar detailed description is therefore omitted. For example, in some embodiments, system 1600 is an embodiment of one or more of set of nodes 102, set of devices 106, set of devices 108, set of devices 116, set of servers 126, network 114, network 118, system 1500C-1500D, and similar detailed description is therefore omitted.

In some embodiments, system 1600 is configured to perform one or more operations of method 200, method 600, method 700, method 800, method 900 or method 1000.

System 1600 includes a hardware processor 1602 and a non-transitory, computer readable storage medium 1604 (e.g., memory 1604) encoded with, i.e., storing, the computer program code 1206, i.e., a set of executable instructions 1206. Computer readable storage medium 1604 is configured for interfacing with at least one of set of nodes 102, set of devices 106, set of devices 108, set of devices 116, set of servers 126, network 114, network 118, system 1500C-1500D, and similar detailed description is therefore omitted.

The processor 1602 is electrically coupled to the computer readable storage medium 1604 by a bus 1608. The processor 1602 is also electrically coupled to an I/O interface 1610 by bus 1608. A network interface 1612 is also electrically connected to the processor 1602 by bus 1608. Network interface 1612 is connected to at least one of network 1614, so that processor 1602 and computer readable storage medium 1604 are capable of connecting to external elements by network 1614. The processor 1602 is configured to execute the computer program code 1206 encoded in the computer readable storage medium 1604 in order to cause system 1600 to be usable for performing a portion or all of the operations as described in at least method 200, method 600, method 700, method 800, method 900 or method 1000. In some embodiments, network 1614 is not part of system 1600. In some embodiments, network 1614 is an embodiment of at least network 114 or 118 of FIG. 1.

In some embodiments, the processor 1602 is a central processing unit (CPU), a multi-processor, a distributed processing read circuit, an application specific integrated circuit (ASIC), and/or a suitable processing unit.

In some embodiments, the computer readable storage medium 1604 is an electronic, magnetic, optical, electromagnetic, infrared, and/or a semiconductor read circuit (or apparatus or device). For example, the computer readable storage medium 1604 includes a semiconductor or solid-state memory, a magnetic tape, a removable computer diskette, a random access memory (RAM), a read-only memory (ROM), a rigid magnetic disk, and/or an optical disk. In some embodiments using optical disks, the computer readable storage medium 1604 includes a compact disk-read only memory (CD-ROM), a compact disk-read/write (CD-R/W), and/or a digital video disc (DVD).

In some embodiments, forms of computer-readable media include, for example, a floppy disk, a flexible disk, a hard disk, a magnetic tape, another magnetic medium, a CD-ROM, CDRW, DVD, another optical medium, punch cards, paper tape, optical mark sheets, another physical medium with patterns of holes or other optically recognizable indicia, a RAM, a PROM, an EPROM, a FLASH-EPROM, an EEPROM, a flash memory, another memory chip or cartridge, or another medium from which a computer can read. The term computer-readable storage medium is used herein to refer to a computer-readable medium.

In some embodiments, the storage medium 1604 stores the computer program code 1206 configured to cause system 1600 to perform one or more operations of at least method 200, method 600, method 700, method 800, method 900 or method 1000. In some embodiments, the storage medium 1604 also stores information used for performing at least method 200, method 600, method 700, method 800, method 900 or method 1000 as well as information generated during performing at least method 200, method 600, method 700, method 800, method 900 or method 1000, such as cell report 1616, Map 1618, planned azimuth 1620, deployed azimuth 1622, user interface 1624, user parameters 1626, and/or a set of executable instructions to perform one or more operations of at least method 200, method 600, method 700, method 800, method 900 or method 1000.

In some embodiments, the storage medium 1604 stores instructions (e.g., computer program code 1206) for interfacing with at least one or more of set of nodes 102, set of devices 106, set of devices 108, set of devices 116, set of servers 126, network 114, network 118, system 1500C-1500D. The instructions (e.g., computer program code 1206) enable processor 1602 to generate instructions readable by at least one or more of set of nodes 102, set of devices 106, set of devices 108, set of devices 116, set of servers 126, network 114, network 118, system 1500C-1500D to effectively implement one or more operations of at least method 200, method 600, method 700, method 800, method 900 or method 1000 during operation of system 100.

System 1600 includes I/O interface 1610. I/O interface 1610 is coupled to external circuitry. In some embodiments, I/O interface 1610 includes a keyboard, keypad, mouse, trackball, trackpad, and/or cursor direction keys for communicating information and commands to processor 1602.

System 1600 also includes network interface 1612 coupled to the processor 1602. Network interface 1612 allows system 1600 to communicate with network 1614, to which one or more other computer read circuits are connected. Network interface 1612 includes wireless network interfaces such as OFDMA, CDMA, BLUETOOTH, WIFI, WIMAX, GPRS, or WCDMA; or wired network interface such as ETHERNET, USB, or IEEE-1102.11. In some embodiments, at least method 200, method 600, method 700, method 800, method 900 or method 1000 is implemented in two or more systems 1600, and information such as cell report, Map, planned azimuth, deployed azimuth and user interface are exchanged between different systems 1600 by network 1614.

System 1600 is configured to receive information related to a cell report through I/O interface 1610 or network interface 1612. The information is transferred to processor 1602 by bus 1608, and is then stored in computer readable medium 1604 as cell report 1616. In some embodiments, cell report 1616 corresponds to cell report 300, and similar detailed description is therefore omitted. System 1600 is configured to receive information related to Map through I/O interface 1610 or network interface 1612. The information is stored in computer readable medium 1604 as Map 1618. In some embodiments, Map 1618 corresponds to at least one of map 400A, 400B, 500, 1100, 1200, 1300, 1400A-1400B or 1500A-1500B, and similar detailed description is therefore omitted. System 1600 is configured to receive information related to a planned azimuth through I/O interface 1610 or network interface 1612. The information is stored in computer readable medium 1604 as planned azimuth 1620. In some embodiments, planned azimuth 1620 corresponds to at least one of column 4 of cell report 300 or planned azimuth AZP, and similar detailed description is therefore omitted. System 1600 is configured to receive information related to a deployed azimuth through I/O interface 1610 or network interface 1612. The information is stored in computer readable medium 1604 as deployed azimuth 1622. In some embodiments, deployed azimuth 1622 corresponds to at least one of column 5 of cell report 300 or deployed azimuth AZD, and similar detailed description is therefore omitted. System 1600 is configured to receive information related to a user interface through I/O interface 1610 or network interface 1612. The information is stored in computer readable medium 1604 as user interface 1624. System 1600 is configured to receive information related to user parameters through I/O interface 1610 or network interface 1612. The information is stored in computer readable medium 1604 as user parameters 1626. In some embodiments, user parameters 1626 corresponds to at least one or more columns of cell report 300, parameter portion 444, user data of the set of user data of methods 200 and 600-1000, the first threshold of methods 600-700, the second threshold of methods 200 and 600-1000, the third threshold of methods 200 and 600-1000, the first maximum value of method 700, the azimuth difference of methods 200 and 600-1000, the antenna beam width of methods 200 and 600-1000, the bearing angles of methods 600-700, the bisector angle of methods 600-700, the first range of methods 200 and 600-1000, the first sample threshold of methods 200 and 600-1000, the second range of methods 200 and 600-1000, the second sample threshold of methods 200 and 600-1000, the third range of methods 200 and 600-1000, the fourth range of methods 200 and 600-1000, user data of methods 200 and 600-1000, and similar detailed description is therefore omitted.

In some embodiments, at least method 200, method 600, method 700, method 800, method 900 or method 1000 is implemented as a standalone software application for execution by a processor. In some embodiments, at least method 200, method 600, method 700, method 800, method 900 or method 1000 is implemented as corresponding software applications for execution by one or more processors.

In some embodiments, at least method 200, method 600, method 700, method 800, method 900 or method 1000 is implemented as a software application that is a part of an additional software application. In some embodiments, at least method 200, method 600, method 700, method 800, method 900 or method 1000 is implemented as a plug-in to a software application.

In some embodiments, at least method 200, method 600, method 700, method 800, method 900 or method 1000 is implemented as a software application that is a portion of an RF planning tool. In some embodiments, at least method 200, method 600, method 700, method 800, method 900 or method 1000 is implemented as a software application that is used by an RF planning tool. In some embodiments, the RF planning tool is used to plan, deploy, monitor and optimize one or more cellular networks.

In some embodiments, one or more of the operations of method 200, method 600, method 700, method 800, method 900 or method 1000 is not performed.

It will be readily seen by one of ordinary skill in the art that one or more of the disclosed embodiments fulfill one or more of the advantages set forth above. After reading the foregoing specification, one of ordinary skill will be able to affect various changes, substitutions of equivalents and various other embodiments as broadly disclosed herein. It is therefore intended that the protection granted hereon be limited only by the definition contained in the appended claims and equivalents thereof.

One aspect of this description relates to a method for disoriented cell configuration. In some embodiments, the method includes determining, by a first server, a first number of misaligned sectors for each disoriented cell in a first set of disoriented cells of a first set of cells, the first set of cells having user data that includes at least geolocation data of a first set of users, wherein each disoriented cell of the first set of disoriented cells includes a corresponding node with a corresponding antenna with a corresponding deployed azimuth different from a corresponding planned azimuth. In some embodiments, the method further includes generating, by the first server, data of a second set of disoriented cells based on at least one of data of the first set of disoriented cells or the first number of misaligned sectors for each disoriented cell in the first set of disoriented cells, wherein each cell in the second set of disoriented cells has two or more misaligned sectors in the corresponding first number of misaligned sectors. In some embodiments, the method further includes determining, by the first server, at least one of a first set of cross-feeder cells in the second set of disoriented cells, a first set of sector swap cells in the second set of disoriented cells or a first set of cyclic swap cells in the second set of disoriented cells. In some embodiments, the method further includes changing a configuration of the corresponding antenna of the corresponding disoriented cell of the second set of disoriented cells, In some embodiments, changing the configuration of the corresponding antenna of the corresponding disoriented cell of the second set of disoriented cells includes changing a connection of a first set of cables of a corresponding antenna of a first cross-feeder cell of a first set of cross-feeder cells, or changing a first deployed azimuth of a first antenna of a first sector in the first set of sector swap cells or the first set of cyclic swap cells.

Another aspect of this description relates to an apparatus for disoriented cell configuration. In some embodiments, the system includes a memory having non-transitory instructions stored, and a processor coupled to the memory, and being configured to execute the instructions, thereby causing the apparatus to determine a first number of misaligned sectors for each disoriented cell in a first set of disoriented cells of a first set of cells, the first set of cells having user data that includes at least geolocation data of a first set of users, wherein each disoriented cell of the first set of disoriented cells includes a corresponding node with a corresponding antenna with a corresponding deployed azimuth different from a corresponding planned azimuth. In some embodiments, the processor is further configured to execute the instructions, thereby further causing the apparatus to generate data of a second set of disoriented cells based on at least one of data of the first set of disoriented cells or the first number of misaligned sectors for each disoriented cell in the first set of disoriented cells, wherein each cell in the second set of disoriented cells has two or more misaligned sectors in the corresponding first number of misaligned sectors. In some embodiments, the processor is further configured to execute the instructions, thereby further causing the apparatus to determine at least one of a first set of cross-feeder cells in the second set of disoriented cells, a first set of sector swap cells in the second set of disoriented cells or a first set of cyclic swap cells in the second set of disoriented cells. In some embodiments, the processor is further configured to execute the instructions, thereby further causing the apparatus to change a configuration of the corresponding antenna of the corresponding disoriented cell of the second set of disoriented cells. In some embodiments, the non-transitory instructions that cause the apparatus to change the configuration of the corresponding antenna of the corresponding disoriented cell of the second set of disoriented cells, the processor being further configured to cause the apparatus to change a connection of a first set of cables of a corresponding antenna of a first cross-feeder cell of a first set of cross-feeder cells, or change a first deployed azimuth of a first antenna of a first sector in the first set of sector swap cells or the first set of cyclic swap cells.

Still another aspect of this description relates to a computer-readable medium. In some embodiments, the computer-readable medium includes instructions executable by a controller of a first server to cause the controller to perform operations including determining a first number of misaligned sectors for each disoriented cell in a first set of disoriented cells of a first set of cells, the first set of cells having user data that includes at least geolocation data of a first set of users, wherein each disoriented cell of the first set of disoriented cells includes a corresponding node with a corresponding antenna with a corresponding deployed azimuth different from a corresponding planned azimuth. In some embodiments, the instructions executable by the controller further cause the controller to perform operations further including generating data of a second set of disoriented cells based on at least one of data of the first set of disoriented cells or the first number of misaligned sectors for each disoriented cell in the first set of disoriented cells, wherein each cell in the second set of disoriented cells has two or more misaligned sectors in the corresponding first number of misaligned sectors. In some embodiments, the instructions executable by the controller further cause the controller to perform operations further including determining at least one of a first set of cross-feeder cells in the second set of disoriented cells, a first set of sector swap cells in the second set of disoriented cells or a first set of cyclic swap cells in the second set of disoriented cells. In some embodiments, the instructions executable by the controller further cause the controller to perform operations further including changing a configuration of the corresponding antenna of the corresponding disoriented cell of the second set of disoriented cells. In some embodiments, changing the configuration of the corresponding antenna of the corresponding disoriented cell of the second set of disoriented cells includes changing a connection of a first set of cables of a corresponding antenna of a first cross-feeder cell of a first set of cross-feeder cells, or changing a first deployed azimuth of a first antenna of a first sector in the first set of sector swap cells or the first set of cyclic swap cells.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A method for disoriented cell configuration, comprising:
   determining, by a first server, a first number of misaligned sectors for each disoriented cell in a first set of disoriented cells of a first set of cells, the first set of cells having user data that includes at least geolocation data of a first set of users, wherein each disoriented cell of the first set of disoriented cells includes a corresponding node with a corresponding antenna with a corresponding deployed azimuth different from a corresponding planned azimuth;
   generating, by the first server, data of a second set of disoriented cells based on at least one of data of the first set of disoriented cells or the first number of misaligned sectors for each disoriented cell in the first set of disoriented cells, wherein each cell in the second set of disoriented cells has two or more misaligned sectors in the corresponding first number of misaligned sectors;
   determining, by the first server, at least one of a first set of cross-feeder cells in the second set of disoriented cells, a first set of sector swap cells in the second set of disoriented cells or a first set of cyclic swap cells in the second set of disoriented cells;
   changing a configuration of the corresponding antenna of the corresponding disoriented cell of the second set of disoriented cells, wherein changing the configuration of the corresponding antenna of the corresponding disoriented cell of the second set of disoriented cells comprises:
      changing a connection of a first set of cables of a corresponding antenna of a first cross-feeder cell of a first set of cross-feeder cells; or
      changing a first deployed azimuth of a first antenna of a first sector in the first set of sector swap cells or the first set of cyclic swap cells.

2. The method of claim 1, wherein changing the first deployed azimuth of the first antenna of the first sector in the first set of sector swap cells or the first set of cyclic swap cells comprises:
   swapping the first deployed azimuth of the first antenna of the first sector in the first set of sector swap cells and a second deployed azimuth of a second antenna of a second sector in the first set of sector swap cells with each other; or changing the first deployed azimuth of the first antenna of the first sector in the first set of cyclic swap cells, the second deployed azimuth of the second antenna of the second sector of the first set of cyclic swap cells and a third deployed azimuth of a third antenna of a third sector in the first set of cyclic swap cells.

3. The method of claim 2, further comprising:
generating, by the first server, a map based on the cell report, wherein the map displays graphical details of the cell report.

4. The method of claim 1, wherein determining at least one of the first set of cross-feeder cells in the second set of disoriented cells, the first set of sector swap cells in the second set of disoriented cells or the first set of cyclic swap cells in the second set of disoriented cells comprises: determining, by the first server, the first set of cross-feeder cells in the second set of disoriented cells, wherein the determining the first set of cross-feeder cells in the second set of disoriented cells comprises:
  determining a third set of disoriented cells from the second set of disoriented cells, wherein each cell of the third set of disoriented cells includes the corresponding deployed azimuth that deviates from the corresponding planned azimuth by a first range; and
  designating a first cell of the third set of disoriented cells and a second cell of the third set of disoriented cells as corresponding cross-feeder cells of the first set of cross-feeder cells in response to:
    determining that a first set of geolocation samples of the first cell of the third set of disoriented cells is greater than or equal to a first threshold and are within a second range of a corresponding deployed azimuth of the second cell of the third set of disoriented cells; and
    determining that a second set of geolocation samples of the second cell of the third set of disoriented cells is greater than or equal to the first threshold and are within the second range of a corresponding deployed azimuth of the first cell of the third set of disoriented cells.

5. The method of claim 4, wherein determining at least one of the first set of cross-feeder cells in the second set of disoriented cells, the first set of sector swap cells in the second set of disoriented cells or the first set of cyclic swap cells in the second set of disoriented cells comprises: determining, by the first server, the first set of sector swap cells in the second set of disoriented cells, wherein the determining the first set of sector swap cells in the second set of disoriented cells comprises:
  determining a fourth set of disoriented cells from the second set of disoriented cells, wherein each cell of the fourth set of disoriented cells includes the corresponding deployed azimuth that deviates from the corresponding planned azimuth by a second range greater than the first range; and
  designating a first cell of the fourth set of disoriented cells and a second cell of the fourth set of disoriented cells as corresponding sector swap cells of the first set of sector swap cells in response to:
    determining that a first set of geolocation samples of the first cell of the fourth set of disoriented cells is greater than or equal to a second threshold and are within a third range of a corresponding deployed azimuth of the second cell of the fourth set of disoriented cells; and
    determining that a second set of geolocation samples of the second cell of the fourth set of disoriented cells is greater than or equal to the second threshold and are within the third range of a corresponding deployed azimuth of the first cell of the fourth set of disoriented cells.

6. The method of claim 4, wherein determining at least one of the first set of cross-feeder cells in the second set of disoriented cells, the first set of sector swap cells in the second set of disoriented cells or the first set of cyclic swap cells in the second set of disoriented cells comprises: determining, by the first server, the first set of cyclic swap cells in the second set of disoriented cells, wherein the determining the first set of cyclic swap cells in the second set of disoriented cells comprises:
  determining a fourth set of disoriented cells from the second set of disoriented cells, wherein each cell of the fourth set of disoriented cells includes the corresponding deployed azimuth that deviates from the corresponding planned azimuth by a second range greater than the first range; and
  designating a first cell of the fourth set of disoriented cells, a second cell of the fourth set of disoriented cells and a third cell of the fourth set of disoriented cells as corresponding cyclic swap cells of the first set of cyclic swap cells in response to:
    determining that a first set of geolocation samples of the first cell of the fourth set of disoriented cells is greater than or equal to a second threshold and are within a third range of a corresponding deployed azimuth of the second cell of the fourth set of disoriented cells;
    determining that a second set of geolocation samples of the second cell of the fourth set of disoriented cells is greater than or equal to the second threshold and are within the third range of a corresponding deployed azimuth of the third cell of the fourth set of disoriented cells; and
    determining that a third set of geolocation samples of the third cell of the fourth set of disoriented cells is greater than or equal to the second threshold and are within the third range of a corresponding deployed azimuth of the first cell of the fourth set of disoriented cells.

7. The method of claim 1, further comprising:
generating, by the first server, a cell report, the cell report including at least one of the first set of disoriented cells, the second set of disoriented cells, the first set of cross-feeder cells, the first set of sector swap cells, the first set of cyclic swap cells, a cell identifier of disoriented cells in the first set of disoriented cells, a site name of disoriented cells in the first set of disoriented cells, a location of disoriented cells in the first set of disoriented cells, a frequency band of disoriented cells in the first set of disoriented cells, an azimuth deviation of disoriented cells in the first set of disoriented cells, the deployed azimuth or the planned azimuth of disoriented cells in the first set of disoriented cells.

8. An apparatus for disoriented cell configuration, comprising:
a memory having non-transitory instructions stored therein; and
a processor coupled to the memory, and being configured to execute the non-transitory instructions, thereby causing the apparatus to:
  determine a first number of misaligned sectors for each disoriented cell in a first set of disoriented cells of a first set of cells, the first set of cells having user data that includes at least geolocation data of a first set of users, wherein each disoriented cell of the first set of disoriented cells includes a corresponding node with a corresponding antenna with a corresponding deployed azimuth different from a corresponding planned azimuth;

generate data of a second set of disoriented cells based on at least one of data of the first set of disoriented cells or the first number of misaligned sectors for each disoriented cell in the first set of disoriented cells, wherein each cell in the second set of disoriented cells has two or more misaligned sectors in the corresponding first number of misaligned sectors;

determine at least one of a first set of cross-feeder cells in the second set of disoriented cells, a first set of sector swap cells in the second set of disoriented cells or a first set of cyclic swap cells in the second set of disoriented cells;

change a configuration of the corresponding antenna of the corresponding disoriented cell of the second set of disoriented cells, wherein the non-transitory instructions that cause the apparatus to change the configuration of the corresponding antenna of the corresponding disoriented cell of the second set of disoriented cells, the processor being further configured to cause the apparatus to:

change a connection of a first set of cables of a corresponding antenna of a first cross-feeder cell of a first set of cross-feeder cells; or change a first deployed azimuth of a first antenna of a first sector in the first set of sector swap cells or the first set of cyclic swap cells.

9. The apparatus of claim 8, wherein the non-transitory instructions that cause the apparatus to change the first deployed azimuth of the first antenna of the first sector in the first set of sector swap cells or the first set of cyclic swap cells, the processor being further configured to cause the apparatus to:

swap the first deployed azimuth of the first antenna of the first sector in the first set of sector swap cells and a second deployed azimuth of a second antenna of a second sector in the first set of sector swap cells with each other; or change the first deployed azimuth of the first antenna of the first sector in the first set of cyclic swap cells, the second deployed azimuth of the second antenna of the second sector of the first set of cyclic swap cells and a third deployed azimuth of a third antenna of a third sector in the first set of cyclic swap cells.

10. The apparatus of claim 9, wherein the processor is further configured to execute the non-transitory instructions, thereby further causing the apparatus to:

generate a map based on the cell report, wherein the map displays graphical details of the cell report.

11. The apparatus of claim 8, wherein the non-transitory instructions that cause the apparatus to determine at least one of the first set of cross-feeder cells in the second set of disoriented cells, the first set of sector swap cells in the second set of disoriented cells or the first set of cyclic swap cells in the second set of disoriented cells, the processor being further configured to cause the apparatus to: determine the first set of cross-feeder cells in the second set of disoriented cells, wherein the non-transitory instructions that cause the apparatus to determine the first set of cross-feeder cells in the second set of disoriented cells, the processor being further configured to cause the apparatus to:

determine a fourth set of disoriented cells from the second set of disoriented cells, wherein each cell of the fourth set of disoriented cells includes the corresponding deployed azimuth that deviates from the corresponding planned azimuth by a second range greater than the first range; and designate a first cell of the fourth set of disoriented cells and a second cell of the fourth set of disoriented cells as corresponding sector swap cells of the first set of sector swap cells in response to the processor being configured to cause the apparatus to:

determine that a first set of geolocation samples of the first cell of the fourth set of disoriented cells is greater than or equal to a second threshold and are within a third range of a corresponding deployed azimuth of the second cell of the fourth set of disoriented cells; and determine that a second set of geolocation samples of the second cell of the fourth set of disoriented cells is greater than or equal to the second threshold and are within the third range of a corresponding deployed azimuth of the first cell of the fourth set of disoriented cells.

12. The apparatus of claim 11, wherein the non-transitory instructions that cause the apparatus to determine at least one of the first set of cross-feeder cells in the second set of disoriented cells, the first set of sector swap cells in the second set of disoriented cells or the first set of cyclic swap cells in the second set of disoriented cells, the processor being further configured to cause the apparatus to: determine the first set of sector swap cells in the second set of disoriented cells, wherein the non-transitory instructions that cause the apparatus to determine the first set of sector swap cells in the second set of disoriented cells, the processor being further configured to cause the apparatus to:

determine a fourth set of disoriented cells from the second set of disoriented cells, wherein each cell of the fourth set of disoriented cells includes the corresponding deployed azimuth that deviates from the corresponding planned azimuth by a second range greater than the first range; and designate a first cell of the fourth set of disoriented cells and a second cell of the fourth set of disoriented cells as corresponding sector swap cells of the first set of sector swap cells in response to the processor being configured to cause the apparatus to:

determine that a first set of geolocation samples of the first cell of the fourth set of disoriented cells is greater than or equal to a second threshold and are within a third range of a corresponding deployed azimuth of the second cell of the fourth set of disoriented cells; and determine that a second set of geolocation samples of the second cell of the fourth set of disoriented cells is greater than or equal to the second threshold and are within the third range of a corresponding deployed azimuth of the first cell of the fourth set of disoriented cells.

13. The apparatus of claim 11, wherein the non-transitory instructions that cause the apparatus to determine at least one of the first set of cross-feeder cells in the second set of disoriented cells, the first set of sector swap cells in the second set of disoriented cells or the first set of cyclic swap cells in the second set of disoriented cells, the processor being further configured to cause the apparatus to: determine the first set of cyclic swap cells in the second set of disoriented cells, wherein the non-transitory instructions that cause the apparatus to determine the first set of cyclic swap cells in the second set of disoriented cells, the processor being further configured to cause the apparatus to:
  determine a fourth set of disoriented cells from the second set of disoriented cells, wherein each cell of the fourth set of disoriented cells includes the corresponding deployed azimuth that deviates from the corresponding planned azimuth by a second range greater than the first range; and
  designate a first cell of the fourth set of disoriented cells, a second cell of the fourth set of disoriented cells and a third cell of the fourth set of disoriented cells as corresponding cyclic swap cells of the first set of cyclic swap cells in response to the processor being configured to cause the apparatus to:
    determine that a first set of geolocation samples of the first cell of the fourth set of disoriented cells is greater than or equal to a second threshold and are within a third range of a corresponding deployed azimuth of the second cell of the fourth set of disoriented cells;
    determine that a second set of geolocation samples of the second cell of the fourth set of disoriented cells is greater than or equal to the second threshold and are within the third range of a corresponding deployed azimuth of the third cell of the fourth set of disoriented cells; and
    determine that a third set of geolocation samples of the third cell of the fourth set of disoriented cells is greater than or equal to the second threshold and are within the third range of a corresponding deployed azimuth of the first cell of the fourth set of disoriented cells.

14. The apparatus of claim 8, wherein the processor is further configured to execute the non-transitory instructions, thereby further causing the apparatus to:
  generate a cell report, the cell report including at least one of the first set of disoriented cells, the second set of disoriented cells, the first set of cross-feeder cells, the first set of sector swap cells, the first set of cyclic swap cells, a cell identifier of disoriented cells in the first set of disoriented cells, a site name of disoriented cells in the first set of disoriented cells, a location of disoriented cells in the first set of disoriented cells, a frequency band of disoriented cells in the first set of disoriented cells, an azimuth deviation of disoriented cells in the first set of disoriented cells, the deployed azimuth or the planned azimuth of disoriented cells in the first set of disoriented cells.

15. A non-transitory computer-readable medium including instructions executable by a controller of a first server to cause the controller to perform operations comprising:
  determining a first number of misaligned sectors for each disoriented cell in a first set of disoriented cells of a first set of cells, the first set of cells having user data that includes at least geolocation data of a first set of users, wherein each disoriented cell of the first set of disoriented cells includes a corresponding node with a corresponding antenna with a corresponding deployed azimuth different from a corresponding planned azimuth;
  generating data of a second set of disoriented cells based on at least one of data of the first set of disoriented cells or the first number of misaligned sectors for each disoriented cell in the first set of disoriented cells, wherein each cell in the second set of disoriented cells has two or more misaligned sectors in the corresponding first number of misaligned sectors;
  determining at least one of a first set of cross-feeder cells in the second set of disoriented cells, a first set of sector swap cells in the second set of disoriented cells or a first set of cyclic swap cells in the second set of disoriented cells;
  changing a configuration of the corresponding antenna of the corresponding disoriented cell of the second set of disoriented cells, wherein changing the configuration of the corresponding antenna of the corresponding disoriented cell of the second set of disoriented cells comprises:
    changing a connection of a first set of cables of a corresponding antenna of a first cross-feeder cell of a first set of cross-feeder cells; or
    changing a first deployed azimuth of a first antenna of a first sector in the first set of sector swap cells or the first set of cyclic swap cells.

16. The non-transitory computer-readable medium of claim 15, wherein the instructions that cause the controller to perform operations comprising changing the first deployed azimuth of the first antenna of the first sector in the first set of sector swap cells or the first set of cyclic swap cells, the controller being further configured to perform operations comprising:
  swapping the first deployed azimuth of the first antenna of the first sector in the first set of sector swap cells and a second deployed azimuth of a second antenna of a second sector in the first set of sector swap cells with each other; or
  changing the first deployed azimuth of the first antenna of the first sector in the first set of cyclic swap cells, the second deployed azimuth of the second antenna of the second sector of the first set of cyclic swap cells and a third deployed azimuth of a third antenna of a third sector in the first set of cyclic swap cells.

17. The non-transitory computer-readable medium of claim 15, wherein the instructions that cause the controller to perform operations comprising determining at least one of the first set of cross-feeder cells in the second set of disoriented cells, the first set of sector swap cells in the second set of disoriented cells or the first set of cyclic swap cells in the second set of disoriented cells, the controller being further configured to perform operations comprising:
  determining the first set of cross-feeder cells in the second set of disoriented cells, wherein the instructions that cause the controller to perform operations comprising determining the first set of cross-feeder cells in the second set of disoriented cells, the controller being further configured to perform operations comprising:
    determining a third set of disoriented cells from the second set of disoriented cells, wherein each cell of the third set of disoriented cells includes the corresponding deployed azimuth that deviates from the corresponding planned azimuth by a first range; and
    designating a first cell of the third set of disoriented cells and a second cell of the third set of disoriented cells as corresponding cross-feeder cells of the first set of cross-feeder cells in response to:
      determining that a first set of geolocation samples of the first cell of the third set of disoriented cells is greater than or equal to a first threshold and are within a second range of a corresponding deployed azimuth of the second cell of the third set of disoriented cells; and
      determining that a second set of geolocation samples of the second cell of the third set of disoriented cells is greater than or equal to the first threshold and are within the second range of a corresponding deployed azimuth of the first cell of the third set of disoriented cells.

18. The non-transitory computer-readable medium of claim 17, wherein the instructions that cause the controller to perform operations comprising determining at least one of the first set of cross-feeder cells in the second set of disoriented cells, the first set of sector swap cells in the second set of disoriented cells or the first set of cyclic swap cells in the second set of disoriented cells, the controller being further configured to perform operations comprising: determining the first set of sector swap cells in the second set of disoriented cells, wherein the instructions that cause the controller to perform operations comprising determining the first set of sector swap cells in the second set of disoriented cells, the controller being further configured to perform operations comprising:

determining a fourth set of disoriented cells from the second set of disoriented cells, wherein each cell of the fourth set of disoriented cells includes the corresponding deployed azimuth that deviates from the corresponding planned azimuth by a second range greater than the first range; and designating a first cell of the fourth set of disoriented cells and a second cell of the fourth set of disoriented cells as corresponding sector swap cells of the first set of sector swap cells in response to:

determining that a first set of geolocation samples of the first cell of the fourth set of disoriented cells is greater than or equal to a second threshold and are within a third range of a corresponding deployed azimuth of the second cell of the fourth set of disoriented cells; and determining that a second set of geolocation samples of the second cell of the fourth set of disoriented cells is greater than or equal to the second threshold and are within the third range of a corresponding deployed azimuth of the first cell of the fourth set of disoriented cells.

19. The non-transitory computer-readable medium of claim 17, wherein the instructions that cause the controller to perform operations comprising determining at least one of the first set of cross-feeder cells in the second set of disoriented cells, the first set of sector swap cells in the second set of disoriented cells or the first set of cyclic swap cells in the second set of disoriented cells, the controller being further configured to perform operations comprising: determining the first set of cyclic swap cells in the second set of disoriented cells, wherein the instructions that cause the controller to perform operations comprising determining the first set of cyclic swap cells in the second set of disoriented cells, the controller being further configured to perform operations comprising:

determining a fourth set of disoriented cells from the second set of disoriented cells, wherein each cell of the fourth set of disoriented cells includes the corresponding deployed azimuth that deviates from the corresponding planned azimuth by a second range greater than the first range; and designating a first cell of the fourth set of disoriented cells, a second cell of the fourth set of disoriented cells and a third cell of the fourth set of disoriented cells as corresponding cyclic swap cells of the first set of cyclic swap cells in response to:

determining that a first set of geolocation samples of the first cell of the fourth set of disoriented cells is greater than or equal to a second threshold and are within a third range of a corresponding deployed azimuth of the second cell of the fourth set of disoriented cells;

determining that a second set of geolocation samples of the second cell of the fourth set of disoriented cells is greater than or equal to the second threshold and are within the third range of a corresponding deployed azimuth of the third cell of the fourth set of disoriented cells; and determining that a third set of geolocation samples of the third cell of the fourth set of disoriented cells is greater than or equal to the second threshold and are within the third range of a corresponding deployed azimuth of the first cell of the fourth set of disoriented cells.

20. The non-transitory computer-readable medium of claim 15, wherein the instructions executable by the controller of the first server cause the controller to perform further operations comprising:

generating, by the first server, a cell report, the cell report including at least one of the first set of disoriented cells, the second set of disoriented cells, the first set of cross-feeder cells, the first set of sector swap cells, the first set of cyclic swap cells, a cell identifier of disoriented cells in the first set of disoriented cells, a site name of disoriented cells in the first set of disoriented cells, a location of disoriented cells in the first set of disoriented cells, a frequency band of disoriented cells in the first set of disoriented cells, an azimuth deviation of disoriented cells in the first set of disoriented cells, the deployed azimuth or the planned azimuth of disoriented cells in the first set of disoriented cells; and generating, by the first server, a map based on the cell report, wherein the map displays graphical details of the cell report.

* * * * *